(12) United States Patent
Uchida et al.

(10) Patent No.: US 10,650,506 B2
(45) Date of Patent: May 12, 2020

(54) IMAGE PROCESSING APPARATUS AND IMAGE PROCESSING METHOD

(71) Applicant: SONY CORPORATION, Tokyo (JP)

(72) Inventors: Masashi Uchida, Tokyo (JP); Masatoshi Yokokawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/315,807

(22) PCT Filed: Apr. 27, 2017

(86) PCT No.: PCT/JP2017/016735
§ 371 (c)(1),
(2) Date: Jan. 7, 2019

(87) PCT Pub. No.: WO2018/016151
PCT Pub. Date: Jan. 25, 2018

(65) Prior Publication Data
US 2019/0304075 A1 Oct. 3, 2019

(30) Foreign Application Priority Data
Jul. 22, 2016 (JP) .................................. 2016-144172

(51) Int. Cl.
*G06T 5/50* (2006.01)
*G06T 7/33* (2017.01)
(Continued)

(52) U.S. Cl.
CPC ................ *G06T 5/50* (2013.01); *G03B 15/00* (2013.01); *G06T 7/33* (2017.01); *H04N 5/225* (2013.01);
(Continued)

(58) Field of Classification Search
CPC . G06T 5/50; G06T 7/33; H04N 5/232; H04N 5/225; H04N 5/23238; H04N 5/23232; H04N 5/2258; G03B 15/00
See application file for complete search history.

(56) References Cited

U.S. PATENT DOCUMENTS

2011/0279698 A1 11/2011 Yoshikawa
2012/0262607 A1 10/2012 Shimura et al.
(Continued)

FOREIGN PATENT DOCUMENTS

CN 102244791 A 11/2011
CN 102668537 A 9/2012
(Continued)

OTHER PUBLICATIONS

International Search Report and Written Opinion of PCT Application No. PCT/JP2017/016735, dated Jul. 18, 2017, 08 pages of ISRWO.

*Primary Examiner* — Joseph W Becker
(74) *Attorney, Agent, or Firm* — Chip Law Group

(57) ABSTRACT

A fusion decision processing section 36-3 performs, based on a feature amount calculated by using a moving image of a monochrome imaged image acquired by imaging a subject with an imaging section 21-1 and a color imaged image acquired by imaging the subject from a different point-of-view position with an imaging section 21-2, fusion decision as to whether or not deterioration of image quality is caused in fusion processing in the fusion processing section 35 for producing a fusion image by fusion of the monochrome imaged image and the color imaged image with the monochrome imaged image as a reference, for each image of the moving image. The fusion decision processing section 36-3 sets a synthesis ratio in such a way that switching to fusion image data produced in the fusion processing section 35 in the case where it is decided that deterioration of image (Continued)

quality is not caused in the fusion processing, and switching to demosaic image data produced in a demosaic processing section 34 in the case where it is decided that the deterioration is caused are successively performed with a lapse of time. An imaged image of high-image quality can be produced by using imaged images acquired in a plurality of imaging sections.

17 Claims, 34 Drawing Sheets

(51) Int. Cl.
*H04N 5/232* (2006.01)
*G03B 15/00* (2006.01)
*H04N 5/225* (2006.01)

(52) U.S. Cl.
CPC ......... *H04N 5/232* (2013.01); *H04N 5/23238* (2013.01)

(56) References Cited

U.S. PATENT DOCUMENTS

| | | |
|---|---|---|
| 2013/0229544 A1 | 9/2013 | Bando |
| 2018/0007285 A1* | 1/2018 | Fang ................. H04N 5/265 |
| 2019/0014249 A1* | 1/2019 | Zhu ................. H04N 5/23254 |

FOREIGN PATENT DOCUMENTS

| | | |
|---|---|---|
| EP | 2387232 A2 | 11/2011 |
| EP | 2518995 A1 | 10/2012 |
| JP | 2011-151798 A | 8/2011 |
| JP | 2011-239259 A | 11/2011 |
| JP | 2013-183353 A | 9/2013 |
| JP | 2013-219525 A | 10/2013 |
| JP | 2015-088824 A | 5/2015 |
| KR | 10-2011-0125172 A | 11/2011 |
| RU | 2011117481 A | 11/2012 |
| TW | 201208366 A1 | 2/2012 |
| WO | 2011/078244 A1 | 6/2011 |

\* cited by examiner

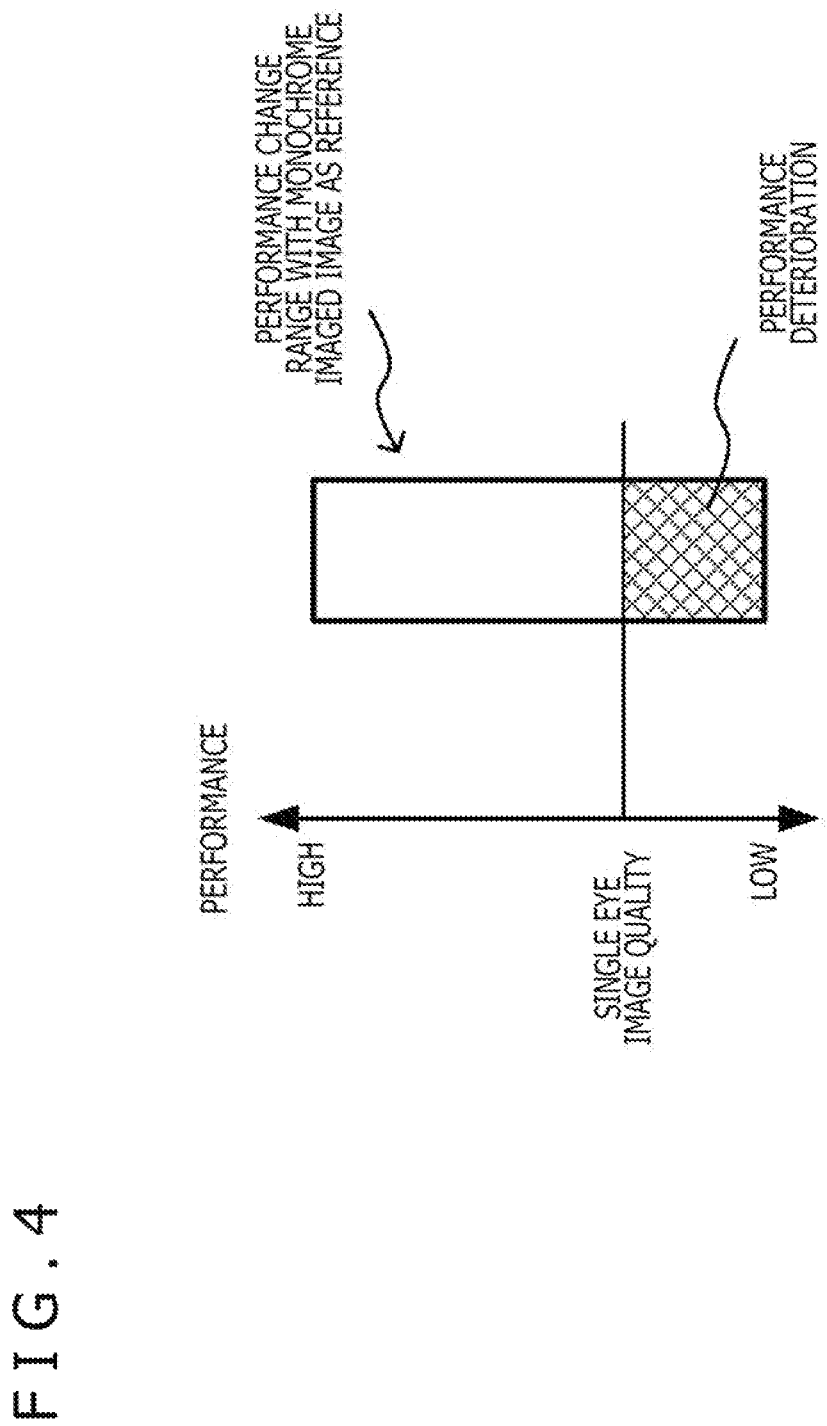

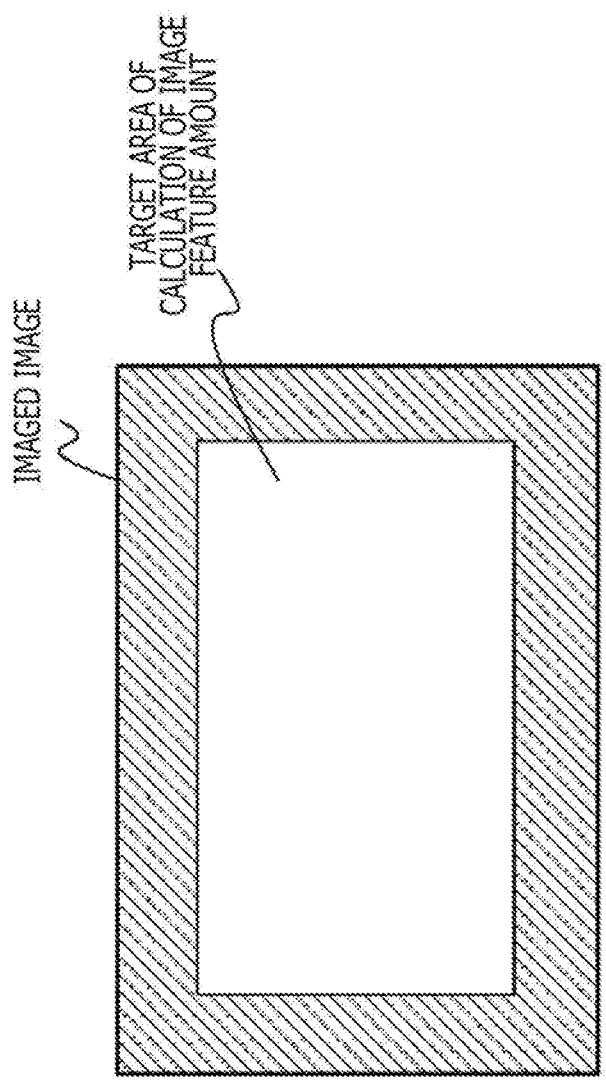

FIG. 18

| CAMERA FEATURE AMOUNT | DECISION THRESHOLD VALUE FOR IMAGE FEATURE AMOUNT | | THRESHOLD VALUE SETTING REASON |
|---|---|---|---|
| ISO SENSITIVITY | DECISION THRESHOLD VALUE FOR PARALLAX | DECISION THRESHOLD VALUE FOR SATURATION | |
| LOW | LOW | LOW | REASON 1 |
| ---- | ---- | ---- | |
| MIDDLE | MIDDLE | MIDDLE | REASON 2 |
| ---- | ---- | ---- | |
| HIGH | HIGH | HIGH | REASON 3 |

FIG. 19

| CAMERA FEATURE AMOUNT | | DECISION THRESHOLD VALUE FOR IMAGE FEATURE AMOUNT | | THRESHOLD VALUE SETTING REASON |
|---|---|---|---|---|
| ISO SENSITIVITY | FOCUS POSITION | DECISION THRESHOLD VALUE FOR PARALLAX | DECISION THRESHOLD VALUE FOR SATURATION | |
| LOW | SHORT DISTANCE | LOW | LOW | REASON 4 |
| ---- | | ---- | ---- | |
| MIDDLE | | LOW | LOW | REASON 4 |
| ---- | | ---- | ---- | |
| HIGH | | MIDDLE | MIDDLE | REASON 4 |
| LOW | OTHERS | LOW | LOW | REASON 1 |
| ---- | | ---- | ---- | |
| MIDDLE | | MIDDLE | MIDDLE | REASON 2 |
| ---- | | ---- | ---- | |
| HIGH | | HIGH | HIGH | REASON 3 |

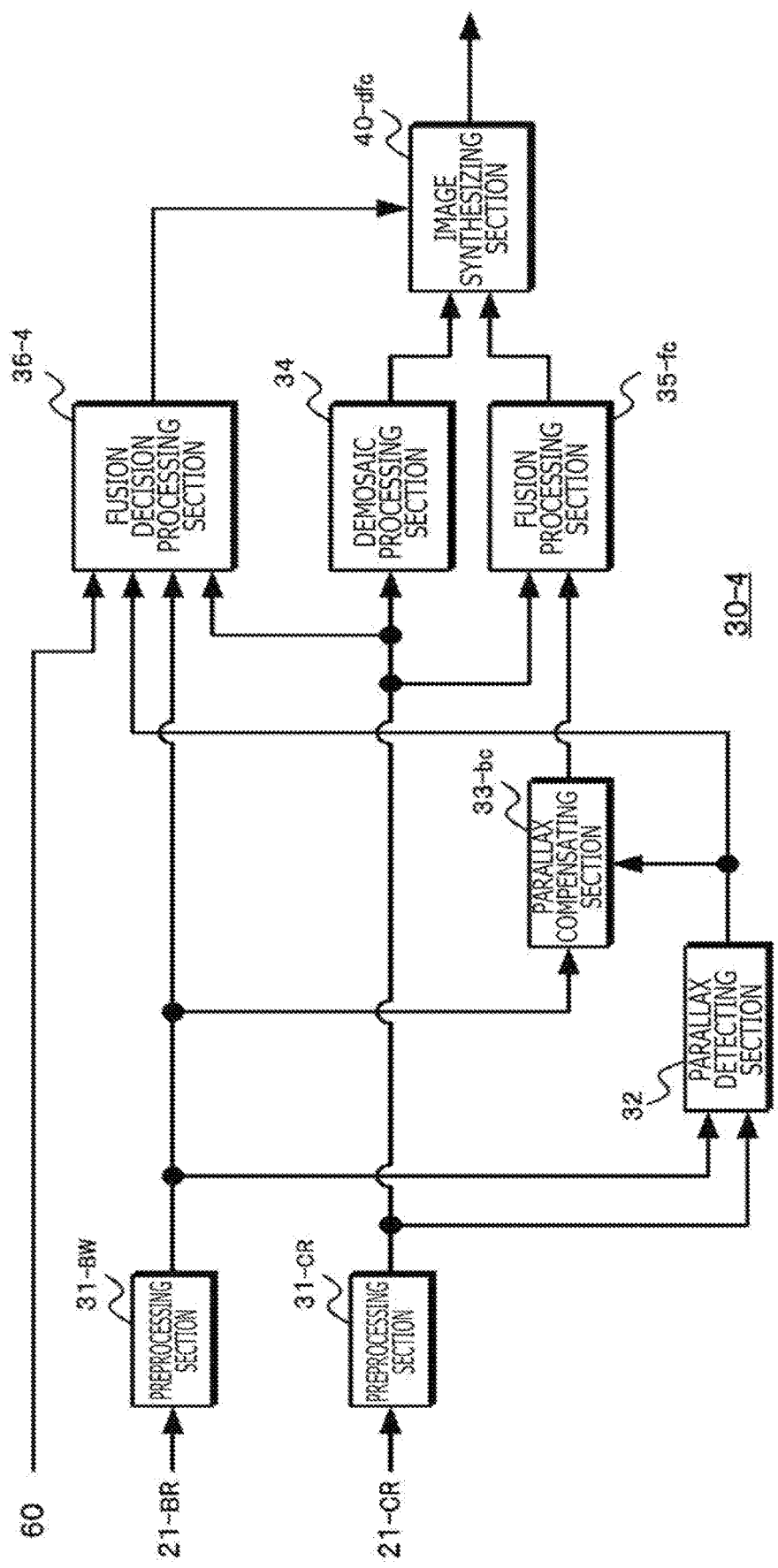
F I G . 2 8

IMAGE PROCESSING APPARATUS AND IMAGE PROCESSING METHOD

CROSS REFERENCE TO RELATED APPLICATIONS

This application is a U.S. National Phase of International Patent Application No. PCT/JP2017/016735 filed on Apr. 27, 2017, which claims priority benefit of Japanese Patent Application No. JP 2016-144172 filed in the Japan Patent Office on Jul. 22, 2016. Each of the above-referenced applications is hereby incorporated herein by reference in its entirety.

TECHNICAL FIELD

The present technology relates to an image processing apparatus and an image processing method each of which enables a high-image quality imaged image to be produced by using imaged images acquired in a plurality of imaging sections.

BACKGROUND ART

Heretofore, an information processing terminal such as a portable type electronic apparatus, for example, a smartphone has been more reduced in image quality performance of an imaging section than a single-lens reflex camera or the like because of miniaturization/thinning. For this reason, for example, PTL 1 states that an imaged image produced by a camera which is attachable/detachable to/from an information processing terminal is supplied to the information processing terminal in a wireless communication manner. In addition, PTL 2 discloses that a plurality of imaging sections are provided, and a plurality of images, for example, an image of a first angle of view, and an image of a second angle of view narrower than the first angle of view are simultaneously produced.

CITATION LIST

Patent Literature

[PTL 1]
Japanese Patent Laid-Open No. 2015-088824
[PTL 2]
Japanese Patent Laid-Open No. 2013-219525

SUMMARY

Technical Problem

Incidentally, the detachable camera is larger in size than the imaging section of the information processing terminal. Thus, in the case where the detachable camera is to be utilized, the communication with the information processing terminal needs to be established. For this reason, the manipulation for obtaining the satisfactory imaged image is troublesome, and thus the portability is reduced. In addition, even if a plurality of imaging sections are provided, the images which can be acquired are images corresponding to the pieces of performance of the respective imaging sections.

In the light of the foregoing, it is an object to provide an image processing apparatus and an image processing method each of which enables a high-image quality imaged image to be produced by using imaged images acquired in a plurality of imaging sections.

Solution to Problem

A first aspect of the present technology is an image processing apparatus including a fusion decision processing section that performs, based on a feature amount calculated by using a moving image of a first imaged image obtained by imaging a subject and a second imaged image obtained by imaging the subject from a different point-of-view position, fusion decision as to whether or not deterioration of image quality is caused in a fusion image obtained by fusion of the first imaged image and the second imaged image with the first imaged image as a reference, for each image of the moving image. The fusion decision processing section includes a fusion decision processing section that changes, based on a result of the fusion decision and the feature amount, a synthesis ratio in such a way that with respect to the fusion image and the second imaged image, one image is switched over to the other image with a lapse of time.

With the present technology, the fusion decision processing section performs, based on the feature amount calculated by using the moving image of the first imaged image, for example, a monochrome imaged image obtained by imaging the subject, and the second imaged image, for example, a color imaged image obtained by imaging the subject from the different point-of-view position, the fusion decision as to whether or not the deterioration of the image quality is caused in the production of the fusion image obtained by the fusion of the monochrome imaged image and the color imaged image with the monochrome imaged image as the reference, for each image of the moving image.

In the case where the fusion decision processing section decides that the deterioration of the image quality is not caused, the fusion decision processing section performs the switching over to the fusion image. In the case where the fusion decision processing section decides that the deterioration of the image quality is caused, the fusion decision processing section performs the switching over to the color imaged image. Along with the lapse of time, the fusion decision processing section successively changes the synthesis ratio, and switches one image over to the other image. The synthesis ratio is set in such a way that the speed of switching from the fusion image over to the color imaged image becomes equal to or higher than the speed of switching from the color imaged image over to the fusion image. In addition, the switching speed is set in response to a change amount of the feature amount.

In addition, the image processing apparatus further includes an image synthesizing section that performs processing for synthesizing the fusion image and the color imaged image in accordance with the synthesis ratio set by the fusion decision processing section and produces synthetic image data. The image synthesizing section synthesizes the fusion image and the color imaged image at the rate according to the synthesis ratio and produces an intermediate image in middle of the image switching. Alternatively, the image synthesizing section produces an image in a point-of-view position according to the synthesis ratio from the color imaged image and sets the resulting image as an intermediate image in middle of the image switching.

In addition, the fusion decision processing section, for example, calculates the feature amount based on a parallax between a monochrome imaged image and the color imaged image, and compares the feature amount thus calculated and a decision threshold value previously set with each other, thereby deciding whether or not deterioration of image quality is caused based on the comparison result. The fusion decision processing section sets a statistic indicating a dispersion of the parallaxes for each pixel as the feature amount, and in the case where the dispersion of the parallaxes is larger than a decision threshold value previously set, decides that the deterioration of the image quality is caused. In the case where a time change of the statistic indicating the dispersion is larger than a change threshold value previously set, the fusion decision processing section makes the speed of switching from the fusion image over to the color imaged image higher than a predetermined switching speed. In addition, the fusion decision processing section sets a rate of pixels exceeding a parallax amount in a predetermined range in the parallaxes for each pixel as the feature amount, and in the case where the rate of the pixels exceeding the parallax amount in the predetermined range is larger than a rate of a decision threshold value, decides that the deterioration of the image quality is caused. In the case where a time change of the rate is larger than a change threshold value previously set, the fusion decision processing section makes the speed of switching from the fusion image over to the color imaged image higher than the predetermined switching speed. In addition, the fusion decision processing section calculates, for each pixel, an absolute value of a parallax difference between a pixel located apart in a parallel direction from the pixel of interest by a predetermined distance and a pixel located apart in a reverse direction from the pixel of interest by the predetermined distance, sets a rate of pixels exceeding in the parallax difference absolute value a predetermined amount as the feature amount, and in the case where the rate of the pixels exceeding the predetermined amount is larger than a rate of the decision threshold value, decides that the deterioration of the image quality is caused. In the case where a time change of the rate is larger than a change threshold value previously set, the fusion decision processing section makes the speed of switching from the fusion image over to the color imaged image higher than a predetermined switching speed.

In addition, the fusion decision processing section calculates the feature amount based on saturation of the pixels of the monochrome imaged image and the color imaged image. The fusion decision processing section calculates a feature amount based on a difference between the number of pixels equal to or larger than a saturation decision setting value in luminance component image data produced from image data associated with the color imaged image and the number of pixels equal to or larger than a saturation decision setting value in image data associated with the monochrome imaged image, and decides that the deterioration of the image quality is caused in the case where the feature amount is larger than a decision threshold value. In the case where a time change in difference between the numbers of pixels is larger than a change threshold value previously set, the fusion decision processing section makes the speed of switching from the image data of the fusion image over to the image data of the color imaged image higher than a predetermined switching speed.

In addition, the fusion decision processing section produces luminance component image data and color component image data from image data associated with the color imaged image, and in the case where a difference between a dispersion of the luminance component image data and a dispersion of the color component image data is larger than a decision threshold value, decides that the deterioration of the image quality is caused. In the case where a time change in difference between the dispersions is larger than a change threshold value previously set, the fusion decision processing section makes the speed of switching from the fusion image over to the color imaged image higher than a predetermined switching speed. In addition, the fusion decision processing section sets a time change in a difference in signal level between an end portion area of the monochrome imaged image and an end portion area of the color imaged image as the feature amount, and in the case where the time change in signal level difference is larger than a decision threshold value previously set, decides that the deterioration of the image quality is caused.

A second aspect of the present technology is an image processing method including: based on a feature amount calculated by using a moving image of a first imaged image obtained by imaging a subject and a second imaged image obtained by imaging the subject from a different point-of-view position, performing fusion decision as to whether or not deterioration of image quality is caused in a fusion image obtained by fusion of the first imaged image and the second imaged image with the first imaged image as a reference, for each image of the moving image; and based on a result of the fusion decision and the feature amount, changing a synthesis ratio in such a way that with respect to the fusion image and the second imaged image, one image is switched over to the other image with a lapse of time.

Advantageous Effect of Invention

According to the present technology, the fusion decision processing section performs, based on a feature amount calculated by using a moving image of a first imaged image obtained by imaging a subject and a second imaged image obtained by imaging the subject from a different point-of-view position, fusion decision as to whether or not deterioration of image quality is caused in a fusion image obtained by fusion of the first imaged image and the second imaged image with the imaged image as a reference, for each image of the moving image. The fusion decision processing section changes, based on the result of the fusion decision and the feature amount, a synthesis ratio in such a way that with respect to the fusion image and the second imaged image, one image is switched over to the other image with a lapse of time. For this reason, the imaged image of the high-image quality in which the image switching is inconspicuous can be produced by using the imaged images acquired in a plurality of imaging sections. It should be noted that the effect described in this description is merely the exemplification, and is by no means limited. In addition, an additional effect may be offered.

BRIEF DESCRIPTION OF DRAWINGS

FIG. 4 is a view for explaining image quality obtained by executing fusion processing.

FIG. 8 is a view exemplifying a target area of calculation of an image feature amount.

FIG. 18 is a diagram depicting a relation between a camera feature amount and a decision threshold value (in the case where ISO sensitivity is set as a camera feature amount).

FIG. 19 is a diagram depicting the relation between the camera feature amount and the decision threshold value (in the case where the ISO sensitivity and a focus position are set as a camera feature amount).

FIG. 28 is a block diagram exemplifying a configuration of a fourth embodiment.

DESCRIPTION OF EMBODIMENTS

Hereinafter, modes for carrying out the present technology will be described. It should be noted that the description will be given in accordance with the following order.

1. Configuration of Apparatus to Which Image Processing Apparatus is Applied
2. First Embodiment of Image Processing Apparatus
2-1. Configuration of First Embodiment
2-2. Operation of First Embodiment
3. Second Embodiment of Image Processing Apparatus
3-1. Configuration and Operation of Second Embodiment
4. Third Embodiment of Image Processing Apparatus
4-1. Configuration of Third Embodiment
4-2. Operation of Third Embodiment
5. Fourth Embodiment of Image Processing Apparatus
5-1. Configuration and Operation of Fourth Embodiment
6. Fifth Embodiment of Image Processing Apparatus
6-1. Configuration and Operation of Fifth Embodiment
7. Other Embodiments
8. Application Examples <1. Configuration of Apparatus to which Image Processing Apparatus is Applied>

Figure 1A:
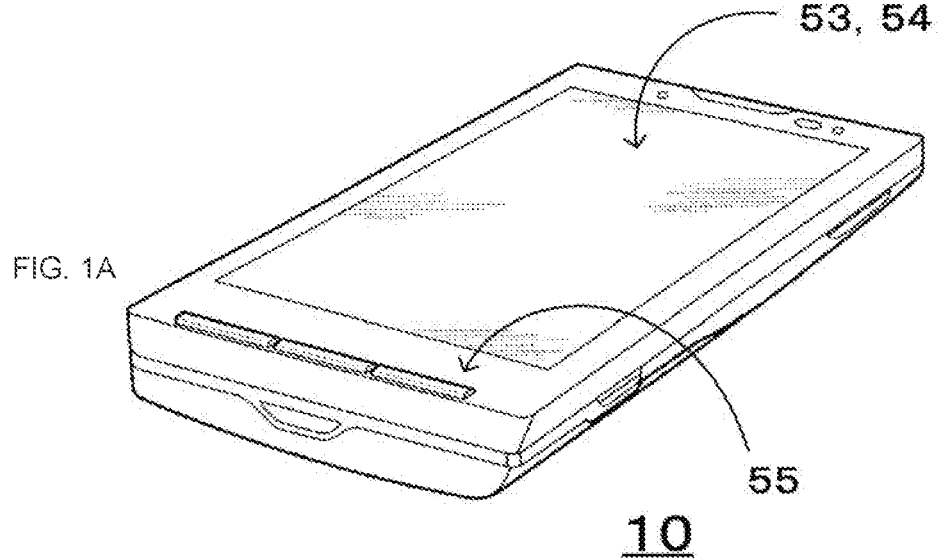
FIGS. 1A and 1B are views exemplifying external appearance of an apparatus to which an image processing apparatus is applied.
Figure 1B:
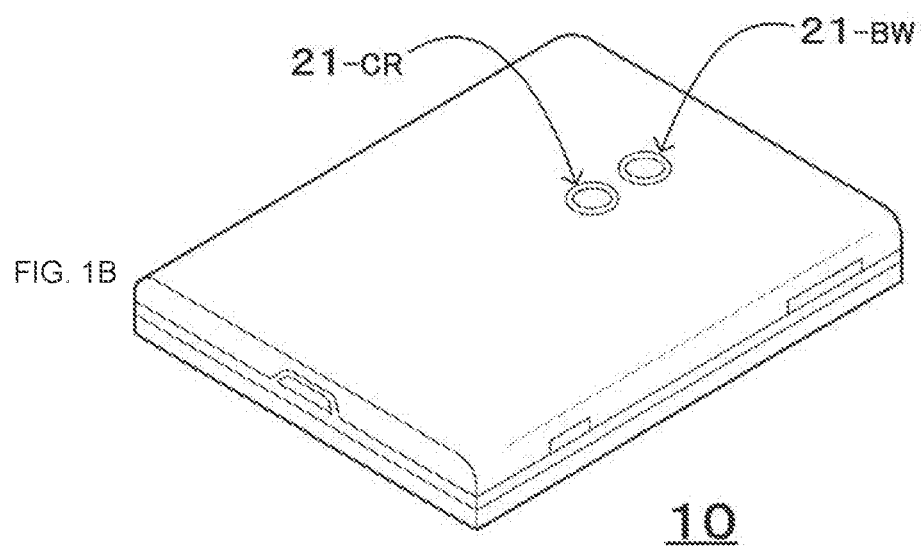

FIGS. 1A and 1B exemplifies external appearance of an apparatus to which an image processing apparatus of the present technology is applied. It should be noted that in the following description, for example, the image processing apparatus is applied to an information processing terminal. FIG. 1A depicts a front side of an information processing terminal 10, and a display section 53 and a manipulation section 55 are provided on the front side. FIG. 1B depicts a back side of the information processing terminal 10, and a plurality of imaging sections, for example, two imaging sections 21-BW and 21-CR are provided on the back side.

Figure 2:
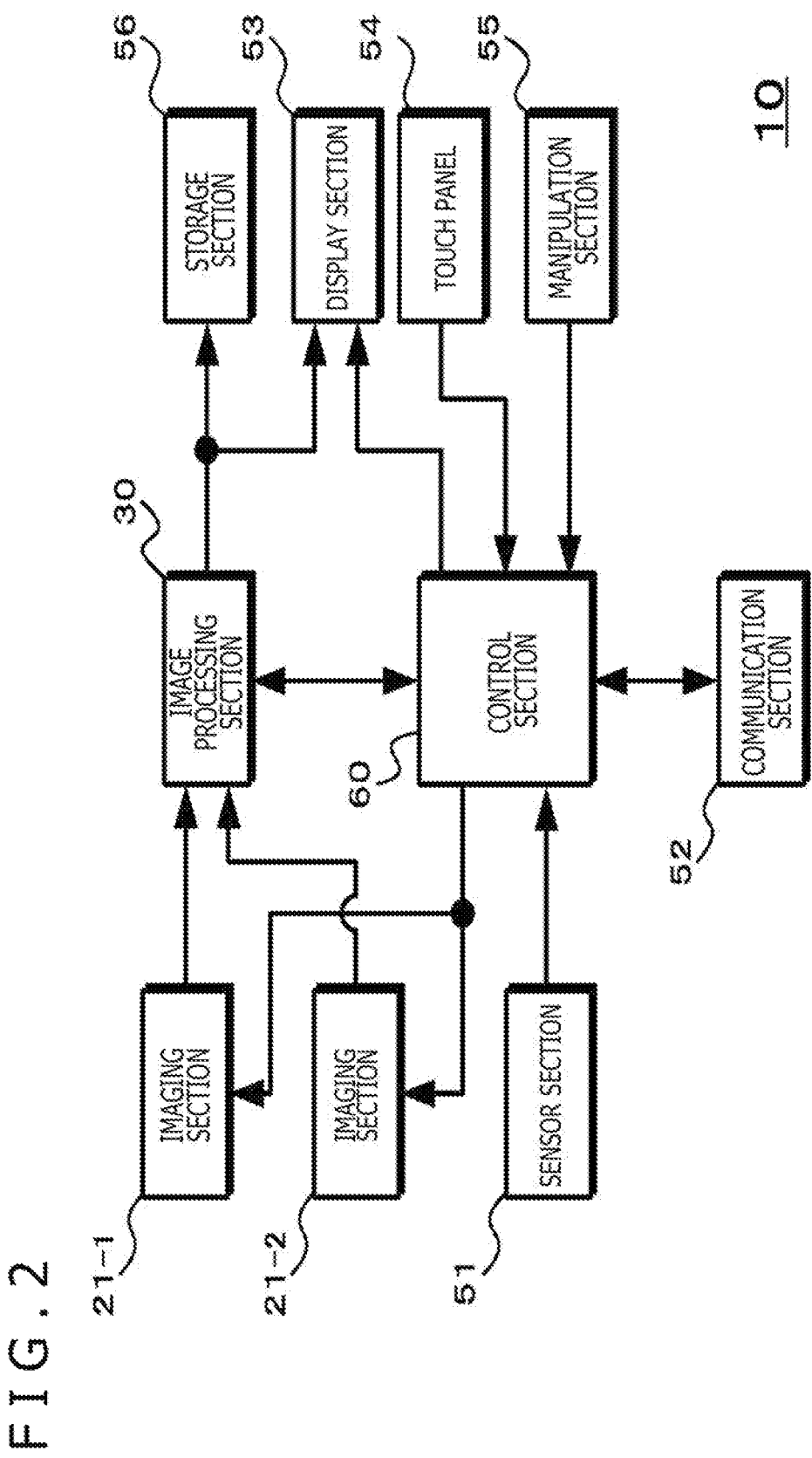
FIG. 2 is a block diagram exemplifying a configuration of an information processing terminal.

FIG. 2 exemplifies a configuration of the information processing terminal. The information processing terminal 10 has a plurality of imaging sections, for example, two imaging sections 21-BW and 21-CR, an image processing section 30, a sensor section 51, a communication section 52, a display section 53, a touch panel 54, a manipulation section 55, a storage section 56, and a control section 60. The image processing section 30 corresponds to an image processing apparatus of the present technology.

The imaging sections 21-BW and 21-CR, as depicted in FIG. 1B, are provided on the same surface side of the information processing terminal 10. The imaging sections 21-BW and 21-CR are each configured by using an imaging element such as a Complementary Metal Oxide Semiconductor (CMOS) image sensor, perform photoelectric conversion of light taken in by a lens (not depicted) to produce image data associated with an imaged image, and output the image data to the image processing section 30. In addition, the imaging sections 21-BW and 21-CR have a difference in characteristics.

Figure 3B:
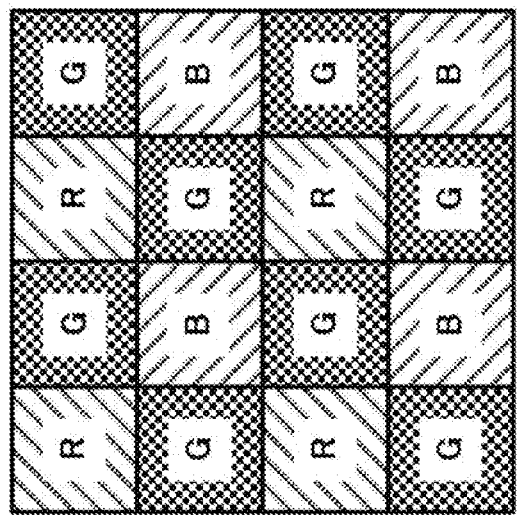
FIGS. 3A and 3B are diagrams exemplifying a pixel array in an imaging section.
Figure 3A:
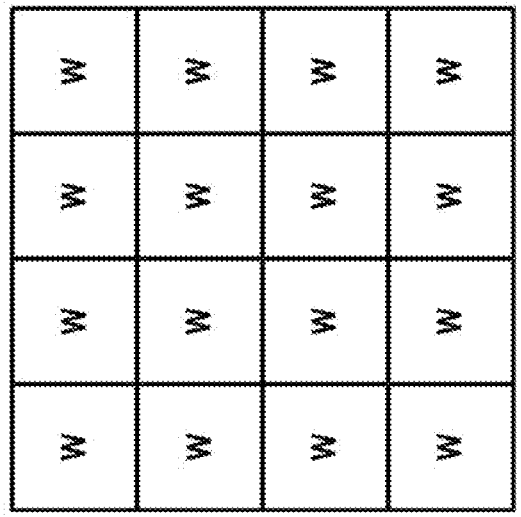

FIGS. 3A and 3B exemplifies a pixel array of the imaging section. FIG. 3A depicts a pixel array of the imaging section 21-BW. In the imaging section 21-BW, all the pixels are configured by white (W) pixels which output electrical signals based on an amount of incident light in the entire wavelength range of visible light. Therefore, the imaging section 21-BW produces the image data associated with the monochrome imaged image. It should be noted that in the image processing apparatus of the present technology, the image data associated with the monochrome imaged image produced in the imaging section 21-BW, for example, is set as first imaged image data of a first imaged image.

FIG. 3B depicts a pixel array of the imaging section 21-CR. The imaging section 21-CR, for example, is configured by using a color filter in which red (R) pixels, blue (B) pixels, and green (G) pixels are arranged in Bayer array. In the Bayer array, in a pixel unit of 2×2 pixels, two pixels located in diagonal positions are the green (G) pixels, and the remaining pixels are the red (R) pixel and the blue (B) pixel. That is, pixels in the imaging section 21-CR are the color pixels which are adapted to output the electrical signals based on the amounts of incident light of the respective color components of red, blue, and green. Therefore, the imaging section 21-CR produces the image data associated with the color imaged images indicating the respective three primary colors (RGB) in the pixels. It should be noted that in the image processing apparatus of the present technology, the image data associated with the color imaged images produced in the imaging section 21-CR, for example, is set as second imaged image data associated with a second imaged image.

The image processing section 30 obtains a high-sensitivity imaged image by using the imaged images acquired in the imaging sections 21-BW and the imaging sections 21-CR without reducing the image quality. That is, the image processing section 30 executes the image processing by using the imaged images acquired in the imaging section 21-BW and the imaging section 21-CR, respectively, to produce the imaged image having the high sensitivity without reducing the image quality as compared with that of each of the imaged images individually acquired in the imaging sections 21-BW and the imaging sections 21-CR, and outputs the imaged image to the display sections 53 and the storage section 56. It should be noted that details of a configuration and an operation of the image processing section 30 will be described later.

The sensor section 51 is configured by using a gyro sensor or the like, and detects shaking or the like caused in the information processing terminal 10. The sensor section 51 outputs the information associated with the shaking thus detected to the control section 60.

The communication section 52 makes communication with an apparatus on a network such as a Local Area Network (LAN) or the Internet.

The display section 53 performs the display of the imaged image based on the image data supplied thereto from the image processing section 30, and the display of the menu picture, various kinds of application pictures or the like based on the information signal from the control section 60. In addition, the touch panel 54 is placed on a display surface side of the display section 53, and the display section 53 is configured in such a way that a GUI function can be utilized.

The manipulation section 55 is configured by using manipulation switches and the like, and produces a manipulation signal according to a user manipulation to output the manipulation signal to the control section 60.

The storage section 56 stores information produced in the information processing terminal 10, for example, the image data supplied thereto from the image processing section 30, and various kinds of pieces of information used to carry out the communication or the application in the information processing terminal 10.

The control section 60 includes a Central Processing Unit (CPU), a Read Only Memory (ROM), a Random Access Memory (RAM) (not depicted), and the like. The control section 60 executes a program stored in either the ROM or the RAM to control the operations of the sections in such a way that an operation according to the user manipulation for the touch panel 54 or the manipulation section 55 is performed in the information processing terminal 10.

It should be noted that the information processing terminal 10 is by no means limited to the configuration depicted in FIG. 2 and, for example, may be provided with an encoding processing section for encoding the image data to store the encoded image data in the storage section 56, a resolution transforming section for aligning the image data with the resolution of the display section, and the like.

Figure 5:
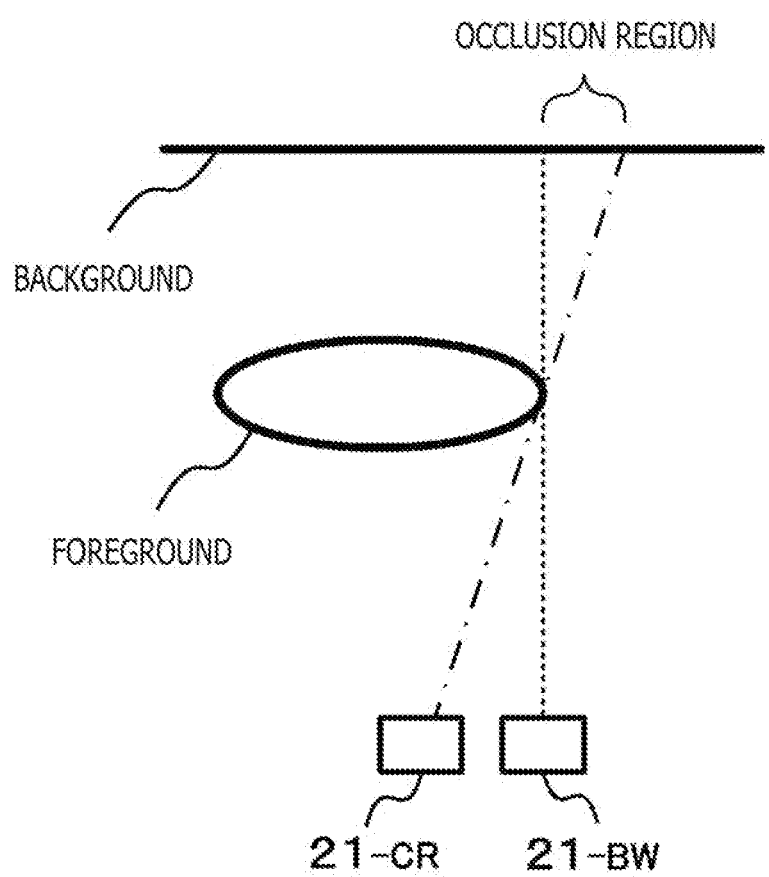
FIG. 5 is a view depicting occlusion when a monochrome imaged image is set as a reference.

2. First Embodiment of Image Processing Apparatus 2-1. Configuration of First Embodiment An image processing section 30-1 of the first embodiment executes fusion processing by using a monochrome imaged image acquired in the imaging section 21-BW, and the color imaged image acquired in the imaging section 21-CR. FIG. 4 is a view for explaining the image quality obtained by executing the fusion processing. For example, when after the color imaged image is aligned with the monochrome imaged image as a reference, the fusion is performed to produce a fusion image, the luminance can be increased in response to the characteristics of the lens and the sensor which are used in the imaging section 21-BW. However, since the imaging section 21-BW is different in point of view from the imaging section 21-CR, as compared with a distant view, in a close view, a risk in which color shift is caused becomes high. In addition, occlusion is more increased in the close view than in the distant view. FIG. 5 depicts the occlusion when the monochrome imaged image acquired in the imaging section 21-BW is set as the reference. When the occlusion is caused due to the parallax, there is no image data corresponding to the occlusion area in the color imaged image acquired in the imaging section 21-CR. For this reason, as will be described later, in a fusion image produced by executing fusion processing, an image in which color information is lacked in the occlusion region is provided. Moreover, as compared with the pixel of the distant view, in the pixel of the close view, there is also the possibility that the pixel corresponding to the pixel of interest in one imaged image exceeds the search range of the parallax detection, so that it may be impossible to calculate a parallax vector. Therefore, the fusion image obtained by executing the fusion processing is more deteriorated in image quality than the color imaged image acquired in the imaging section 21-CR in some cases.

In addition, since the imaging section 21-BW is higher in sensitivity than the imaging section 21-CR using the color filter, when the luminance of the subject becomes high, the saturation of the pixel is easy to occur as compared with the imaging section 21-CR. When the number of pixels each saturating in the monochrome imaged image in such a manner becomes large, the fusion image becomes the color image which is deteriorated in image quality resulting from that the high luminance sections of the subject are more saturated as compared with the color imaged image acquired in the imaging section 21-CR.

For this reason, the image processing section 30-1 performs the fusion decision as to whether or not the deterioration of the image quality due to the parallax or the saturation of the pixel is caused based on the imaged image. The image processing section 30-1 selects either the fusion image or the color imaged image acquired in the imaging section 21-CR in response to the fusion decision result, thereby outputting the high-sensitivity color imaged image having the image quality equal to or higher than that of color imaged image acquired in the imaging section 21-CR.

Figure 6:
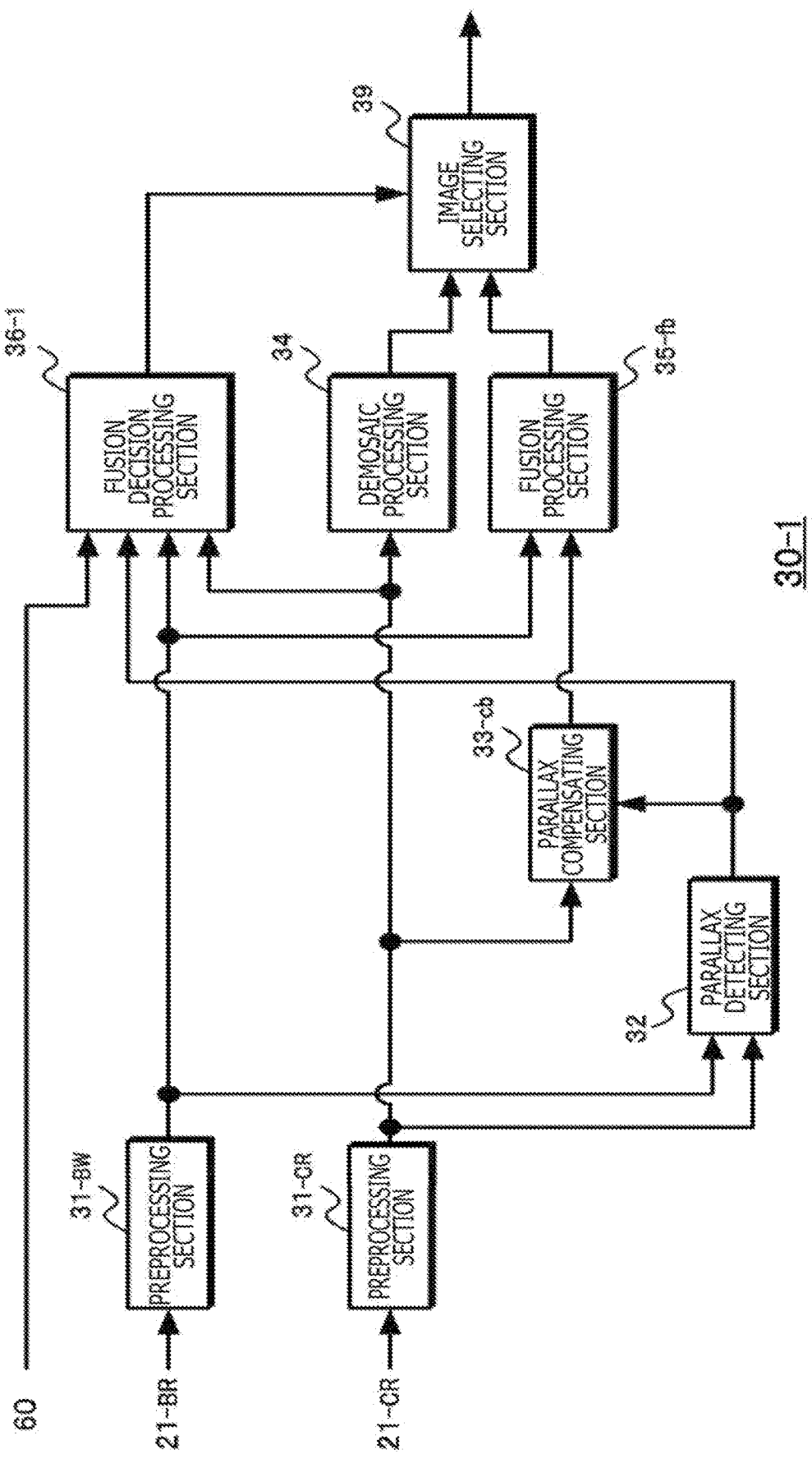
FIG. 6 is a block diagram exemplifying a configuration of a first embodiment.

FIG. 6 exemplifies a configuration of the first embodiment. The image processing section 30-1 has a preprocessing sections 31-BW and 31-CR, a parallax detecting section 32, a parallax compensating section 33-*cb*, a demosaic processing section 34, a fusion processing section 35-*fb*, a fusion decision processing section 36-1, and an image selecting section 39.

The preprocessing section 31-BW executes correction processing such as lens distortion correction, a defective pixel correction for the image data associated with the monochrome imaged image acquired in the imaging section 21-BW. The preprocessing section 31-BW outputs the image data after the correction (hereinafter referred to as "monochrome image data") to the parallax detecting section 32, the fusion processing section 35-*fb* and the fusion decision processing section 36-1.

The preprocessing section 31-CR executes the correction processing such as the lens distortion correction, the defective pixel correction for the image data associated with the color imaged image acquired in the imaging section 21-CR. The preprocessing section 31-CR outputs the image data after the correction (hereinafter referred to as "pre-demosaic color image data") to the parallax detecting section 32, the parallax compensating section 33-*cb*, the demosaic processing section 34, and the fusion decision processing section 36-1.

The parallax detecting section 32 performs the parallax detection based on the monochrome image data supplied thereto from the preprocessing section 31-BW, and the pre-demosaic color image data supplied thereto from the preprocessing section 31-CR to produce parallax information indicating the detected parallax between them. The imaging section 21-BW and the imaging section 21-CR, as depicted in FIG. 1B, performs the imaging from the different point-of-view positions. Therefore, the imaged images acquired in the imaging section 21-BW and the imaging section 21-CR become the images having the parallax. Therefore, the parallax detecting section 32 produces the parallax information indicating the parallax for each pixel based on the respective pieces of image data supplied thereto from the preprocessing section 31-BW and the preprocessing section 31-CR.

The parallax detecting section 32 produces the parallax information by executing corresponding point detecting processing such as block matching. For example, the parallax detecting section 32 sets the imaged image acquired in one of the imaging sections 21-BW and 21-CR as a reference imaged image, and detects the block area, on the other imaged image, which is most similar to a reference block area with a position of interest on the reference imaged image as the reference. The parallax detecting section 32 calculates a parallax vector indicating a difference in position between the detected block area and the reference block area. In addition, the parallax detecting section 32 calculates the parallax with each of the pixels on the reference imaged image as the position of interest, produces the parallax information indicating the parallax vector calculated for each pixel, and outputs the parallax information thus produced to the parallax compensating section 33-*cb* and the fusion decision processing section 36-1.

The parallax compensating section 33-*cb* performs the parallax compensation for the pre-demosaic color image data based on the parallax information supplied thereto from the parallax detecting section 32. The parallax compensating section 33-*cb* performs the movement of the pixel positions, based on the parallax information produced in the parallax detecting section 32, for the pre-demosaic color image data supplied thereto from the preprocessing section 31-CR, and produces parallax compensation color image data as a point of view of the monochrome imaged image acquired in the imaging section 21-BW. The parallax compensation section 33-*cb* outputs the parallax compensation color image data thus produced to the fusion processing section 35-*fb*.

The demosaic processing section 34 executes demosaic processing by using the pre-demosaic color image data supplied thereto from the preprocessing section 31-CR. In the demosaic processing, there is executed the demosaic processing for producing the three primary colors image data indicating the color components of red, blue, green for each pixel from the pre-demosaic color imaged data indicating color components of red, blue, and green by the pixels, respectively. The demosaic processing section 34 outputs the three primary colors image data produced by executing the demosaic processing (hereinafter referred to as "demosaic image data") to the image selecting section 39.

The fusion processing section 35-*fb* executes the fusion processing by using the monochrome image data supplied thereto from the preprocessing section 31-BW, and the parallax compensation color image data supplied thereto from the parallax compensating section 33-*cb*. That is, the fusion processing section 35-*fb* uses the monochrome imaged image data, and the color imaged image data after the parallax compensation, thereby executing the fusion processing with the monochrome imaged image as the reference as described with reference to FIG. 4. The fusion processing section 35-*fb* outputs the fusion image data produced by executing the fusion processing to the image selecting section 39.

The fusion decision processing section 36-1 performs fusion decision as to whether or not the deterioration of the image quality is caused in the fusion image obtained by fusion of the monochrome imaged image and the color imaged image with the monochrome imaged image as the reference based on the feature amount calculated by using the monochrome imaged image acquired by imaging the subject, and the color imaged image acquired by imaging the subject from the different point-of-view position. The fusion decision processing section 36-1 determines whether any of the fusion image or the color imaged image is outputted based on the fusion decision result. It is determined whether to select. For example, the fusion decision processing section 36-1 performs fusion decision as to whether or not the deterioration of the image quality resulting from the parallax and the saturation of the pixel is caused in the fusion processing based on the monochrome data and the pre-demosaic color image data. In addition, the fusion decision processing section 36-1 produces an image selection signal in response to a fusion decision result, and outputs the image selection signal thus produced to the image selecting section 39.

In the case where it is decided that the deterioration of the image quality is not caused in the fusion image, the image selecting section 39 selects the fusion image data produced in the fusion processing section 35-*fb* based on the image selection signal supplied thereto from the fusion decision processing section 36-1, and outputs the fusion image data. In addition, in the case where it is decided that the deterioration of the image quality is caused in the fusion image, the image selecting section 39 selects the demosaic image data produced in the demosaic processing section 34 based on the image selection signal supplied thereto from the fusion decision processing section 36-1, and outputs the demosaic image data. In such a manner, the image selecting section 39 selects either the fusion image data or the demosaic image data based on the image selection signal supplied thereto from the fusion decision processing section 36-1, and outputs the high-sensitivity color image data having the image quality equal to or higher than that of the color imaged image acquired in the imaging section 21-CR.

Figure 7:
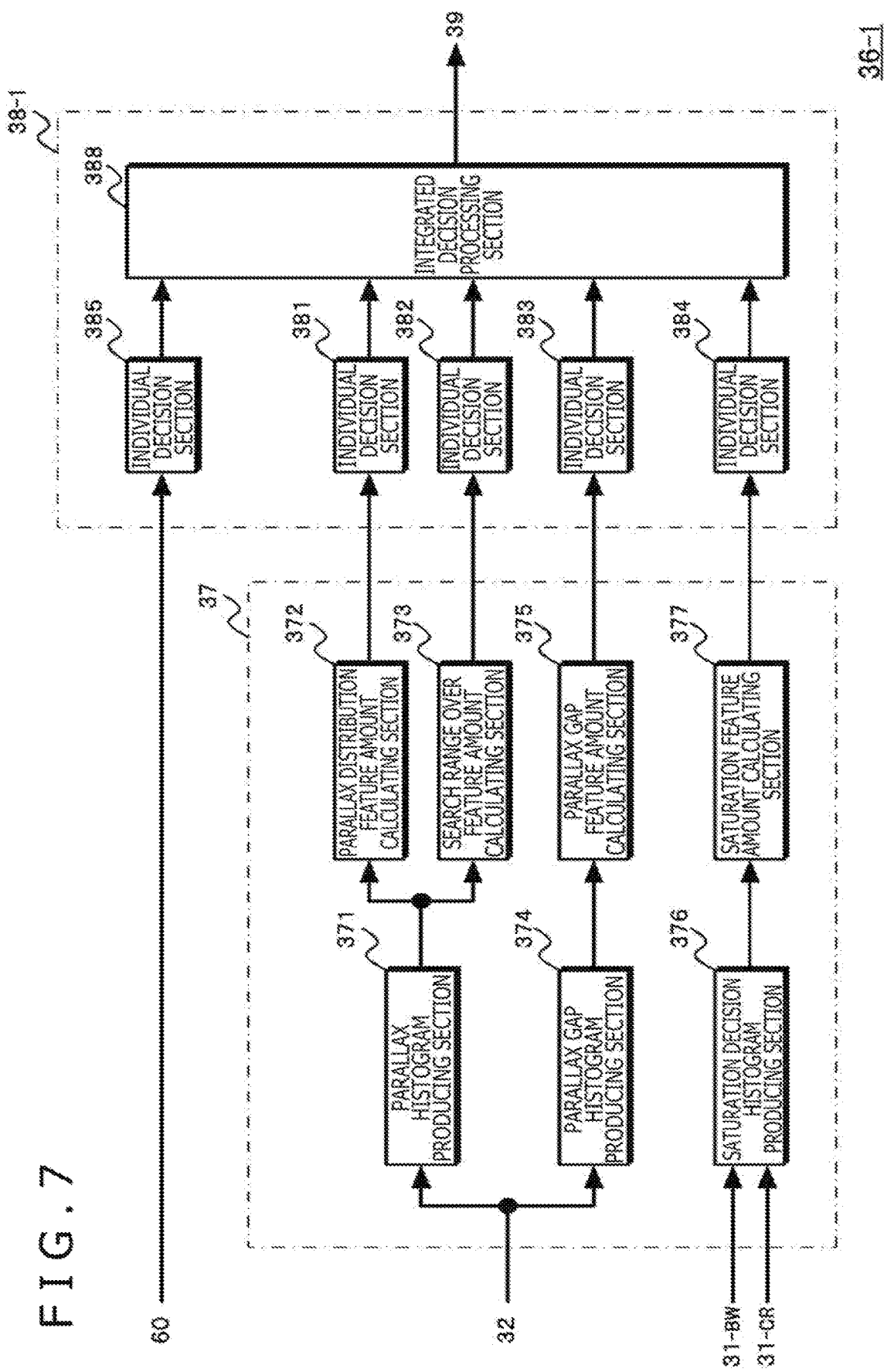
FIG. 7 is a block diagram exemplifying a configuration of a fusion decision processing section.

Next, a description will be given with respect to a configuration of the fusion decision processing section. FIG. 7 exemplifies a configuration of the fusion decision processing section. The fusion decision processing section 36-1 has an image feature amount calculating section 37 and the image data selection deciding section 38-1.

The image feature amount calculating section 37 calculates an image feature amount used to perform the decision of the deterioration of the image quality due to the parallax and the saturation of the pixel. The image feature amount calculating section 37 has a parallax histogram producing section 371, a parallax distribution feature amount calculating section 372, a search range over feature amount calculating section 373, a parallax gap histogram producing section 374, and a parallax gap feature amount calculating section 375 as functional blocks which calculates the image feature amount for performing the decision of the deterioration of the image quality due to the parallax. In addition, the image feature amount calculating section 37 has a saturation decision histogram producing section 376, and a saturation feature amount calculating section 377 as functional blocks which calculate the image feature amount for performing the decision of the deterioration of the image quality due to the saturation of the pixel. Incidentally, the image feature amount calculating section 37 may set the entire imaged image as a calculation target area of the image feature amount, or may set the calculation target area except for an area (indicated by slant lines) in the up and down, and left and right in the imaged image as depicted in FIG. 8. In such a manner, if the calculation target area is set except for the area on the end portion side, then, it becomes possible to prevent that it may be impossible to calculate the parallax, a parallax gap distance which will be described later, and the like resulting from that, for example, the pixel of interest is located in the position of the side end, and thus the image feature can be accurately calculated. In addition, the calculation coat required for the production of the histogram, and the like can also be reduced.

Figure 9A:
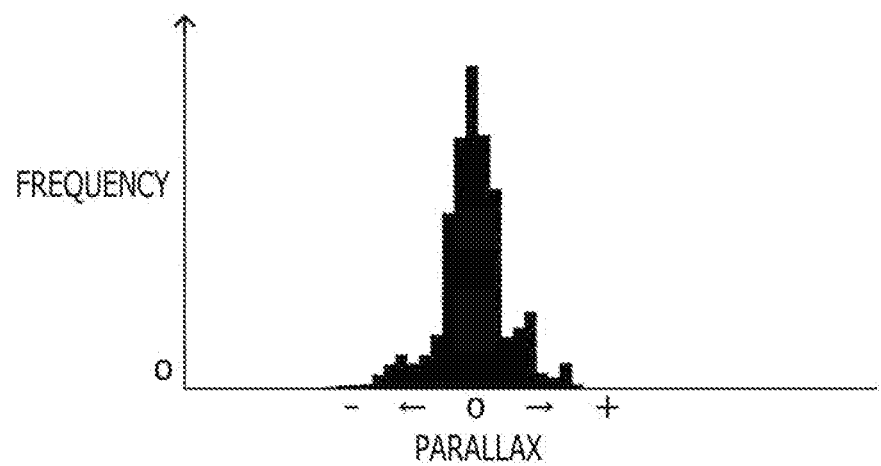
FIGS. 9A, 9B, and 9C are graphs exemplifying a parallax histogram.

The parallax histogram producing section 371 produces the histogram by using the parallax vectors calculated with respect to the pixels in the calculation target area. It should be noted that FIGS. 9A, 9B, and 9C exemplifies a parallax histogram: FIG. 9A exemplifies a parallax histogram of the imaged images in a state in which the subjects are close to the same plane; and FIG. 9B exemplifies a parallax histogram of the imaged images in which distances to the subjects are different from one another. In the parallax histogram, a peak occurs in a position located apart from the parallax "0" in a minus direction depending on a difference in distance. FIG. 9C exemplifies a parallax histogram of the imaged images in a state in which a plurality of parallaxes occur because the distances to the subject are different from one another, and the large parallax occurs because the subjects come close to one another. In this parallax histogram, since as compared with FIG. 9B, the subjects come close to one another, so that the large parallax occurs, a peak occurs in a position located more apart from the parallax in a minus direction as compared with the case of FIG. 9B.

The parallax distribution feature amount calculating section 372 calculates the statistic indicating the feature of the parallax distribution as a parallax distribution feature amount from the parallax histogram produced in the parallax histogram producing section 371. The parallax distribution feature amount calculating section 372, for example, calculates standard deviation as the statistic amount indicating the feature of the parallax distribution, and sets the standard deviation thus calculated as a parallax distribution feature amount FVfsd. For example, the parallax distribution feature amount calculated from the histogram of FIG. 9A is set as "FVfsd-a," the parallax distribution feature amount calculated from the histogram of FIG. 9B is set as "FVfsd-b," and the parallax distribution feature amount calculated from the histogram of FIG. 9C is set as "FVfsd-c." In this state, the parallax distribution feature amounts satisfy "FVfsd-a<FVfsd-b, FVfsd-c." In such a manner, if the standard deviation of the parallax histogram is calculated as the parallax distribution feature amount FVfsd in the parallax distribution feature amount calculating section 372, then, an image data selection deciding section 38-1 which will be described later can decide whether the subjects are close to the same plane or there are a plurality of parallaxes on the basis of the parallax distribution feature amount FVfsd.

The search range over feature amount calculating section 373 calculates the search range over feature amount $FV_{osr}$ indicating a rate of the frequency (over_search_range_counter) at which the parallaxes each over the search range previously set occur to the entire frequency (counter) from the parallax histogram produced in the parallax histogram producing section 371. The search range over feature amount calculating section 373 performs the calculation of Expression (1) by using the parallax histogram to calculate the search range over feature amount $FV_{osr}$:

$$FV_{osr}=\text{over\_search\_range\_counter/counter}*100 \qquad (1)$$

Figure 9B:
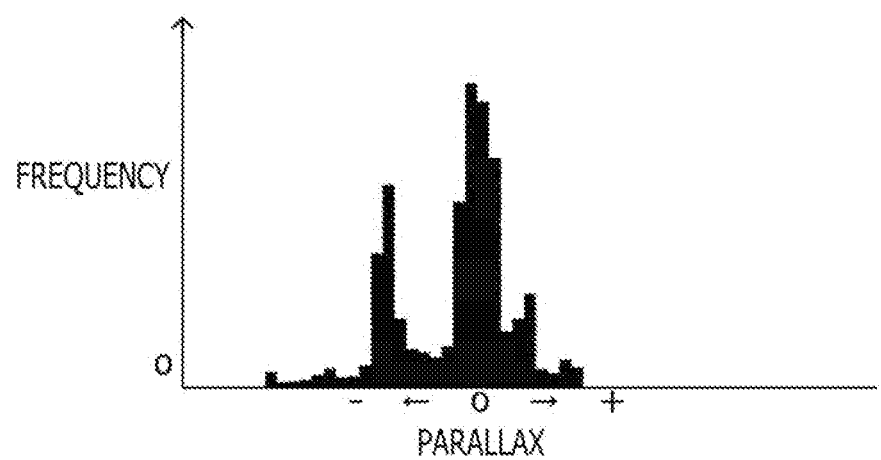
Figure 9C:
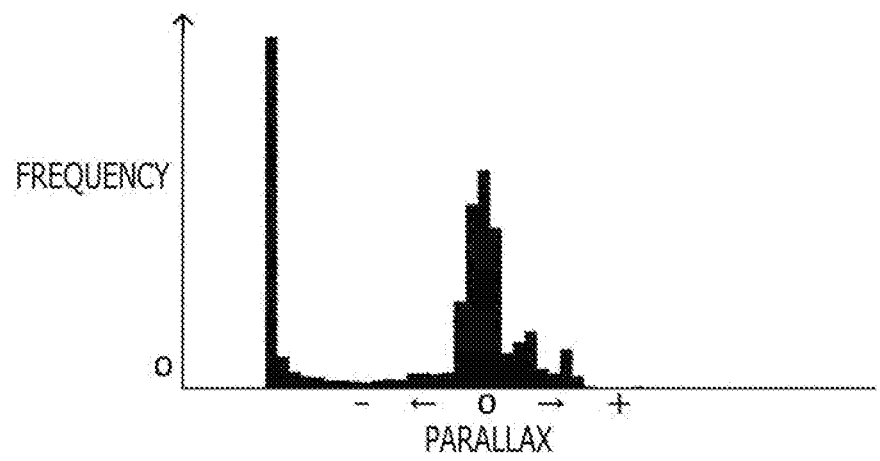

For example, the search range over feature amount calculated from the histogram of FIG. 9A is set as "FVosr-a." In addition, the search range over feature amount calculated from the histogram of FIG. 9B is set as "FVosr-b," and the search range over feature amount calculated from the histogram of FIG. 9C is set as "FVosr-c." In this case, the search range over feature amounts satisfy "FVosr-a, FVosr-b<FVosr-c." In such a manner, if the search range over feature amount calculating section 373 calculates the search range over feature amount FVosr, then, the image data selection deciding section 38-1 which will be described later can decide whether or not the subjects causing the large parallax are imaged based on the search range over feature amount FVosr. That is, the occurrence situation of the area in which the occlusion occurs can be decided.

Figure 10:
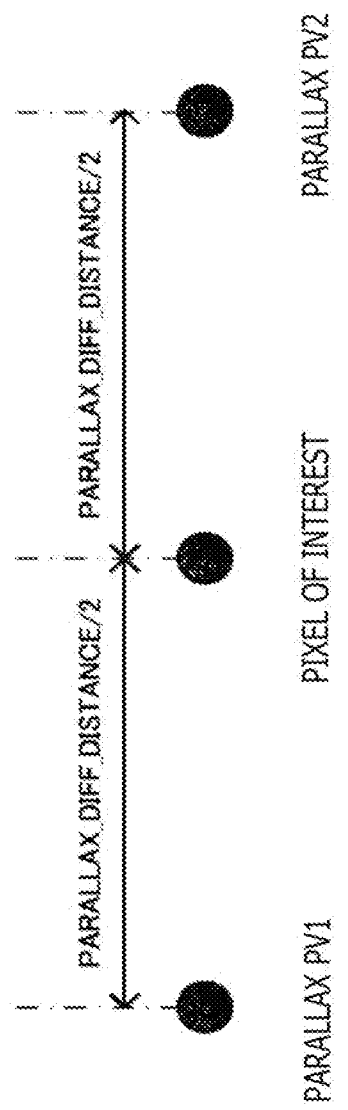
FIG. 10 is a view for explaining a parallax difference absolute value.

The parallax gap histogram producing section 374 produces a parallax gap histogram. FIG. 10 is a view for explaining a parallax difference absolute value used to produce the parallax gap histogram. The parallax gap histogram producing section 374, as depicted in FIG. 10, calculates the parallax PV1 in a position horizontally located apart from the position of the pixel of interest in the calculation target area by the pixels of "−(PARALLAX_DIFF_DISTANCE)/2." In addition, the parallax gap histogram producing section 374 calculates the parallax PV2 in a position horizontally located apart from the position of the pixel of interest by the pixels of "(PARALLAX_DIFF_DISTANCE)/2," thereby calculating a parallax difference absolute value $PV_{apd}$ indicated in Expression (2). It should be noted that the parallax gap distance (PARALLAX_DIFF_DISTANCE) is previously set.

$$PV_{apd}=\text{ABS}(PV1-PV2) \qquad (2)$$

Figure 11:
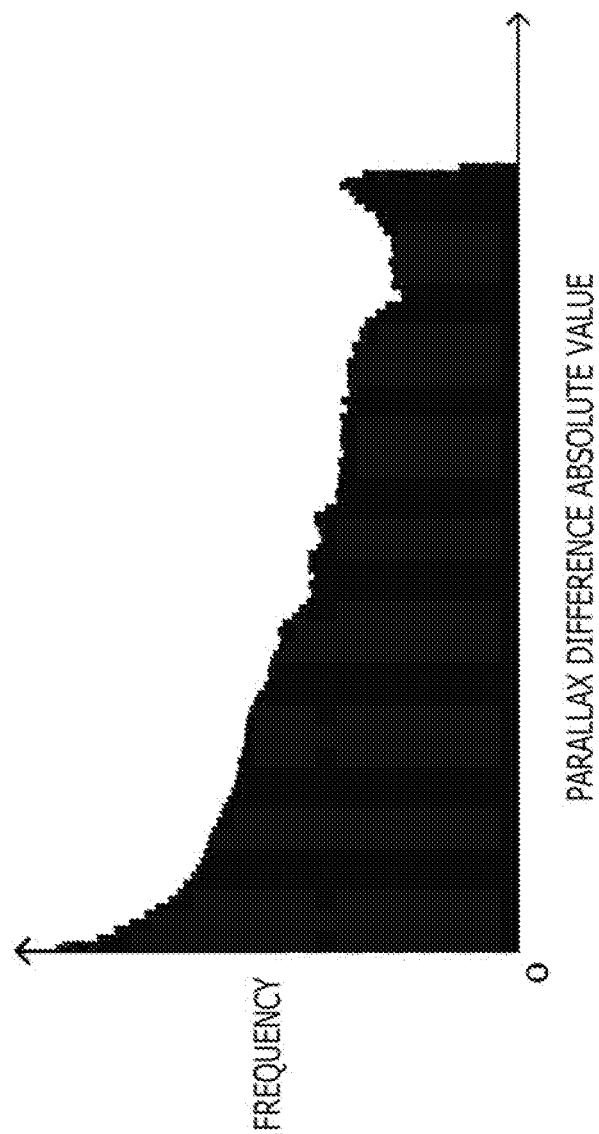
FIG. 11 is a graph exemplifying a parallax gap histogram.

For example, in the case where the subjects are in a state in which they are close to the same plane, since the difference between the parallax PV1 and the parallax PV2 is small, the value of the parallax difference absolute value $PV_{apd}$ becomes small. In addition, for example, if the distances to the subjects are different from one another, and the pixel of interest is a boundary between the subjects to which the distances are different from each other, then, since the difference between the parallax PV1 and the parallax PV2 is large, the value of the parallax difference absolute value $PV_{apd}$ becomes large. The parallax gap histogram producing section 374 produces the parallax gap histogram as the histogram of the parallax difference absolute values $PV_{apd}$ calculated with each of the pixels in the calculation target area as the pixel of interest. It should be noted that FIG. 11 exemplifies the parallax gap histogram.

The parallax gap feature amount calculating section 375 calculates the parallax gap feature amount $FV_{pd}$ from the parallax gap histogram produced in the parallax gap histogram producing section 374. The parallax gap feature amount calculating section 375 calculates the parallax gap feature amount $FV_{pd}$ indicating the rate of the frequency (large_parallax_diff_counter) at which the parallax gaps each over the maximum parallax gap distance previously set from the parallax gap histogram are generated to the entire frequency (counter). The parallax gap feature amount calculating section 375 calculates the calculation of Expression (3) by using the parallax gap histogram, thereby calculating the parallax gap feature amount $FV_{pd}$.

$$FV_{pd}=\text{large\_parallax\_diff\_counter/counter}*100 \quad (3)$$

In such a manner, the parallax gap feature amount $FV_{pd}$ calculated in the parallax gap feature amount calculating section 375 indicates the rate of the pixels in which the maximum parallax gap distance is caused. Here, since the subjects lying on the same plane exhibit the small parallax gap, and the parallax gap is large in the image boundary portion of the subjects having the different distances, the occurrence situation of the image boundary of the subjects having the largely different distances can be decided.

The saturation decision histogram producing section 376 produces the pixel value histogram indicating the frequency (the number of pixels) for each pixel value based on the monochrome image data supplied thereto from the preprocessing section 31-BW. In addition, the saturation decision histogram producing section 376 produces luminance data by color space transformation of the pre-demosaic color imaged image data supplied thereto from the preprocessing section 31-CR, and produces the pixel value histogram indicating the frequency (the number of pixels) for each pixel value based on the luminance data thus produced.

Figure 12A:
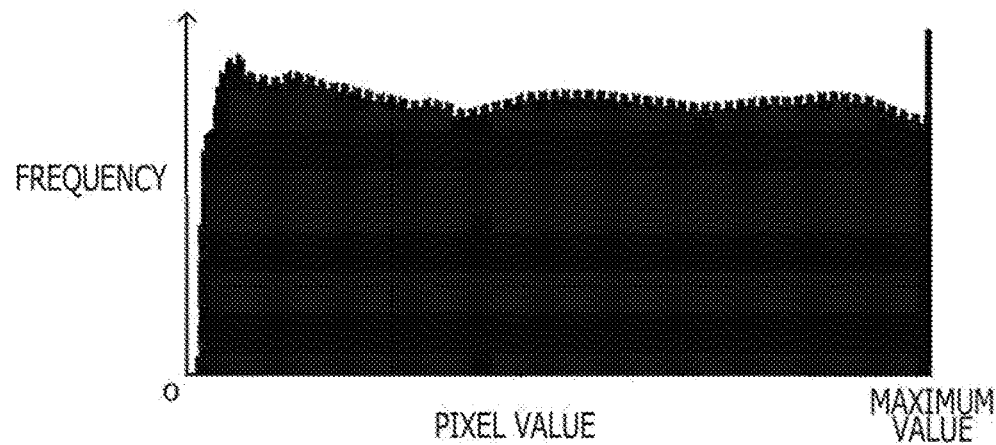
FIGS. 12A and 12B are graphs exemplifying a pixel value histogram.
Figure 12B:
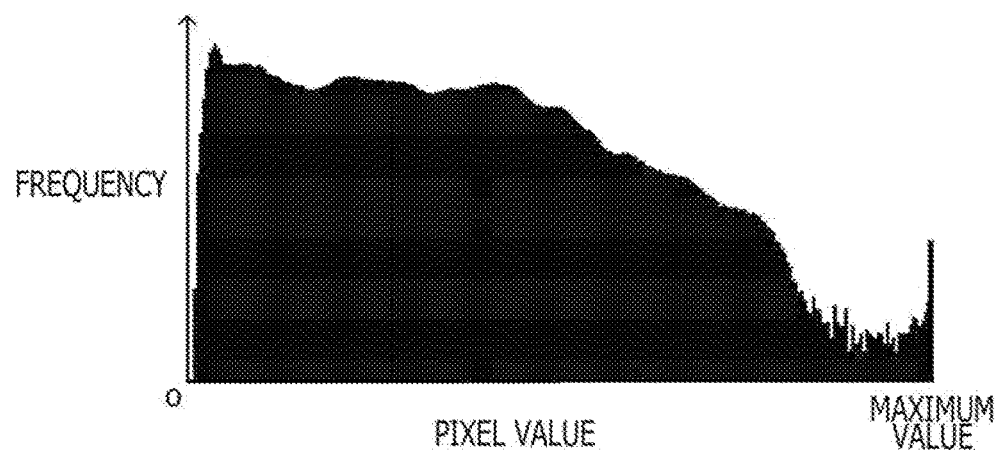

FIGS. 12A and 12B exemplifies a pixel value histogram. It should be noted that FIG. 12A depicts a pixel value histogram based on the monochrome imaged image, and FIG. 12B depicts a luminance histogram based on the color imaged image. As described above, since the imaging section 21-BW is configured by the white (W) pixels all of which output the electrical signals based on the amount of incident light in the entire wavelength region of the visible light, the imaging section 21-BW is higher in sensitivity than the imaging section 21-CR using the color filter. Therefore, in the case where the subjects having the same luminance are imaged, in the pixel value histogram based on the monochrome imaged images acquired in the imaging section 21-BW, the frequency in the area having the high signal value becomes high as compared with the case of the luminance value histogram based on the color imaged images acquired in the imaging section 21-CR.

The saturation feature amount calculating section 377 calculates a saturation feature amount $FV_{sat}$ based on the luminance value histogram produced in the saturation decision histogram producing section 376. The saturation feature amount calculating section 377 calculates the frequency (saturation_counter_W) of the pixel values equal to or larger than a saturation decision setting value (SATURATION_AREA_W) previously set in the pixel value histogram based on the monochrome imaged image and the frequency (saturation_counter_Y) of the pixel values equal to or larger than a saturation decision setting value (SATURATION_COUNTER_Y) previously set in the pixel value histogram based on the color imaged images. In addition, the saturation feature amount calculating section 377 calculates the saturation feature amount FVsat indicating the rate of a difference between the frequency (saturation_counter_W) and the frequency (saturation_counter_Y) to the entire frequency (counter). The saturation feature amount calculating section 377 performs the calculation of Expression (4) by using the pixel value histogram based on the monochrome imaged image, and the pixel value histogram based on the color imaged images, thereby calculating the saturation feature amount $FV_{sat}$:

$$FV_{sat}=(\text{saturation\_counter\_W}-\text{saturation\_counter\_Y})/\text{counter}*100 \quad (4)$$

In such a manner, the saturation feature amount $FV_{sat}$ calculated in the saturation feature amount calculating section 377 indicates a difference in pixel saturation situation between the monochrome image images and the color imaged image. Therefore, for example, in the case where the value of the saturation feature amount is large, it becomes possible to decide that the imaged image of interest is the imaged image in which the deterioration of the image quality resulting from the saturation of the pixel in the fusion processing with the monochrome imaged image as the reference.

The image data selection deciding section 38-1 decides whether or not the deterioration of the image quality is caused in the fusion image based on the image feature amount calculated in the image feature amount calculating section 37, and the camera feature amount acquired from the control section 60 or the like. The image data selection deciding section 38-1 produces an image selection signal based on the decision result, and outputs the resulting image selection signal to the image selecting section 39. The image data selection deciding section 38-1 has individual decision sections 381 to 385, and an integrated decision processing section 388 as functional blocks each of which decides whether or not the deterioration of the image quality is caused.

The individual decision section 381 decides whether or not the deterioration of the image quality is caused in the fusion image based on the parallax distribution feature amount calculated in the parallax distribution feature amount calculating section 372. The individual decision section 381 compares the parallax distribution feature amount $FV_{fsd}$ with a decision threshold value $Th_{fsd}$ previously set for the parallax distribution feature amount. In the case where the parallax distribution feature amount $FV_{fsd}$ is larger than the decision threshold value $Th_{fsd}$, that is, in the case where the dispersion of the parallaxes is large, the individual decision section 381 decides that the deterioration of the image quality is caused. The individual decision section 381 outputs the individual decision result to the integrated decision processing section 388.

The individual decision section 382 decides whether or not the deterioration of the image quality is caused in the fusion image based on the search range over feature amount $FV_{osr}$ calculated in the search range over feature amount calculating section 373. The individual decision section 382 compares the search range over feature amount $FV_{osr}$ with a decision threshold value $Th_{osr}$ previously set for the search range over feature amount. In the case where the search range over feature amount $FV_{osr}$ is larger than the decision threshold value $Th_{osr}$, the individual decision section 382 can decide that the number of areas of the occlusion is large. As described above, since in the fusion image with monochrome imaged image as the reference, the color information is lacked in the area of the occlusion, in the case where the number of areas of the occlusion is increased, the individual decision section 382 decides that the deterioration of the image quality is caused. The individual decision section 382 outputs the individual decision result to the integrated decision processing section 388.

The individual decision section 383 decides whether or not the deterioration of the image quality is caused in the fusion image based on the parallax gap feature amount $FV_{pd}$ calculated in the parallax gap feature amount calculating section 375. The individual decision section 383 compares the parallax gap feature amount $FV_{pd}$ with a decision threshold value $Th_{pd}$ previously set for the parallax gap feature amount. In the case where the parallax gap feature amount $FV_{pd}$ is larger than the decision threshold value $Th_{pd}$, the individual decision section 383 can decide that the number of image boundaries of the subjects having the largely different distances is large. Since the occlusion is easy to be caused in the boundary between the images of the subjects having the largely different distances, the individual decision section 383 decides that the deterioration of the image quality is caused in the case where the number of image boundaries between the subjects having the largely different distances is large. The individual decision section 383 outputs the individual decision result to the integrated decision processing section 388.

The individual decision section 384 decides whether or not the deterioration of the image quality is caused in the fusion image based on the saturation feature amount $FV_{sat}$ calculated in the saturation feature amount calculating section 377. The individual decision section 384 compares the saturation feature amount $FV_{sat}$ with the decision threshold value $Th_{sat}$ previously set for the saturation feature amount. In the case where the saturation feature amount $FV_{sat}$ is larger than the decision threshold value $Th_{sat}$, that is, in the case where the number of saturated image pixels is larger in monochrome imaged image than in the color imaged image, the individual decision section 384 decides that the deterioration of the image quality is caused. The individual decision section 384 outputs the individual decision result to the integrated decision processing section 388.

The individual decision section 385 decides whether or not the deterioration of the image quality is caused in the fusion image based on the camera feature amount. Imaging setting information associated with the brightness at the time of the imaging, the imaging setting information associated with the subject distance is used as the camera feature amount. Since in the case where the subject is bright, the image having the high sensitivity can be acquired in the imaging section 21-CR, the effect of the fusion processing is less as compared with the case where the subject is dark. Therefore, the imaging setting information associated with the brightness at the time of the imaging is used as the camera feature amount. In addition, the occlusion which occurs due to a difference in point of view between the imaging section 21-BW and the imaging section 21-CR is less in the case where the subjects are located apart from each other, and is more in the case where the subjects are located close to each other. Therefore, the imaging setting information associated with the subject distance is used as the camera feature amount. As far as the imaging setting information associated with the brightness at the time of the imaging, for example, setting information such as ISO sensitivity or exposure time of the imaging section 21-BW and the imaging section 21-CR is used. As far as the imaging setting information associated with the subject distance, setting information such as a focus position or zoom magnification is used. The individual decision section 385 acquires the camera information from the imaging section 21-BW and the imaging section 21-CR, and the control section 60. The individual decision section 385 compares the camera feature amount with a decision threshold value previously set for the camera feature amount, and decides whether or not the fusion processing causes the deterioration of the image quality. The individual decision section 385 outputs the individual decision result to the integrated decision processing section 388.

The integrated decision processing section 388 performs the fusion decision by using the individual decision results supplied from the individual decision sections 381 to 385 and produces the image selection signal in response to the fusion decision result to output the image solution signal to the image selecting section 39. For example, in the case where in any one of the individual decision results supplied from the individual decision sections 381 to 385, it is decided that the deterioration of the image quality is caused, the integrated decision processing section 388 decides that in the fusion decision, the fusion processing causes the deterioration of the image quality performance. In addition, in the case where in all the individual decision results supplied from the individual decision sections 381 to 385, it is decided that the deterioration of the image quality is not caused, the integrated decision processing section 388 decides that in the fusion decision, the fusion processing does not cause the deterioration of the image quality performance. The integrated decision processing section 388 produces the image selection signal used to select the demosaic image data in the case where it is decided that in the fusion decision the reduction of the image quality performance is present, and select the fusion image data in the case where it is decided that in the fusion decision the deterioration of the image quality performance is absent, and outputs the image selection signal to the image selecting section 39.

2-2. Operation of First Embodiment

Figure 13:
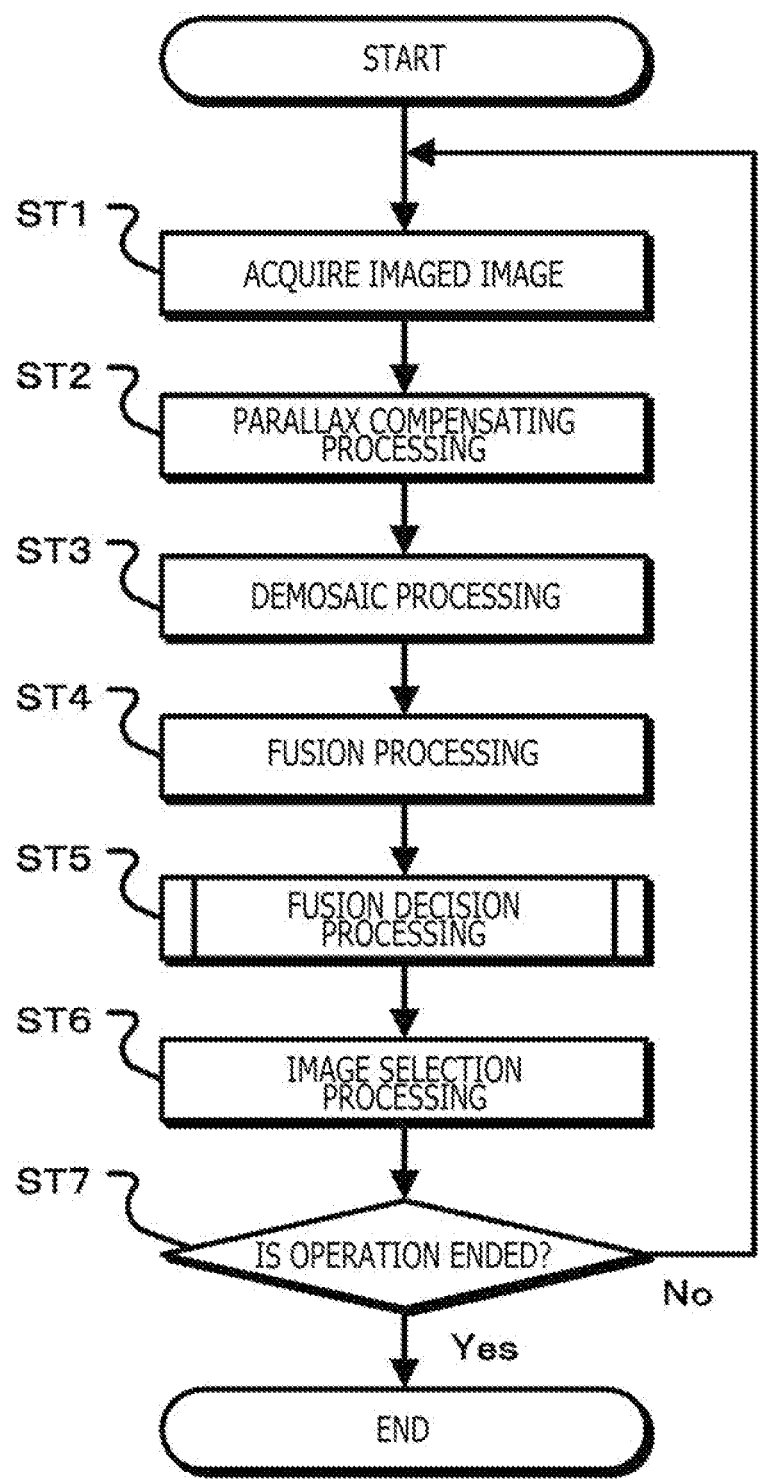
FIG. 13 is a flow chart depicting an operation of the first embodiment.

FIG. 13 is a flow chart depicting an operation of the first embodiment of the image processing section. In Step ST1, the image processing section acquires the imaged image. The image processing section 30-1 acquires the image data associated with the imaged images from the imaging sections 21-BW and 21-CR, and the processing proceeds to Step ST2.

In Step ST2, the image processing section executes the parallax compensating processing. The image processing section 30-1 performs the alignment by using the image data acquired in Step ST1. Then, the image processing section sets the pre-demosaic color image data acquired in the imaging section 21-CR as the image data in a point of view of the monochrome imaged image acquired in the imaging section 21-BW, and the processing proceeds to Step ST3.

In Step ST3, an image processing section executes the demosaic processing. An image processing section 30-1 executes the demosaic processing by using the image data acquired from the imaging section 21-CR, and produces the pieces of demosaic image data having corresponding color components for each pixel. Then, the processing proceeds to Step ST4.

In Step ST4, the image processing section executes the fusion processing. The image processing section 30-1 executes the fusion processing by using the monochrome image data produced in the imaging section 21-BW, and the parallax compensation color image data with which in Step ST2, the parallax compensation is performed, and produces the fusion image data. Then, the processing proceeds to Step ST5.

In Step ST5, the image processing section executes the fusion decision processing. The image processing section executes the fusion decision processing, and discriminates which of the demosaic image data produced in Step ST3, and the fusion image data produced in Step ST4 is selected and outputted, and produces the image selection information.

Figure 14:
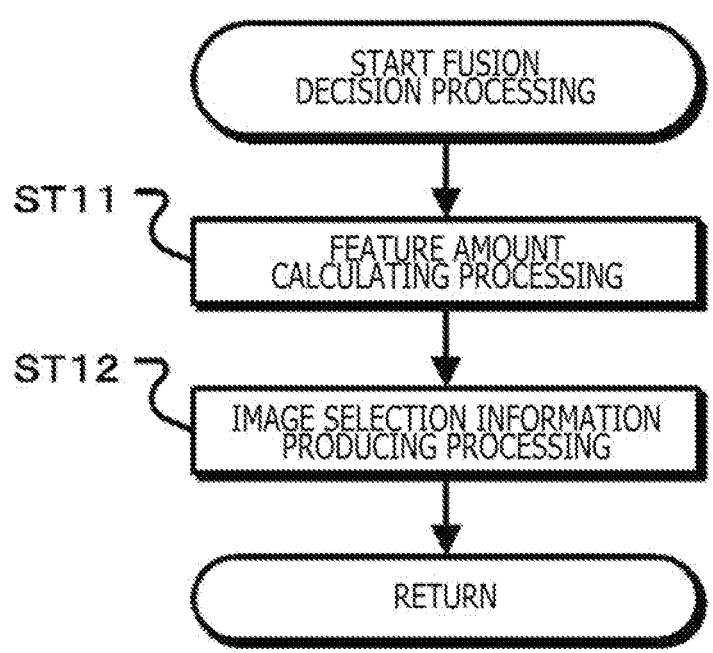
FIG. 14 is a flow chart depicting fusion decision processing.

FIG. 14 is a flow chart depicting the fusion decision processing. In Step ST11, the image processing section executes the feature amount calculating processing. The fusion decision processing section 36-1 of the image processing section 30-1 produces the parallax histogram, the parallax gap histogram, and the saturation decision histogram, and calculates the feature amount based on the histograms thus produced. Then, the processing proceeds to Step ST12.

In Step ST12, the image processing section executes the image selection information producing processing. The fusion decision processing section 36-1 of the image processing section 30-1 compares the feature amount calculated in Step ST11 with a discrimination threshold value previously set for each calculated feature amount. The fusion decision processing section 36-1 performs the fusion decision as to whether or not the deterioration of the image quality is caused in the fusion image based on the comparison result. Moreover, the fusion decision processing section 36-1 produces the image selection information indicating which of the demosaic image data produced in Step ST3, and the fusion image data produced in Step ST4 is selected based on the fusion decision result. Then, the processing proceeds to Step ST6 of FIG. 13.

In Step ST6, the image processing section executes the image selection processing. The image processing section 30-1 selects any one of the demosaic image data produced in Step ST3, and the fusion image data produced in Step ST4 based on the image selection information produced in the fusion decision processing of Step ST5. Then, the processing proceeds to Step ST7.

In Step ST7, the image processing section discriminates whether or not the operation is ended. For example, in the case of the imaging of the still image, the image processing section 30-1 ends the operation because the image processing of the still image is completed. In addition, in the case where preview image (through image) display is performed for the confirmation or the like of the moving image recording or the composition, in the image processing section 30-1, the processing is returned back to Step ST1 in the case where the moving image recording or the preview image display is performed. The operation is ended in the case where an ending operation for the moving image recording or the preview image display is performed. It should be noted that one of the processing in Step ST3 and the processing in Step ST4 may be executed before the other. Moreover, the present technique is by no means limited to the order processing in which the pieces of processing are executed in the order of steps, and pipeline processing or parallel processing may be used.

Figure 15:
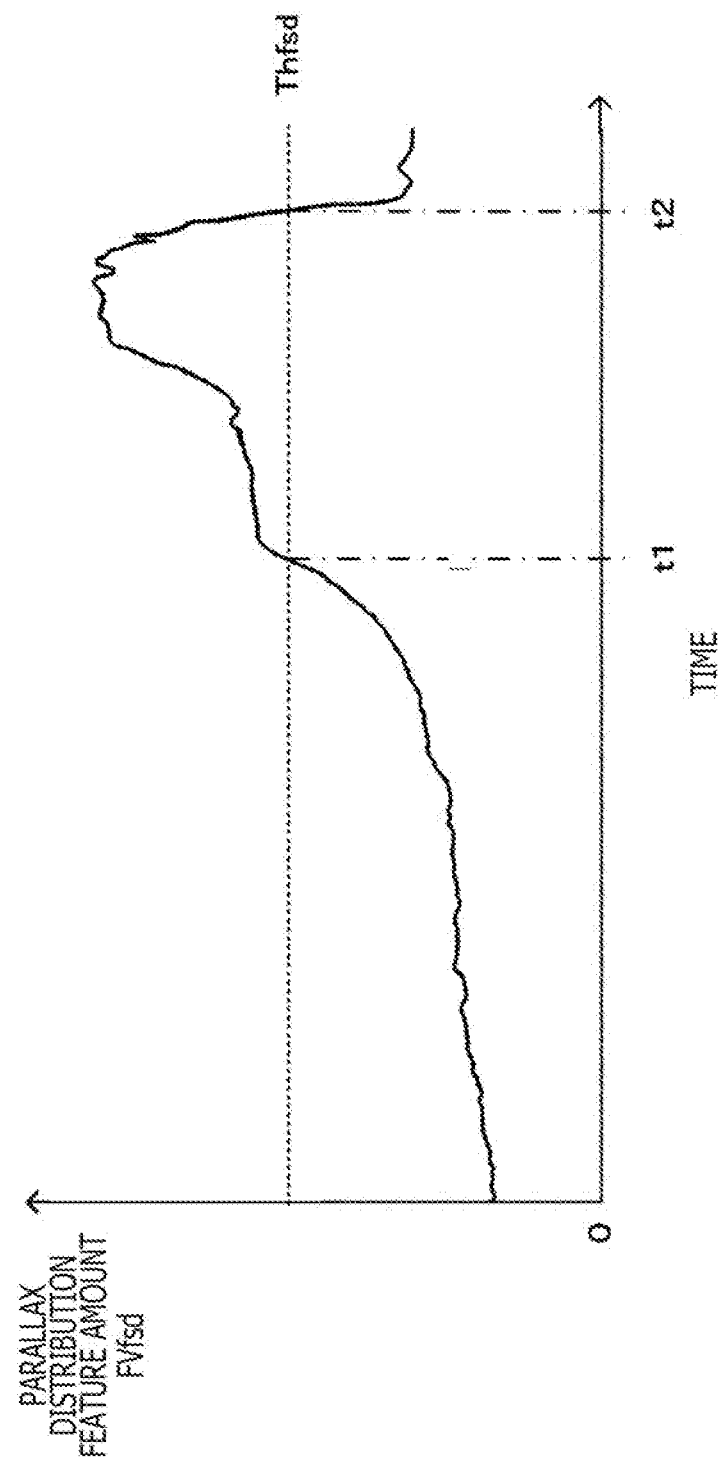
FIG. 15 is a graph exemplifying a parallax distribution feature amount and a decision threshold value.

FIG. 15 exemplifies the parallax distribution feature amount and the decision threshold value. The individual decision section 381 compares the parallax distribution feature amount $FV_{fsd}$ calculated in the parallax distribution feature amount calculating section 372 with the decision threshold value $Th_{fsd}$. The individual decision section 381 decides that the deterioration of the image quality is not caused in the fusion image because until a time point t1, the parallax distribution feature amount $FV_{fsd}$ is equal to smaller than the decision threshold value $Th_{fsd}$, and outputs the individual decision result to the integrated decision processing section 388. In addition, in the case where at the time point t1, the parallax distribution feature amount $FV_{fsd}$ exceeds the decision threshold value $Th_{fsd}$ to be large, the individual decision section 381 decides that the deterioration of the image quality is caused in the fusion image, and outputs the individual decision result to the integrated decision processing section 388. In addition, in the case where at a time point t2, the parallax distribution feature amount $FV_{fsd}$ is equal to smaller than the decision threshold value $Th_{fsd}$, the individual decision section 381 decides that the deterioration of the image quality is not caused in the fusion, and outputs the individual decision result to the integrated decision processing section 388.

In each of the individual decision sections 382 to 385 as well, similarly to the case of the individual decision section 381, the feature amount is compared with the decision threshold value, and it is decided whether or not the deterioration of the image quality is caused in the fusion image. Then, the individual decision result is outputted to the integrated decision processing section 388.

Figure 16:
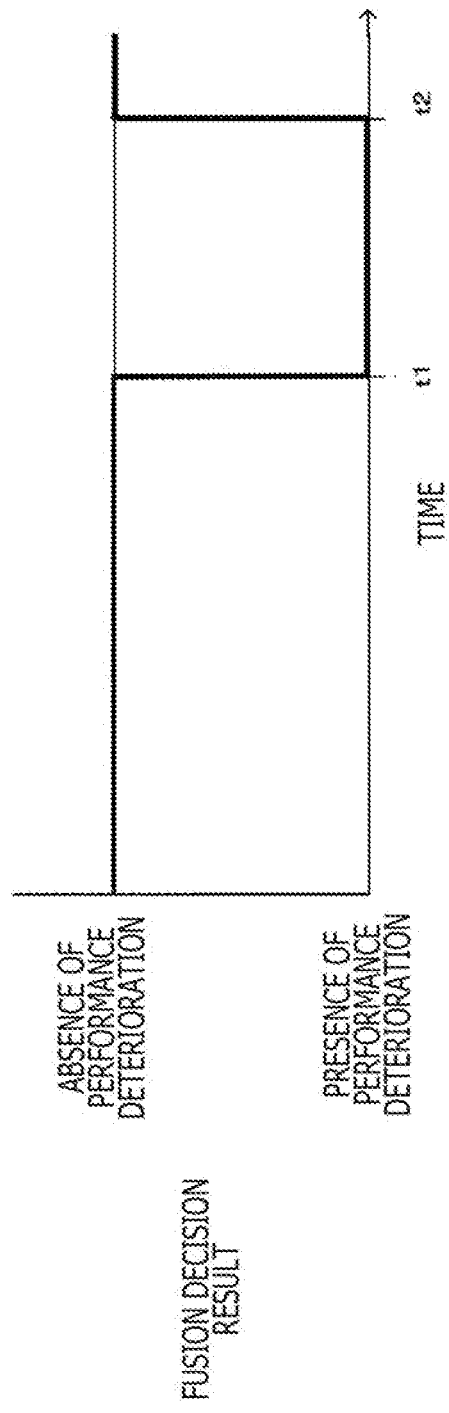
FIG. 16 is a view exemplifying a fusion decision result.

The integrated decision processing section 388 performs the fusion decision by using the individual decision results in the individual decision sections 381 to 385. In the case where when it is decided that the deterioration of the image quality is caused in any of the individual decision results supplied from the individual decision sections 381 to 385, the integrated decision processing section 388 decides that in the fusion decision, the deterioration of the image quality performance is present. In addition, in the case where it is decided that the deterioration of the image quality is not caused in all of the individual decision results supplied from the individual decision sections 381 to 385, the integrated decision processing section 388 decides that in the fusion decision, the deterioration of the image quality performance is absent in the fusion processing. FIG. 16 exemplifies the fusion decision result. For example, it is assumed that in each of the individual decision sections 382 to 385, the deterioration of the image quality is not caused in the fusion image, and in the individual decision section 381, the decision result depicted in FIG. 15 is obtained. In this case, the integrated decision processing section 388 decides that until the time point t1, the deterioration of the image quality performance is absent, and decides that for a period of time from the time point t1 to the time point t2, the deterioration of the image quality performance is present. In addition, the integrated decision processing section 388 decides that from the time point t2 on, the deterioration of the image quality performance is absent.

Incidentally, in the case where the comparison results in the individual decision sections, for example, continue for a period of time of a decision frame previously set or more, the individual decision sections 381 to 385 may perform the individual decision in response to the comparison result. In addition, in the case where the individual decision results in the individual decision sections 381 to 385, for example, continue for a period of time of a decision frame previously set or more, the integrated decision processing section 388 may perform the fusion decision in response to the individual decision results. When the individual decision and the fusion decision are performed in such a manner, the influence of the noise or the like is reduced, thereby obtaining the stable decision results. In addition, if the number of decision frames in the case where the decision result is changed so that the deterioration of the image quality is caused is made smaller than the number of decision frames in the case where the decision result is changed so that the deterioration of the image quality is not caused, then, in the case where the deterioration of the image quality is caused, the decision results can speedily cope with such a situation. In addition, in the case where the deterioration of the image quality is not caused, when since the comparison results or the individual decision results continue, it is discriminated that it is likely that the deterioration of the image quality is not caused, and the decision results can cope with such a situation.

It should be noted that since the fusion decision processing is executed by using the imaged image, in the case where the imaged image is not the still image, for example, in the case of the moving image recording or the preview image display, by using the fusion decision result obtained in the fusion decision processing, for example, the selection of the image data of the frame which will be outputted next time is performed. In addition, in the case where with respect to the image data which is outputted from the image processing section, the delay for a period of time required for the fusion decision processing can be allowed, the demosaic image data produced from the image data associated with the imaged image used in the fusion decision processing, or the fusion image data may be selected in response to the fusion decision result.

According to such a first embodiment, in the case where it is decided that in the fusion processing, the deterioration of the image quality is not caused based on the image feature amount or the camera feature amount, the fusion image data is selected. In the case where it is decided that in the fusion processing, the deterioration of the image quality is caused, the demosaic image data is selected. Therefore, by using the monochrome imaged image acquired in the imaging section 21-BW, and the color imaged image acquired in the imaging section 21-CR, the high-sensitivity color imaged image can be outputted from the image processing section 30-1 without reducing the image quality.

3. Second Embodiment of Image Processing Apparatus

In the first embodiment described above, in the fusion decision processing section 36-1, the calculated feature amount is compared with the decision threshold value previously set, and it is decided whether or not in the fusion processing, the deterioration of the image quality is caused. Incidentally, in the case where the decision threshold value is previously set, the decision threshold value thus set is not necessarily an optimal value for the imaging situation. Then, in a second embodiment, by setting the decision threshold value in response to the imaging situation, the decision as to whether or not the deterioration of the image quality is caused can be accurately performed as compared with the case of the first embodiment.

3-1. Configuration and Operation of Second Embodiment

Figure 17:
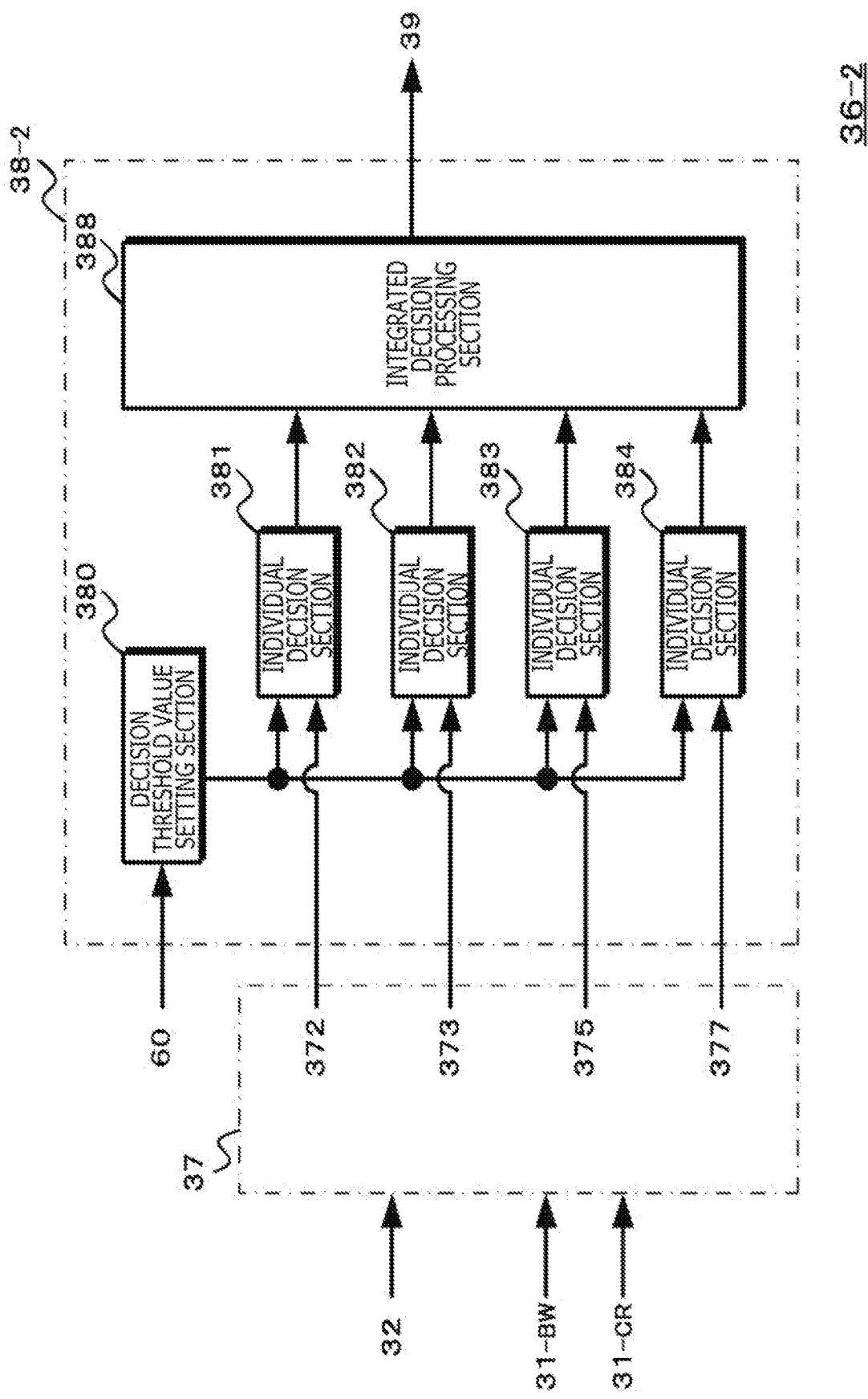
FIG. 17 is a block diagram exemplifying another configuration of an image data selection deciding section.

FIG. 17 exemplifies another configuration of the image data selection deciding section. An image data selection deciding section 38-2 of a fusion decision processing section 36-2 performs the decision as to whether or not in the fusion processing, the deterioration of the image quality is caused based on the image feature amount calculated in the image feature amount calculating section 37, and the camera feature amount acquired from the control section 60 or the like, and produces the image selection signal based on the discrimination result. Moreover, the image data selection deciding section 38-2 sets the decision threshold value used when it is decided whether or not the deterioration of the image quality is caused in the fusion image based on the image feature amount in response to the camera feature amount. The image data selection deciding section 38-2 has the individual decision sections 381 to 384 and the integrated decision processing section 388 as the functional blocks each of which decides whether or not the deterioration of the image quality is caused. In addition, the image data selection deciding section 38-2 has a decision threshold value setting section 380 for setting the decision threshold value in response to the camera feature amount.

The decision threshold value setting section 380 sets a decision threshold value based on the camera feature amount. As far as the camera feature amount, as described above, the imaging setting information associated with the brightness at the time of the imaging or the imaging setting information associated with the subject distance is used.

FIG. 18 and FIG. 19 each depict a relation between the camera feature amount and the decision threshold value. It should be noted that FIG. 18 exemplifies the case where the decision threshold value for the feature amount associated with the parallax, and the decision threshold value for the feature amount associated with the saturation of the pixel are set in response to the ISO sensitivity with the ISO sensitivity set at the time of the imaging as the camera feature amount.

In the case where the ISO sensitivity is set to a low value, the subject is bright and thus the imaged image becomes an image containing less noise. For this reason, the effect obtained by using the fusion processing is low. In addition, if the color shift owing to the occlusion is generated by executing the fusion processing, then, the color shift thus generated is conspicuous to cause the deterioration of the image quality (reason 1). Therefore, in the case where the ISO sensitivity is set to the low value, the decision threshold value associated with the parallax and the decision threshold value associated with the saturation of the pixel are each set to low values so as to easily decide that the deterioration of the image quality is caused in the fusion image.

In the case where the ISO sensitivity is set to a high value, the subject is dark and thus the imaged image becomes an image containing much noise. For this reason, the effect obtained by using the fusion processing is very high. In addition, since the noise is much in the color components as well, even if sort of color shift or the like is generated, it is inconspicuous so much (reason 3). Therefore, in the case where the ISO sensitivity is set to the high value, the decision threshold value is set to the high value so as to hardly decide that the deterioration of the image quality is caused in the fusion image.

In addition, in the case where the ISO sensitivity is set to a middle value, the imaged image does not contain the noises so much. Therefore, if the deterioration of the image quality performance is caused in the fusion image, then, there is the possibility that the deterioration becomes conspicuous (reason 2). Therefore, in the case where the ISO sensitivity is set to the middle value, the decision threshold value is set to a value which is higher than that in the case where the ISO sensitivity is set to the low value, and is lower than that in the case where the ISO sensitivity is set to the high value.

FIG. 19 exemplifies the case where the decision threshold value for the feature amount associated with the parallax, the decision threshold value for the feature amount associated with the saturation of the pixel are set in response to the ISO sensitivity and the focus position with the ISO sensitivity set at the time of the imaging and the focus position as the camera feature amount.

In the case where the focus position is the short distance, the deterioration of the image quality performance regarding the color resulting from the occlusion is easy to be caused as compared with the case where the focus position is not the short distance (reason 4). Therefore, in the case where the focus position is not the short distance, the decision threshold value is set similarly to the case of FIG. 18. The decision threshold value in the case where the focus position is the short distance and the ISO sensitivity is set to the middle value or the high value is set low as compared with the case where the focus position is not the short distance. That is, in the case where the focus position is the short distance, the decision threshold value is set to the low value so as to be easily decided that the deterioration of the image quality is caused in the fusion image as compared with the case where the focus position is not the short distance.

The individual decision section 381 decides whether or not the deterioration of the image quality is caused in the fusion image based on the parallax distribution feature amount calculated in the parallax distribution feature amount calculating section 372. The individual decision section 381 compares the parallax distribution feature amount $FV_{fsd}$ with the decision threshold value $Thc_{fsd}$ set in response to the camera feature amount in the decision threshold value setting section 380 for the parallax distribution feature amount. In the case where the parallax distribution feature amount $FV_{fsd}$ is larger than the decision threshold value $Thc_{fsd}$, the individual decision section 381 decides that the deterioration of the image quality is caused in the fusion image. The individual decision section 381 outputs the individual decision result to the integrated decision processing section 388.

The individual decision section 382 decides whether or not the deterioration of the image quality is caused in the fusion image based on the search range over feature amount $FV_{osr}$ calculated in the search range over feature amount calculating section 373. The individual decision section 382 compares the search range over feature amount $FV_{osr}$ with the decision threshold value $Thc_{osr}$ set in response to the camera feature amount in the decision threshold value setting section 380 for the search range over feature amount. In the case where the search range over feature amount $FV_{osr}$ is larger than the decision threshold value $Thc_{osr}$, the individual decision section 382 decides that the deterioration of the image quality is caused in the fusion image. The individual decision section 382 outputs the individual decision result to the integrated decision processing section 388.

The individual decision section 383 decides whether or not the deterioration of the image quality is caused in the fusion image based on the parallax gap feature amount $FV_{pd}$ calculated in the parallax gap feature amount calculating section 375. The individual decision section 383 compares the parallax gap feature amount $FV_{pd}$ with the decision threshold value $Th_{cpd}$ set in response to the camera feature amount in the decision threshold value setting section 380 for the parallax gap feature amount. In the case where the parallax gap feature amount $FV_{pd}$ is larger than the decision threshold value $Th_{cpd}$, the individual decision section 383 decides that the deterioration of the image quality is caused in the fusion image. The individual decision section 383 outputs the individual decision result to the integrated decision processing section 388.

The individual decision section 384 decides whether or not the deterioration of the image quality is caused in the fusion image based on the saturation feature amount $FV_{sat}$ calculated in the saturation feature amount calculating section 377. The individual decision section 384 compares the saturation feature amount $FV_{sat}$ with the decision threshold value $Thc_{sat}$ set in response to the camera feature amount in the decision threshold value setting section 380 for the saturation feature amount. In the case where the saturation feature amount $FV_{sat}$ is larger than the decision threshold value $Thc_{sat}$, the individual decision section 384 decides that the deterioration of the image quality is caused in the fusion image. The individual decision section 384 outputs the individual decision result to the integrated decision processing section 388.

The integrated decision processing section 388 performs the fusion decision based on the individual decision results supplied thereto from the individual decision sections 381 to 384 and produces the image selection signal in response to the fusion decision result, and outputs the image selection signal to the image selecting section 39. For example, in the case where it is decided that the deterioration of the image quality is caused in any one of the individual decision results supplied from the individual decision sections 381 to 384, the integrated decision processing section 388 decides that in the fusion decision, the deterioration of the image quality performance is caused in the fusion image. In addition, in the case where it is decided that in all the individual decision results supplied from the individual decision sections 381 to 384, the deterioration of the image quality is not caused, the integrated decision processing section 388 decides that in the fusion decision, the deterioration of the image quality performance is not caused. The integrated decision processing section 388 produces the image selection signal used to select the demosaic image data in the case where it is decided that in the fusion decision the reduction of the image quality performance is caused, and select the fusion image data in the case where it is decided that in the fusion decision the deterioration of the image quality performance is not caused, and outputs the image selection signal to the image selecting section 39.

It should be noted that the image data selection deciding section 38-2 may be provided with the individual decision section 385 depicted in the first embodiment, and the integrated decision processing section 388 may produce the image selection signal by using the individual decision result as well based on the camera feature amount.

According to such a second embodiment, similarly to the case of the first embodiment, by using the monochrome imaged image acquired in the imaging section 21-BW, and the color imaged image acquired in the imaging section 21-CR, the high-sensitivity color imaged image can be outputted from the image processing section 30-1 without reducing the image quality. Moreover, since in the second embodiment, the decision threshold value is set in response to the setting state, the decision as to whether or not the deterioration of the image quality is caused can be performed with accuracy as compared with the first embodiment.

4. Third Embodiment of Image Processing Apparatus

In the first and second embodiments described above, the fusion decision as to whether or not the deterioration of the image quality is caused in the fusion image is performed. In addition, there is selected the demosaic image data produced by executing the demosaic processing for either the fusion image data produced by executing the fusion processing with the monochrome imaged image acquired in the imaging section 21-BW as the reference based on the fusion decision result, or the image data associated with the color imaged image acquired in the imaging section 21-CR. Here, the fusion image data indicates the imaged image of a point of view of the imaging section 21-BW, and the demosaic image data indicates the imaged image of a point of view of the imaging section 21-CR. For this reason, when at the time of imaging of the moving image, the image data is switched in response to the decision result, since the point of view differs before and after the switching of the image, the switching of the image is conspicuous, so that the image of interest becomes an image in which the image quality is reduced. Then, in the third embodiment, even when the imaged data is switched in response to the fusion decision result, the switching is made inconspicuous.

4-1. Configuration of Third Embodiment

Figure 20:
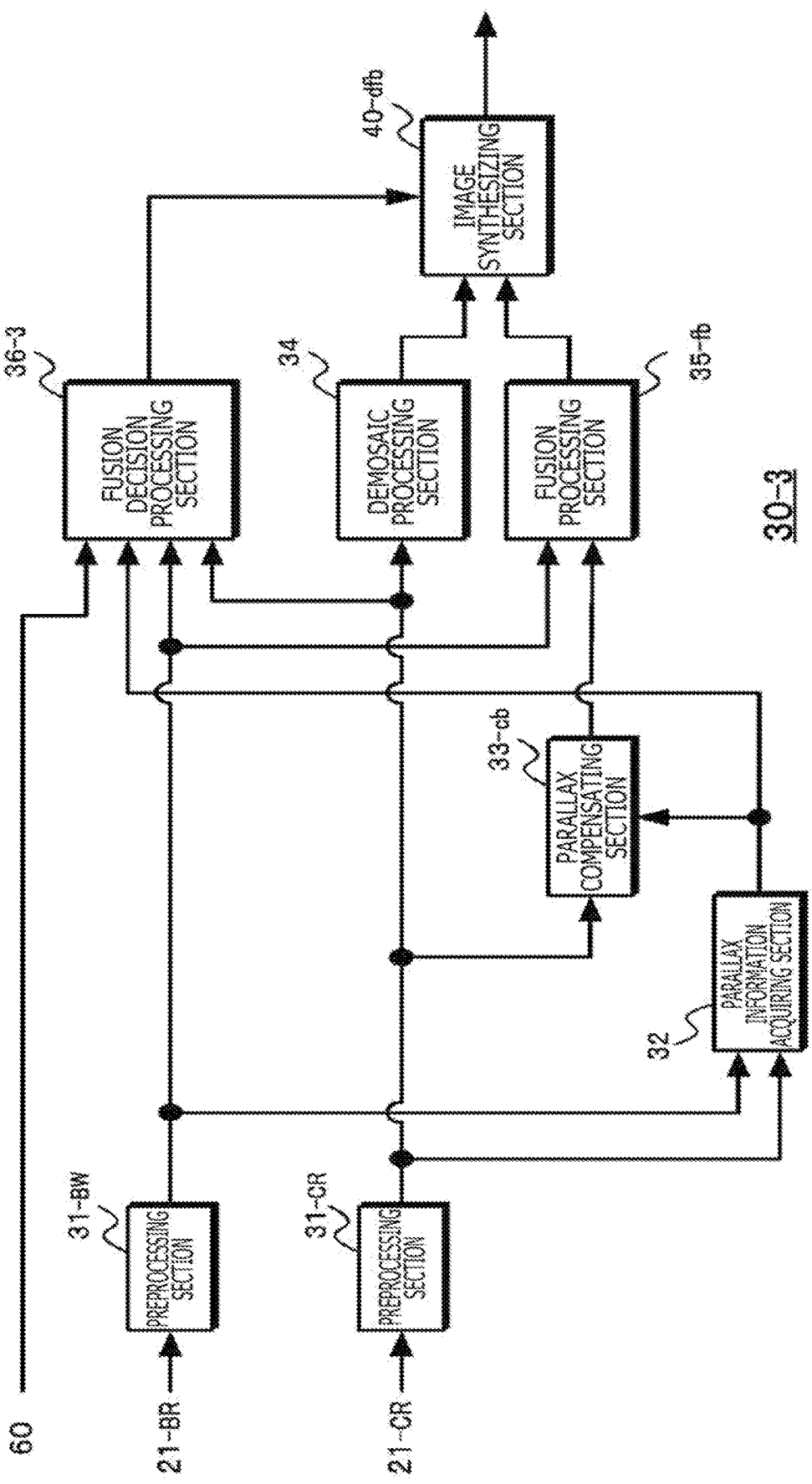
FIG. 20 is a block diagram exemplifying a configuration of a third embodiment.

FIG. 20 exemplifies a configuration of the third embodiment. The image processing section 30-3 obtains the high-sensitivity imaged image without reducing the image quality by using the imaged images acquired in the imaging section 21-BW and the imaging section 21-CR. That is, the image processing section 30-3 executes the image processing by using the imaged images acquired in the imaging section 21-BW and the imaging section 21-CR, and produces the high-sensitivity imaged image, in which the switching of the image is inconspicuous, without more reducing the image quality than each of the imaged images individually acquired in the imaging section 21-BW or the imaging section 21-CR.

The image processing section 30-3 has a preprocessing sections 31-BW and 31-CR, a parallax detecting section 32, a parallax compensating section 33-cb, a demosaic processing section 34, a fusion processing section 35-fb, a fusion decision processing section 36-3, and an image synthesizing section 40-dfb.

The preprocessing section 31-BW performs correction processing such as lens distortion correction or defective pixel correction for the image data associated with the monochrome imaged image acquired in the imaging section 21-BW. The preprocessing section 31-BW outputs the monochrome image data after the correction to the parallax detecting section 32, the fusion processing section 35-fb, and the fusion decision processing section 36-3.

The preprocessing section 31-CR performs the correction processing such as the lens distortion correction or the defective pixel correction for the image data associated with the color imaged image acquired in the imaging section 21-CR. The preprocessing section 31-CR outputs the pre-demosaic color image data after the correction to the parallax detecting section 32, the parallax compensating section 33-cb, the demosaic processing section 34, and the fusion decision processing section 36-3.

The parallax detecting section 32 performs the parallax detection based on the monochrome image data supplied thereto from the preprocessing section 31-BW, and the pre-demosaic color image data supplied thereto from the preprocessing section 31-CR, and produces the parallax information indicating the parallax calculated for each pixel. The parallax detecting section 32 outputs the parallax information thus produced to the parallax compensating section 33-cb and the fusion decision processing section 36-3.

The parallax compensating section 33-cb performs the parallax compensation for the pre-demosaic color image data based on the parallax information supplied thereto from the parallax detecting section 32. The parallax compensating section 33-cb performs the movement of the pixel position for the pre-demosaic color image data supplied thereto from the preprocessing section 31-CR based on the parallax information produced in the parallax detecting section 32, and produces parallax compensation color image data as a point of view of the monochrome imaged image acquired in the imaging section 21-BW. The parallax compensating section 33-cb outputs the parallax compensation color image data thus produced to the fusion processing section 35-fb.

The demosaic processing section 34 executes the demosaic processing by using the pre-demosaic color image data supplied thereto from the preprocessing section 31-CR. In the demosaic processing, there is executed the demosaic processing for producing the image data indicating the corresponding color components of red, blue and green for each pixel from the pre-demosaic imaged data in which each of the pixels indicates corresponding one color component of red, blue and green. The demosaic processing section 34 outputs the demosaic image data produced by the demosaic processing to the image synthesizing section 40-dfb.

The fusion processing section 35-fb executes the fusion processing with the monochrome imaged image as the reference by using the monochrome image data supplied thereto from the preprocessing section 31-BW, and the parallax compensation color image data supplied thereto from the parallax compensating section 33-cb. The fusion processing section 35-fb outputs the fusion image data produced by the fusion processing to the image synthesizing section 40-dfb.

The fusion decision processing section 36-3 performs, based on the feature amount calculated by using the moving image of the monochrome imaged image acquired by imaging the subject and the color imaged image acquired by imaging the subject from the different point-of-view position, the fusion decision as to whether or not the deterioration of the image quality is caused in the fusion image obtained by the fusion of the monochrome imaged image and the color imaged image with the monochrome imaged image as the reference, for each image of the moving image. In addition, the fusion decision processing section 36-3 sets the synthesis ratio in such a way that with respect to the fusion image and the color imaged image, one image is switched over to the other image with a lapse of time based on the fusion decision result and the feature amount. For example, the fusion decision processing section 36-3 performs the fusion decision as to whether or not the deterioration of the image quality resulting from the parallax and the saturation of the pixel is caused in the fusion image based on the monochrome image data and the pre-demosaic color image data. In addition, the fusion decision processing section 36-3 calculates a change amount in a time direction of the feature amount associated with the parallax and the saturation of the pixel. Moreover, the fusion decision processing section 36-3 sets the synthesis ratio in such a way that with respect to the images, one image is switched over to the other image with a lapse of time in response to the fusion decision result and the change amount, and produces an image synthesis signal indicating the synthesis ratio, and outputs the image synthesis signal to the image synthesizing section 40-*dfb*.

The image synthesizing section 40-*dfb* synthesizes the fusion image data and the demosaic image data based on the image synthesis signal supplied thereto from the fusion decision processing section 36-3 to produce synthesis image data. In the case where the fusion decision processing section 36-3 decides that the deterioration of the image quality is not caused in the fusion image, the image synthesizing section 40-*dfb* outputs the fusion image data as the synthesis image data. In addition, in the case where the fusion decision processing section 36-3 decides that the deterioration of the image quality is caused in the fusion image, the image synthesizing section 40-*dfb* outputs the demosaic image data as the synthesis image data. In addition, the image synthesizing section 40-*dfb* synthesizes the fusion image and the color imaged image at the rate according to the synthesis ratio in such a way that even when the fusion image data and the demosaic image data are switched over to each other based on the image synthesis signal in response to the synthesis ratio, the switching of the image data is inconspicuous to produce an intermediate image in the middle of the image switching. Moreover, the image synthesizing section 40-*dfb* changes the switching speed of the image data in response to the change amount in the time direction of the feature amount associated with the parallax and the saturation of the pixel to make the deterioration of the image quality inconspicuous.

Figure 21:
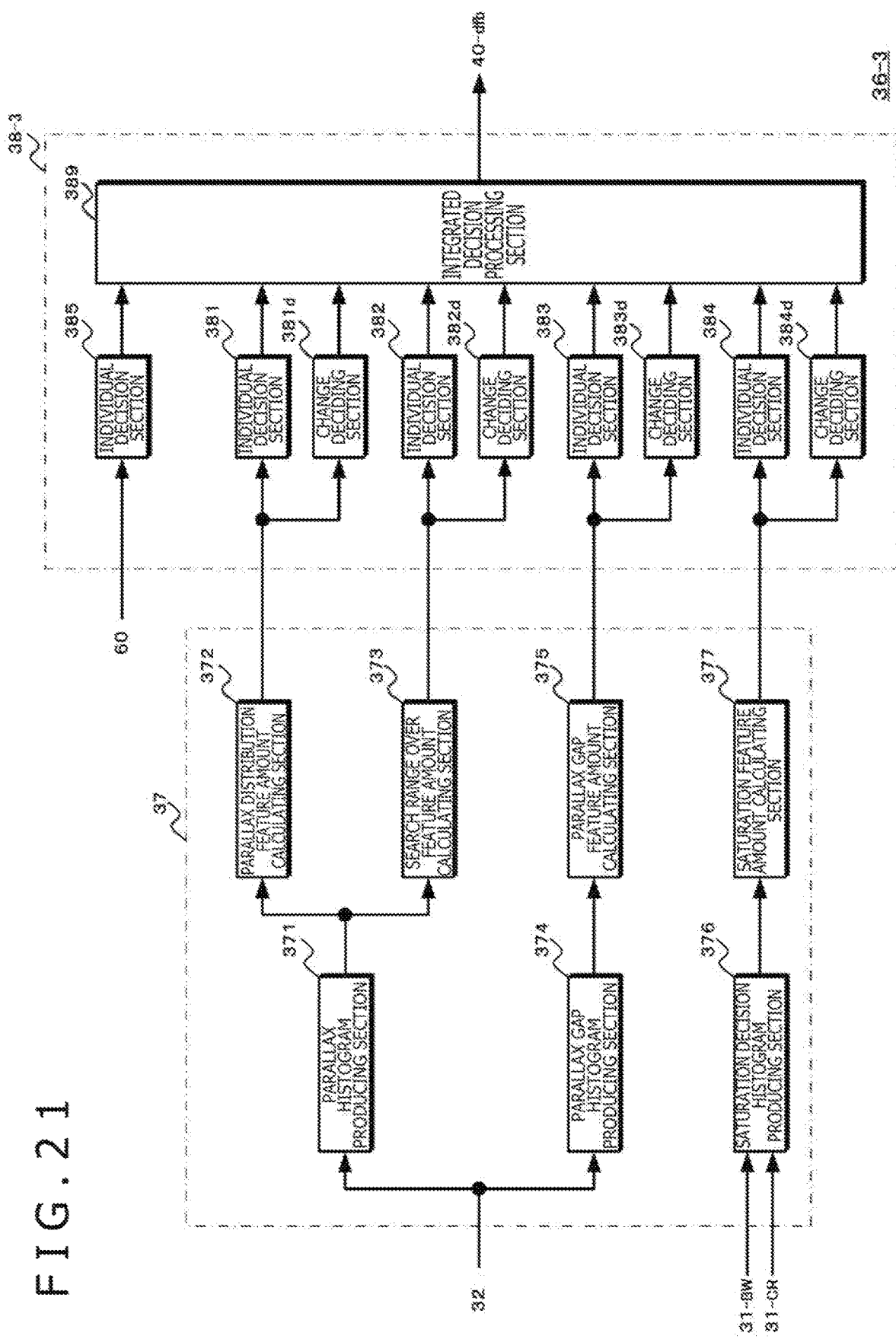
FIG. 21 is a block diagram exemplifying a configuration of a fusion decision processing section.

Next, a description will be given with respect to a configuration of the fusion decision processing section. FIG. 21 exemplifies a configuration of the fusion decision processing section. The fusion decision processing section 36-3 has an image feature amount calculating section 37 and an image data selection deciding section 38-3.

The image feature amount calculating section 37 calculates an image feature amount used to perform the decision regarding the deterioration of the image quality resulting from the parallax and the saturation of the pixel. The image feature amount calculating section 37 has a parallax histogram producing section 371, a parallax distribution feature amount calculating section 372, a search range over feature amount calculating section 373, a parallax gap histogram producing section 374, and a parallax gap feature amount calculating section 375 as the functional blocks for calculating the image feature amount used to perform the decision regarding the deterioration of the image quality resulting from the parallax. In addition, the image feature amount calculating section 37 has a saturation decision histogram producing section 376 and a saturation feature amount calculating section 377 as the functional blocks for calculating the image feature amount used to perform the decision regarding the deterioration of the image quality resulting from the saturation of the pixel.

The parallax histogram producing section 371 produces the histogram by using the parallax vectors calculated with respect to the pixels of the calculation target area. The parallax distribution feature amount calculating section 372 calculates the parallax distribution feature amount $FV_{fsd}$ as the statistic indicating the feature of the parallax distribution from the parallax histogram produced in the parallax histogram producing section 371.

The search range over feature amount calculating section 373 calculates the search range over feature amount $FV_{osr}$ indicating the rate of the frequency (over_search_range_counter) at which the parallax equal to or larger than the search range previously set is generated to the entire frequency (counter) from the parallax histogram produced in the parallax histogram producing section 371.

The parallax gap histogram producing section 374 produces the parallax gap histogram. The parallax gap histogram producing section 374 calculates the parallax PV1 in the position located horizontally apart from the pixel position of interest in a calculation target area by the pixels of "–(PARALLAX_DIFF_DISTANCE/2)," and the parallax PV2 in the position located horizontally apart from the pixel position of interest in a calculation target area by the pixels of "(PARALLAX_DIFF_DISTANCE/2)," and calculates the parallax difference absolute value $PV_{apd}$ between the parallaxes PV1 and PV2. Moreover, the parallax gap histogram producing section 374 produces the histogram by using the parallax difference absolute value $PV_{apd}$ thus calculated.

The parallax gap feature amount calculating section 375 calculates the parallax gap feature amount $FV_{pd}$ from the parallax gap histogram produced in the parallax gap histogram producing section 374.

The saturation decision histogram producing section 376 produces a pixel value histogram indicating the frequency (the number of pixels) for each pixel value based on the monochrome image data supplied thereto from the preprocessing section 31-BW. In addition, the saturation decision histogram producing section 376 produces the luminance data by the color space transformation of the pre-demosaic color imaged image data supplied thereto from the preprocessing section 31-CR, and produces the pixel value histogram indicating the frequency (the number of pixels) for each pixel value based on the luminance data thus produced.

The saturation feature amount calculating section 377 calculates the saturation feature amount $FV_{sat}$ based on the luminance value histogram produced in the saturation decision histogram producing section 376.

The image data selection deciding section 38-3 performs the decision as to whether or not the deterioration of the image quality is caused in the fusion image based on the image feature amount calculated in the image feature amount calculating section 37, and the camera feature amount acquired from the control section 60 or the like. In addition, the image data selection deciding section 38-3 produces the image synthesis signal based on the image discrimination result, and the change amount in the time direction of the image feature amount. The image data selection deciding section 38-3 has individual decision sections 381 to 385, change amount deciding sections 381*d* to 385*d*, and an integrated decision processing section 389 as functional blocks with respect to the decision as to whether or not the deterioration of the image quality is caused, and the change amount in the time direction of the image feature amount.

The individual decision section 381 decides whether or not the deterioration of the image quality is caused in the fusion image based on the parallax distribution feature amount calculated in the parallax distribution feature amount calculating section 372. The individual decision section 381 compares the parallax distribution feature amount $FV_{fsd}$ with the decision threshold value $Th_{fsd}$ previously set for the parallax distribution feature amount. In the case where the parallax distribution feature amount $FV_{fsd}$ is larger than the decision threshold value $Th_{fsd}$. The individual decision section 381 decides that the deterioration of the image quality is caused in the fusion image. The individual decision section 381 outputs the individual decision result to the integrated decision processing section 389.

The change amount deciding section 381d calculates a temporal change amount ($FV_{fsd}(i)-FV_{fsd(i-1)}$) of the parallax distribution feature amount calculated in the parallax distribution feature amount calculating section 372. It should be noted that "i" indicates the frame regarding which the fusion decision processing section 36-3 decides whether or not the deterioration of the image quality is caused. The change amount deciding section 381d compares an absolute value of the calculated change amount with the change amount threshold value $Thd_{fsd}$ previously set, and outputs the comparison result to the integrated decision processing section 389.

The individual decision section 382 decides whether or not the deterioration of the image quality is caused in the fusion image based on the search range over feature amount $FV_{osr}$ calculated in the search range over feature amount calculating section 373. The individual decision section 382 compares the search range over feature amount $FV_{osr}$ with the decision threshold value $Th_{osr}$ previously set for the search range over feature amount. In the case where the search range over feature amount $FV_{osr}$ is larger than the decision threshold value $Th_{osr}$, the individual decision section 382 decides that the deterioration of the image quality is caused in the fusion image. The individual decision section 382 outputs the individual decision result to the integrated decision processing section 389.

The change amount deciding section 382d calculates a temporal change amount ($FV_{osr}(i)-FV_{osr(i-1)}$) of the search range over feature amount calculated in the search range over feature amount calculating section 373. Moreover, the change amount deciding section 382d compares an absolute value of the calculated change amount with the change amount threshold value $Thd_{osr}$ previously set, and outputs the comparison result to the integrated decision processing section 389.

The individual decision section 383 decides whether or not the deterioration of the image quality is caused in the fusion image based on the parallax gap feature amount $FV_{pd}$ calculated in the parallax gap feature amount calculating section 375. The individual decision section 383 compares the parallax gap feature amount $FV_{pd}$ with the decision threshold value $Th_{pd}$ previously set for the parallax gap feature amount. In the case where the parallax gap feature amount $FV_{pd}$ is larger than the decision threshold value $Th_pd$, the individual decision section 383 decides that the deterioration of the image quality is caused in the fusion image. The individual decision section 383 outputs the individual decision result to the integrated decision processing section 389.

The change amount deciding section 383d calculates a temporal change amount ($FV_{pd(i)}-FV_{pd(i-1)}$) of the parallax gap feature amount calculated in the parallax gap feature amount calculating section 375. The change amount deciding section 383d compares an absolute value of the calculated change amount with a change amount threshold value $Thd_{lpd}$ previously set, and outputs the comparison result to the integrated decision processing section 389.

The individual decision section 384 decides whether or not the deterioration of the image quality is caused in the fusion image based on the saturation feature amount $FV_{sat}$ calculated in the saturation feature amount calculating section 377. The individual decision section 384 compares the saturation feature amount $FV_{sat}$ with the decision threshold value $Th_{sat}$ previously set for the saturation feature amount. In the case where the saturation feature amount $FV_{sat}$ is larger than the decision threshold value $Th_{sat}$, the individual decision section 384 decides that the deterioration of the image quality is caused in the fusion image. The individual decision section 384 outputs the individual decision result to the integrated decision processing section 389.

The change amount deciding section 384d calculates a temporal change amount ($FV_{sat(i)}-FV_{sat(i-1)}$) of the saturation feature amount calculated in the saturation feature amount calculating section 377. The change amount deciding section 384d compares the absolute value of the calculated change amount with the change amount threshold value $Thd_{sat}$ previously set, and outputs the comparison result to the integrated decision processing section 389.

The individual decision section 385 decides whether or not the deterioration of the image quality is caused in the fusion image based on the camera feature amount. As far as the camera feature amount, as described above, there is used the imaging setting information such as the ISO sensitivity and the focus position. The individual decision section 385 compares the camera feature amount with the decision threshold value previously set for the camera feature amount, and decides whether or not the deterioration of the image quality is caused in the fusion image. The individual decision section 385 outputs the individual decision result to the integrated decision processing section 389.

The integrated decision processing section 389 performs the fusion decision by using the individual decision results supplied thereto from the individual decision sections 381 to 385, and produces the image synthesis signal in response to the fusion decision result, and outputs the image synthesis signal to the image synthesizing section 40-dfb. For example, in the case where it is decided that the deterioration of the image quality is caused in any one of the individual decision results supplied from the individual decision sections 381 to 385, the integrated decision processing section 389 decides that the deterioration of the image quality performance is caused in the fusion image in the fusion decision. In addition, in the case where it is decided that the deterioration of the image quality is not caused in all the individual decision results supplied from the individual decision sections 381 to 385, the integrated decision processing section 389 decides that the deterioration of the image quality performance is not caused in the fusion image in the fusion decision.

The integrated decision processing section 389 produces the image synthesis signal used to set the demosaic image data produced in the demosaic processing section 34 as the synthesis image data outputted from the image synthesizing section 40-dfb in the case where it is decided in the fusion decision that the performance reduction is present, and set the fusion image data produced in the fusion processing section 35-fb as the synthesis image data outputted from the image synthesizing section 40-dfb in the case where it is decided in the fusion decision that the deterioration of the image quality performance is absent, and outputs the image synthesis signal to the image synthesizing section 40-dfb.

In addition, the integrated decision processing section 389 determines the speed of switching from the fusion image data to the demosaic image data based on the result of the comparison of the change amounts supplied from the change amount deciding sections 381d to 384d with the change amount threshold value. Moreover, the integrated decision processing section 389 sets the synthesis ratio indicated by the image synthesis signal in response to the determined switching speed. For example, in the case where the deterioration of the image quality is caused in the fusion image due to the subject change or the like at the time of the imaging of the moving image, instead of the fusion image data in which the deterioration of the image quality is caused, the demosaic image data is desirably outputted. In addition, it is also desirable that the switching from the fusion image data over to the demosaic image data is inconspicuous. Therefore, in the case where it is decided in the fusion decision that the reduction of the performance is present, and the change amount exceeds the change amount threshold value in any one of the individual decision results supplied from the change amount deciding sections 381*d* to 384*d*, the integrated decision processing section 389 makes the switching speed higher than the predetermined speed previously set. In addition, in the case where it is decided in the fusion decision that the reduction of the performance is absent, the fusion decision processing section 36-3 sets the switching speed to the predetermined speed previously set. The integrated decision processing section 389 outputs the image synthesis signal produced to the image synthesizing section 40-*dfb*. It should be noted that since the speed of the switching from the demosaic image data over to the fusion image data is set based on the fusion decision result proving that the deterioration of the image quality is not caused, the switching speed is set to the predetermined speed previously set.

The image synthesizing section 40-*dfb* synthesizes the demosaic image data produced in the demosaic processing section 34 and the fusion image data produced in the fusion processing section 35-*fb* with each other based on the image synthesis signal supplied thereto from the fusion decision processing section 36-3. The image synthesizing section 40-*dfb* sets the demosaic image data as the synthesis image data in the case where it is decided that the deterioration of the image quality is caused in the fusion image, and sets the fusion image data as the synthesis image data in the case where it is decided that the deterioration of the image quality is not caused in the fusion image.

In the case where the change amount in the time direction of the image feature amount exceeds the change amount threshold value, the image synthesizing section 40-*dfb* performs the switching from the fusion image data over to the demosaic image data at the higher speed than the predetermined speed based on the image synthesis signal supplied thereto from the fusion decision processing section 36-3. Moreover, the image synthesizing section 40-*dfb* produces the image data associated with the intermediate image as the synthesis image data for a period of time for the transition in the switching between the fusion image data and the demosaic image data based on the image synthesis signal supplied thereto from the fusion decision processing section 36-3, thereby making the switching of the image data inconspicuous.

4-2. Operation of Third Embodiment

Figure 22:
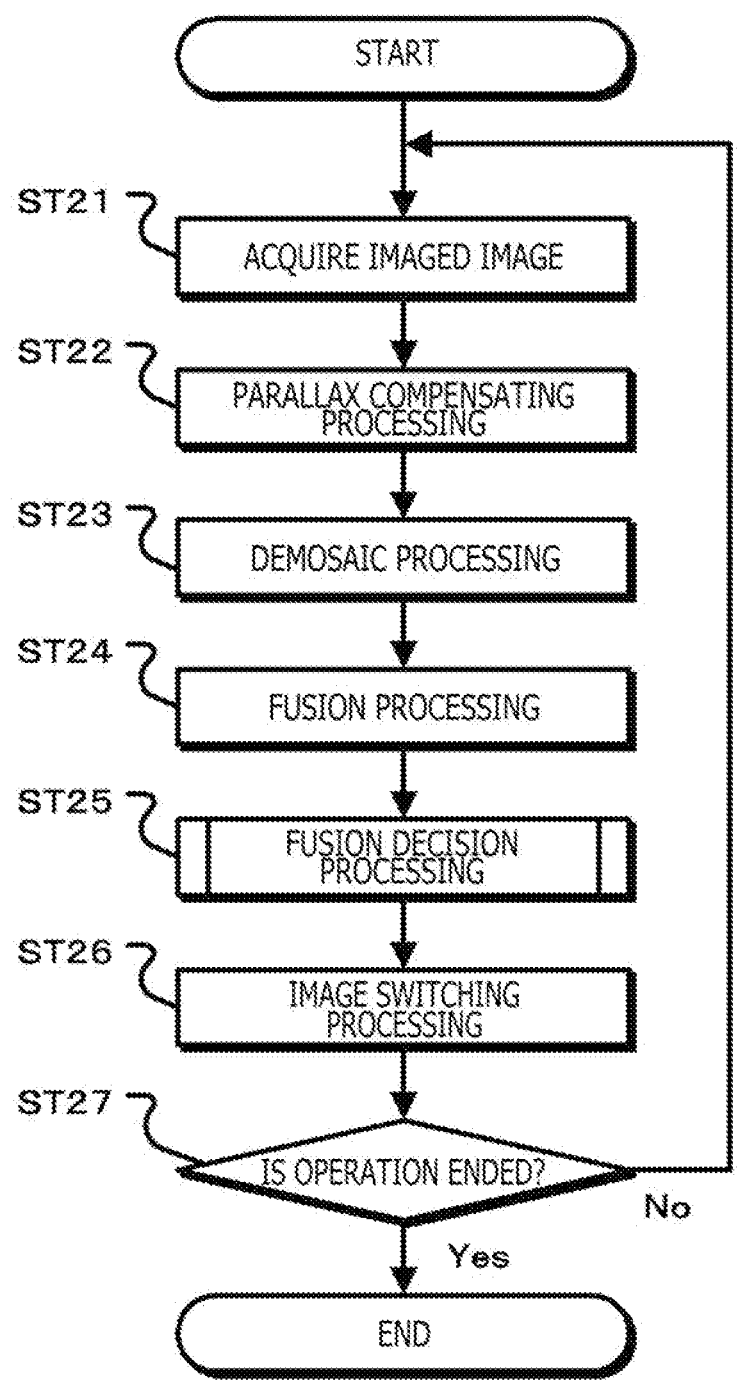
FIG. 22 is a flow chart depicting an operation of the third embodiment.

FIG. 22 is a flow chart depicting an operation of the third embodiment. In Step ST21, the image processing section acquires the imaged image. The image processing section 30-3 acquires the image data associated with the imaged image from the imaging sections 21-BW and 21-CR, and the processing proceeds to Step ST22.

In Step ST22, the image processing section executes the parallax compensating processing. The image processing section 30-3 performs the alignment by using the image data acquired in Step ST21, and sets the pre-demosaic color image data acquired in the imaging section 21-CR as the image data of a point of view of the monochrome imaged image acquired in the imaging section 21-BW. Then, the processing proceeds to Step ST23.

In Step ST23, the image processing section executes the demosaic processing. The image processing section 30-3 executes the demosaic processing by using the image data acquired from the imaging section 21-CR, and produces the demosaic image data having the corresponding color component for each pixel. Then, the processing proceeds to Step ST24.

In Step ST24, the image processing section executes the fusion processing. The image processing section 30-3 executes the fusion processing by using the monochrome image data produced in the imaging section 21-BW, and the parallax compensation color image data for which in Step ST22, the parallax compensation is performed, and produces the fusion image data. Then, the processing proceeds to Step ST25.

In Step ST25, the image processing section executes the fusion decision processing. The image processing section executes the fusion decision processing, and produces the image synthesis information indicating the synthesis ratio of the demosaic image data produced in Step ST23, and the fusion image data produced in Step ST24 based on the fusion decision result.

Figure 23:
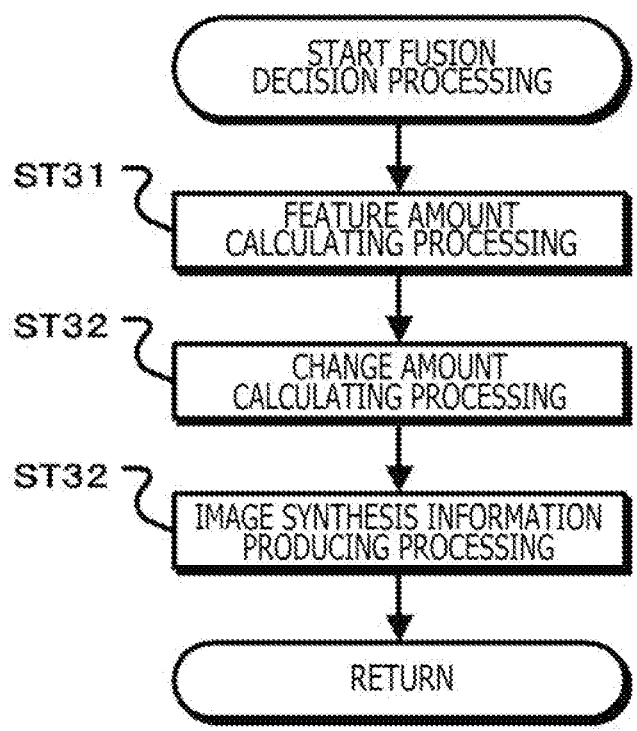
FIG. 23 is a flow chart depicting fusion decision processing.

FIG. 23 is a flow chart depicting the fusion decision processing. In Step ST31, the image processing section executes the feature amount calculation processing. The fusion decision processing section 36-3 of the image processing section 30-3 produces the parallax histogram, the parallax gap histogram, and the saturation decision histogram, and calculates the feature amount based on the histograms thus produced. Then, the processing proceeds to Step ST32.

In Step ST32, the image processing section executes the change amount calculation processing. The image processing section 30-3 calculates the change amount in the time direction with respect to the feature amount calculated in Step ST31. Then, the processing proceeds to Step ST33.

In Step ST33, the image processing section executes the image synthesis information producing processing. The fusion decision processing section 36-3 of the image processing section 30-3 performs the comparison of the feature amount calculated in Step ST31 with the discrimination threshold value previously set for each feature amount calculated, and the comparison of the change amount calculated in Step ST32 with the change amount threshold value previously set for each change amount calculated. The image processing section 30-3 produces the image synthesis information indicating the synthesis ratio of the demosaic image data produced in Step ST23 and the fusion image data produced in Step ST24 for each time point based on the comparison results. Then, the processing proceeds to Step ST26 of FIG. 22.

In Step ST26, the image processing section executes the image switching processing. The image processing section 30-3 performs the synthesis of the demosaic image data produced in Step ST23 and the fusion image data produced in Step ST24. In the case where it is decided that the deterioration of the image quality is caused in the fusion image, the image processing section 30-3 sets the demosaic image data as the synthesis image data. In the case where it is decided that the deterioration of the image quality is not caused, the image processing section 30-3 sets the fusion image data as the synthesis image data. In addition, for a transition period of time for switching the image data, the image processing section 30-3 produces the intermediate image so that the switching of the image data is inconspicuous, as the synthesis image data. In addition, in the case where the change amount in the time direction of the image feature amount exceeds the change amount threshold value in the switching from the fusion image data to the demosaic image data, the image processing section 30-3 makes the switching speed of the image data higher than the predetermined speed based on the image synthesis information. Then, the processing proceeds to Step ST27.

In Step ST27, the image processing section discriminates whether or not the operation is ended. In the case where the moving image recording or the preview image display is being performed, the processing is returned back to Step ST21. In the case where an ending operation for the moving image recording or the preview image display is performed, the image processing section 30-3 ends the operation. It should be noted that any of Step ST23 and Step ST24 may be early processed. Moreover, the processing is by no means limited to the order processing in which the processing is executed in Step order, and the pipeline processing or the parallel processing may be used.

Figure 24:
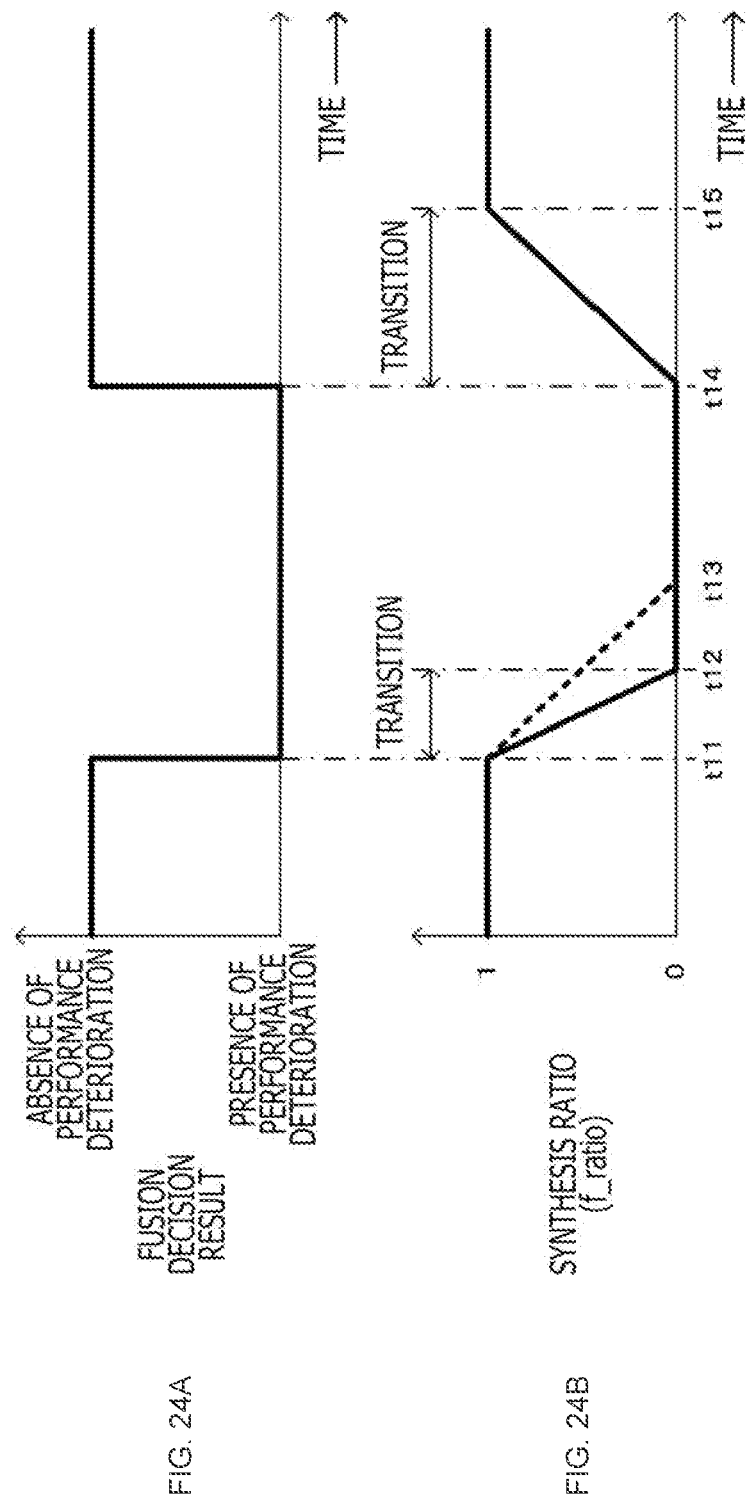
FIGS. 24A and 24B are graphs exemplifying an operation of a fusion decision processing section.

FIGS. 24A and 24B exemplifies an operation of the fusion decision processing section. FIG. 24A depicts the fusion decision result. For example, until a time point t11, it is decided that in all the individual decision results supplied from the individual decision sections 381 to 385, the deterioration of the image quality is not caused, and in the fusion decision, it decided that the deterioration of the image quality performance is absent. When at a time point t11, it is decided that in any of the individual decision results, the deterioration of the image quality is caused, in the fusion decision, the decision result indicates that the deterioration of the image quality performance is present. In addition, when it is decided that at a time point t14, in all the individual decision results, the deterioration of the image quality is not caused, in the fusion decision, it is decided that the deterioration of the image quality performance is absent.

When the fusion decision result is changed from the absence of the deterioration of the image quality performance over to the presence of the deterioration of the image quality performance, in the case where in any of the individual decision results supplied from the change amount deciding sections 381d to 384d, the change amount exceeds the change amount threshold value, the fusion decision processing section decides that the switching speed needs to be increased, and increases the change amount of the synthesis ratio. FIG. 24B exemplifies the change of the synthesis ratio. For example, when at the time point t11, the fusion processing result indicates that the absence of deterioration of the image quality performance is switched over to the presence thereof, the synthesis ratio is changed from "1" to "0," and the synthesis image data outputted from the image synthesizing section 40-dfb is switched from the fusion image data over to the demosaic image data. In addition, when it is decided that the switching speed needs to be increased, the change amount of the synthesis ratio is increased based on Expression (5). In Expression (5), "reg_down_step" is a reduction amount previously set in the case where the synthesis ratio is successively reduced. "Gain" is a gain used to change the reduction amount, and is set to "0<(reg_down_step×Gain)<1." In addition, when it is decided that the switching speed needs not to be increased, "Gain=G1" is set. It is decided that the switching speed needs to be increased, "Gain>G1" is set.

$$f\_ratio = 1 - (reg\_down\_step \times Gain) \quad (5)$$

If the value of "Gain" is increased along with the increase of the change amount when the change amount threshold value is exceeded, in the case where the change amount of the change feature amount is large and the speed of the deterioration of the image quality is high, the switching from the fusion image data over to the demosaic data is performed at the high speed, so that for a period of time from the time point t11 to the time point t12, the synthesis ratio is changed from "1" to "0." For this reason, as compared with the case where the switching speed is not changed, the image data with which the image quality is deteriorated can be hardly to output. It should be noted that a broken line in FIG. 24B depicts the change of the synthesis ratio in the case where it is decided that the switching speed does not need to be increased (Gain=1). In this case, for a period of time from the time point t11 to the time point t13, the synthesis ratio is changed from "1" to "0." In addition, for a period of time from the time point t14 to the time point t15, the synthesis ratio is changed from "0" to "1."

In addition, in the case where the synthesis image data is switched from the fusion image data over to the demosaic image data, the image synthesizing section 40-dfb produces the intermediate image corresponding to the synthesis ratio. For example, the image synthesizing section 40-dfb synthesizes the fusion image data and the demosaic image data with each other at a rate according to the synthesis ratio, and produces the intermediate image data.

Figure 25:
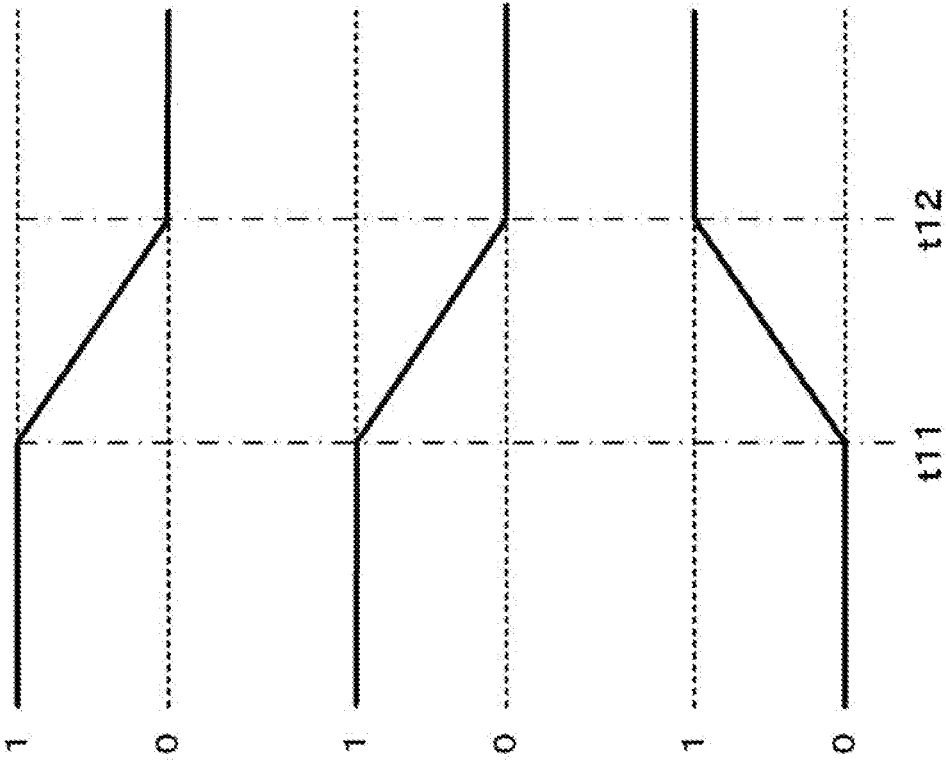
FIGS. 25A, 25B, and 25C are graphs exemplifying an operation in the case where a synthesis image is produced as an intermediate image.

FIGS. 25A, 25B, and 25C exemplifies an operation in the case where the synthesis image is produced as the intermediate image. FIG. 25A depicts the synthesis ratio f_ratio. In addition, FIG. 25B depicts a fusion image component rate in the synthesis image. FIG. 25C depicts a demosaic component rate in the synthesis image. Since until the time period t11, the synthesis ratio is "1" and thus it is decided that the deterioration of the image quality is not caused in the fusion image, the fusion image is outputted. When at the time point t11, it is discriminated that the deterioration of the image quality is caused, for a period of time from the time point t11 to the time point t12, the synthesis ratio is changed from "1" to "0." In addition, along with the reduction of the synthesis ratio, the fusion image component ratio is reduced, and the demosaic processing image component ratio is increased. Therefore, the switching from the fusion image over to the demosaic image can be continuously performed.

In addition, the image synthesizing section 40-dfb may produce the image of the point-of-view position according to the synthesis ratio from the image based on the demosaic image data, thereby setting that image as the intermediate image.

Figure 26:
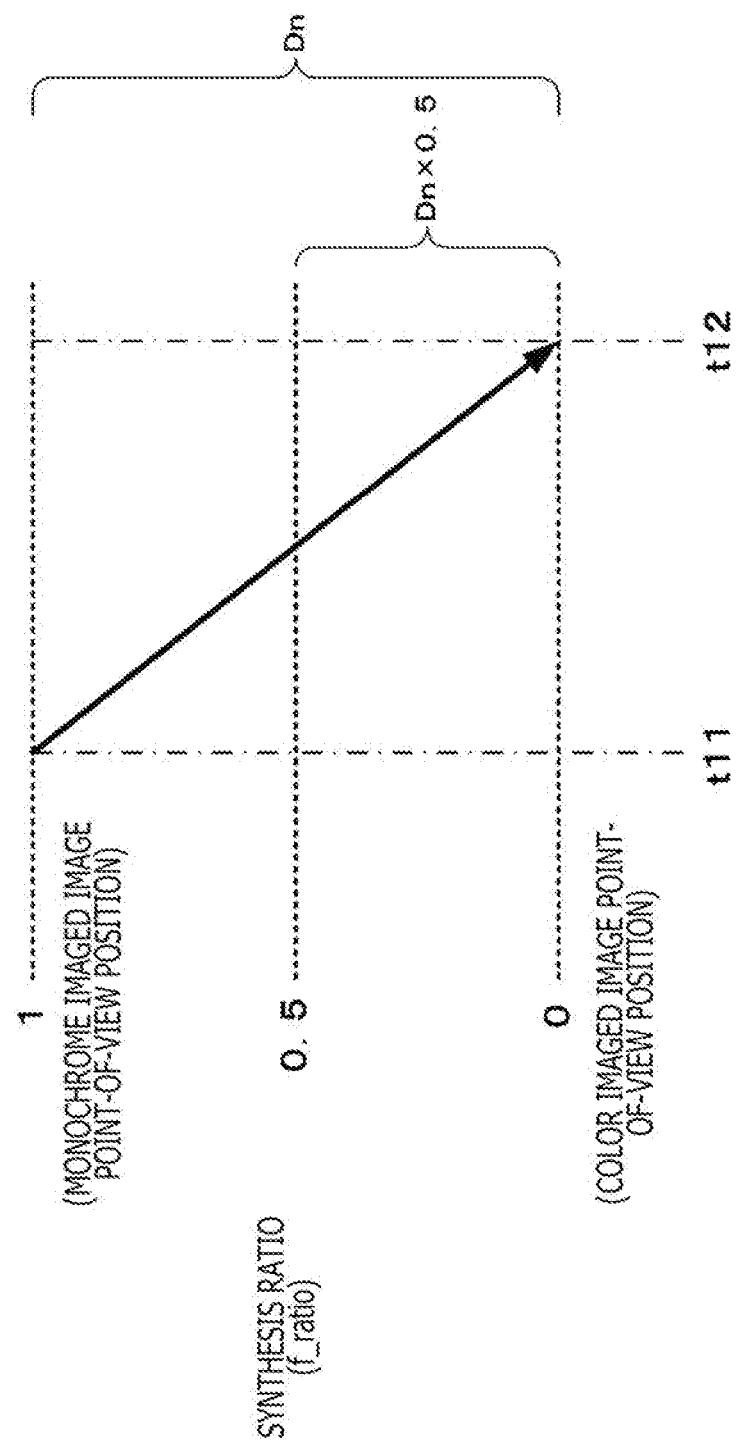
FIG. 26 is a graph exemplifying an operation in the case where a point-of-view movement image is produced as an intermediate image.

FIG. 26 exemplifies an operation in the case where a point-of-view movement image is produced as the intermediate image. Since until the time point t11, the synthesis ratio $f_{ratio}$ is "1" and it is decided that the deterioration of the image quality is not caused in the fusion image, the fusion image is outputted. When at the time point t11, it is discriminated that the deterioration of the image quality is caused in the fusion image, for a period of time from the time point t11 to the time point t12, the synthesis ratio is changed from "1" to "0." For a period of time from the time point t11 up to the time point t12, processing for moving the point-of-view position in response to the synthesis ratio for the demosaic image is executed by utilizing the parallax detected in the parallax detecting section 32. For example, in the case where the synthesis ratio $f_{ratio}$ is "0.5," if the parallax amount between the pixel GDn of the demosaic image and the pixel GFn corresponding to the fusion image is Dn, then, the pixel GDn of the demosaic image is moved by the parallax amount (Dn×0.5) and the intermediate image is produced.

According to such a third embodiment, similarly to the case of the first embodiment, by using the monochrome imaged image acquired in the imaging section 21-BW, and the color imaged image acquired in the imaging section 21-CR, the high-sensitivity color imaged image can be outputted from the image processing section 30-1 without reducing the image quality. In addition, according to the third embodiment, even in the case where the image data is switched in response to the decision result as to whether or not the deterioration of the image quality is caused in the fusion image, the switching can be made inconspicuous. Moreover, even if the deterioration speed of the image quality is high, then, the fusion image in which the image quality is deteriorated can be made to be hardly outputted.

5. Fourth Embodiment of Image Processing Apparatus

In the first to third embodiments described above, the case where the fusion image data with the monochrome imaged image as the reference is used as the fusion image data is exemplified. However, the fusion image data may be fusion image data which is produced in the fusion processing with the color imaged image acquired in the imaging section 21-CR as the reference.

Figure 27:
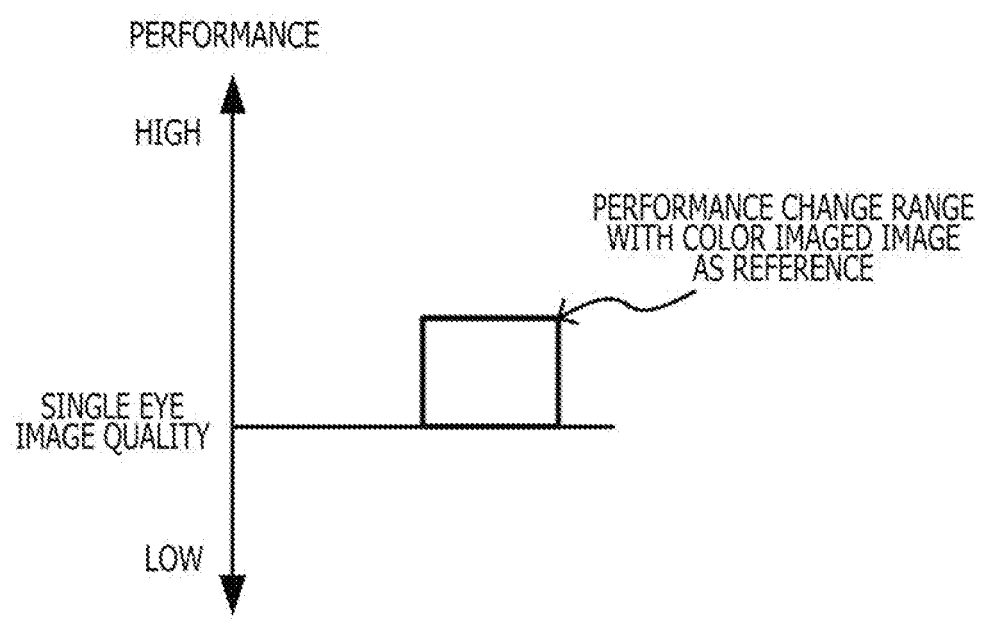
FIG. 27 is a view for explaining image quality obtained by executing fusion processing with a color imaged image as a reference.

FIG. 27 is a view for explaining the image quality which is obtained by executing the fusion processing with the color imaged image as the reference. For example, if after the monochrome imaged image is alignment with the color imaged image as the reference, the monochrome imaged image is fused to produce the fusion image, then, the sensitivity can be increased in response to the characteristics of the lens and the sensor which are used in the imaging section 21-BW without causing the color shift in the fusion image because the color imaged image is set as the reference.

5-1. Configuration and Operation of Fourth Embodiment

FIG. 28 exemplifies a configuration of a fourth embodiment. An image processing section 30-4 executes the image processing by using the image data associated with the imaged image acquired in the imaging section 21-BW and the imaging section 21-CR, and produces the high-sensitivity imaged image without reducing the image quality relative to that of the imaged image acquired in the imaging section 21-BW or the imaging section 21-CR.

The image processing section 30-4 has preprocessing sections 31-BW and 31-CR, a parallax detecting section 32, a parallax compensating section 33-bc, a demosaic processing section 34, a fusion processing section 35-fc, a fusion decision processing section 36-4, and an image synthesizing section 40-dfc.

The preprocessing section 31-BW executes the correction processing such as the lens distortion correction or the defective pixel correction for the image data associated with the monochrome imaged image acquired in the imaging section 21-BW. The preprocessing section 31-BW outputs the monochrome image data after the correction to the parallax detecting section 32, the fusion processing section 35-fc, and the fusion decision processing section 36-4.

The preprocessing section 31-CR executes the correction processing such as the lens distortion correction or the defective pixel correction for the image data associated with the color imaged image acquired in the imaging section 21-CR. The preprocessing section 31-CR outputs the pre-demosaic color image data after the correction to the parallax detecting section 32, the parallax compensating section 33-bc, the demosaic processing section 34, and the fusion decision processing section 36-4.

The parallax detecting section 32 performs the parallax detection based on the monochrome image data supplied from the preprocessing section 31-BW, and the pre-demosaic color image data supplied from the preprocessing section 31-CR, and produces the parallax information indicating the parallax calculated for each pixel. The parallax detecting section 32 outputs the parallax information thus produced to the parallax compensating section 33-bc and the fusion decision processing section 36-4.

The parallax compensating section 33-bc performs the parallax compensation for the monochrome image data based on the parallax information supplied thereto from the parallax detecting section 32. The parallax compensating section 33-bc performs the movement of the pixel position based on the parallax information produced in the parallax detecting section 32 for the monochrome image data supplied thereto from the preprocessing section 31-BW, and produces parallax compensation monochrome image data as the point of view of the color imaged image acquired in the imaging section 21-CR. The parallax compensating section 33-bc outputs the parallax compensation monochrome image data thus produced to the fusion processing section 35-fc.

The demosaic processing section 34 executes the demosaic processing by using the pre-demosaic color image data supplied thereto from the preprocessing section 31-CR. In the demosaic processing, there is executed the demosaic processing for producing the image data indicating the color components of red, blue, and green in corresponding pixels from the pre-demosaic color imaged data in which each of the pixels indicates corresponding one of the color components of red, blue and green. The demosaic processing section 34 outputs the demosaic image data produced by the demosaic processing to the image synthesizing section 40-dfc.

The fusion processing section 35-fc executes the fusion processing with the color imaged image as the reference by using the pre-demosaic color image data supplied thereto from the preprocessing section 31-CR, and the parallax compensation monochrome image data supplied thereto from the parallax compensating section 33-bc. The fusion processing section 35-fc outputs the fusion image data produced by executing the fusion processing to the image synthesizing section 40-dfc.

The fusion decision processing section 36-4 performs, based on the feature amount calculated by using the moving image of the monochrome imaged image acquired by imaging the subject and the color imaged image acquired by imaging the subject from the different point-of-view position, the fusion decision as to whether or not the deterioration of the image quality is caused in the fusion image obtained by fusion monochrome imaged image and the color imaged image with the color imaged image as the reference, for each image of the moving image. In addition, the fusion decision processing section 36-4 produces the image synthesis signal indicating the synthesis ratio of the fusion image and the color imaged image based on the fusion decision result, and outputs the image synthesis signal to the image synthesizing section 40-dfc.

The image synthesizing section 40-*dfc* synthesizes the demosaic image data produced in the demosaic processing section 34, and the fusion data produced in the fusion processing section 35-*fc* with each other based on the image synthesis signal supplied thereto from the fusion decision processing section 36-4.

The fusion decision processing section 36-4 has the configuration depicted in FIG. 7 described above. The fusion decision processing section 36-4 executes the fusion decision processing in which absence of the parallax between the fusion image and the color imaged image is into consideration. Next, a description will be given with respect to the operation of the image data selection deciding section in the fusion decision processing section 36-4.

The individual decision section 381 decides whether or not the deterioration of the image quality is caused in the fusion image based on the parallax distribution feature amount calculated in the parallax distribution feature amount calculating section 372. The individual decision section 381 compares the parallax distribution feature amount $FV_{fsd}$ with decision threshold values $Th_{fsdl}$, $Th_{fsdh}$ ($>Th_{fsdl}$) previously set for the parallax distribution feature amount. In the case where the parallax distribution feature amount $FV_{fsd}$ is larger than decision threshold value $Th_{fsdh}$, that is, in the case where the dispersion of the parallaxes is large, the individual decision section 381 sets the synthesis ratio $FR_{fsd}$ to "0." In addition, in the case where the parallax distribution feature amount $FV_{fsd}$ is equal to smaller than the decision threshold value $Th_{fsdl}$, that is, in the case where the dispersion of the parallaxes is small, the individual decision section 381 sets the synthesis ratio $FR_{fsd}$ to "1." Moreover, in the case where the parallax distribution feature amount $FV_{fsd}$ is larger than the decision threshold value $Th_{fsdl}$ and is equal to or smaller than the decision threshold value $Th_{fsdl}$, the individual decision section 381 sets the synthesis ratio $FR_{fsd}$ within "0<$FR_{fsd}$<1," for example, to the linearity according to the distance from the decision threshold value.

In addition, the individual decision section 382 to the individual decision section 385, similarly to the case of the individual decision section 381, also set the synthesis ratio based on the results of comparison of the search range over feature amount $FV_{osr}$, the parallax gap feature amount $FV_{pd}$, the saturation feature amount $FV_{sat}$, and the camera feature amount with the decision threshold values set for the respective feature amounts.

The integrated decision processing section 388 produces the image synthesis signal based on the synthesis ratios set in the individual decision sections 381 to 385 and outputs the image synthesis signal to the image synthesizing section 40-*dfc*. For example, the integrated decision processing section 388 selects a minimum value from the synthesis ratios set in the respective individual decision sections 381 to 385 and sets the selected synthesis ratio as an integrated synthesis ratio. In addition, the integrated decision processing section 388 may select a maximum value from the synthesis ratios set in the individual decision sections 381 to 385 and set the calculated synthesis ratio as the integrated synthesis ratio, or may calculate an average value of the synthesis ratios set in the individual decision sections 381 to 385 and set the calculated synthesis ratio as the integrated synthesis ratio. The integrated decision processing section 388 produces the image synthesis signal with which the integrated synthesis ratio $FR_{total}$ is set as the synthesis ratio of the fusion image and the demosaic image, and the image synthesizing section 40-*dfc* outputs a result of the calculation of (fusion image×$FR_{total}$+demosaic image×(1−$FR_{total}$).

Moreover, the integrated decision processing section 388 may set the synthesis ratios in the individual decision sections 381 to 384 for each camera feature amount. For example, by using the ISO sensitivity as the camera feature amount, the synthesis ratio may be set by using the decision threshold values which are individually provided in the individual decision sections 381 to 384 for each ISO sensitivity. In addition, in the case where the high-sensitivity demosaic image is obtained based on the camera feature amount, the image synthesis signal may be produced so as to use only the mosaic image. For example, in the case where the ISO sensitivity is lower than the predetermined sensitivity, since the high-sensitivity demosaic image is obtained, the image synthesis signal is produced so as to use only the mosaic image.

According to such a fourth embodiment, similarly to the case of the first embodiment and the like, by using the monochrome imaged image acquired in the imaging section 21-BW, and the color imaged image acquired in the imaging section 21-CR, the high-sensitivity color imaged image can be outputted from the image processing section 30-1 without reducing the image quality. That is, according to the fourth embodiment, by using the fusion image data produced in the fusion processing with the color imaged image as the reference, the high-sensitivity color imaged image having the image quality equal to or greater than that of the color imaged image acquired in the imaging section 21-CR can be outputted from the image processing section 30-4.

6. Fifth Embodiment of Image Processing Apparatus

Next, a description will be given with respect to the case where one of the fusion image data with the monochrome imaged image as the reference, and the fusion image data with the color imaged image as the reference is used as the fusion image data.

In the case where the color imaged image is set as the reference, for example, if the occlusion is caused by the parallax, then, the image data corresponding to the occlusion area is absent in the monochrome imaged image acquired in the imaging section 21-BW. For this reason, the noise amount is different between the area in which the sensitivity is increased by using the monochrome image data, and the area in which the sensitivity is not increased because of absence of the monochrome image data. Thus, in the case where the sensitivity of the fusion image is increased, the difference in noise amount becomes remarkable. In addition, if the position shift is caused between the color imaged image and the monochrome imaged image, then, in the case where the sensitivity of the fusion image is increased, the position shift becomes remarkable. Therefore, the sensitivity increasing effect in the case where the deterioration of the image quality resulting from the difference in noise amount in the fusion image with the color imaged image as the reference, or the position shift is suppressed is lower than that in the case where the monochrome imaged image is set as the reference. For this reason, in the fifth embodiment, the color imaged image having the image quality equal to or higher than that of the color imaged image acquired in the imaging section 21-CR is produced by using either the fusion image data with the color imaged image as the reference, or the fusion image data with the monochrome imaged image as the reference so as not to cause the deterioration of the image quality.

6-1. Configuration and Operation of Fifth Embodiment

Figure 29:
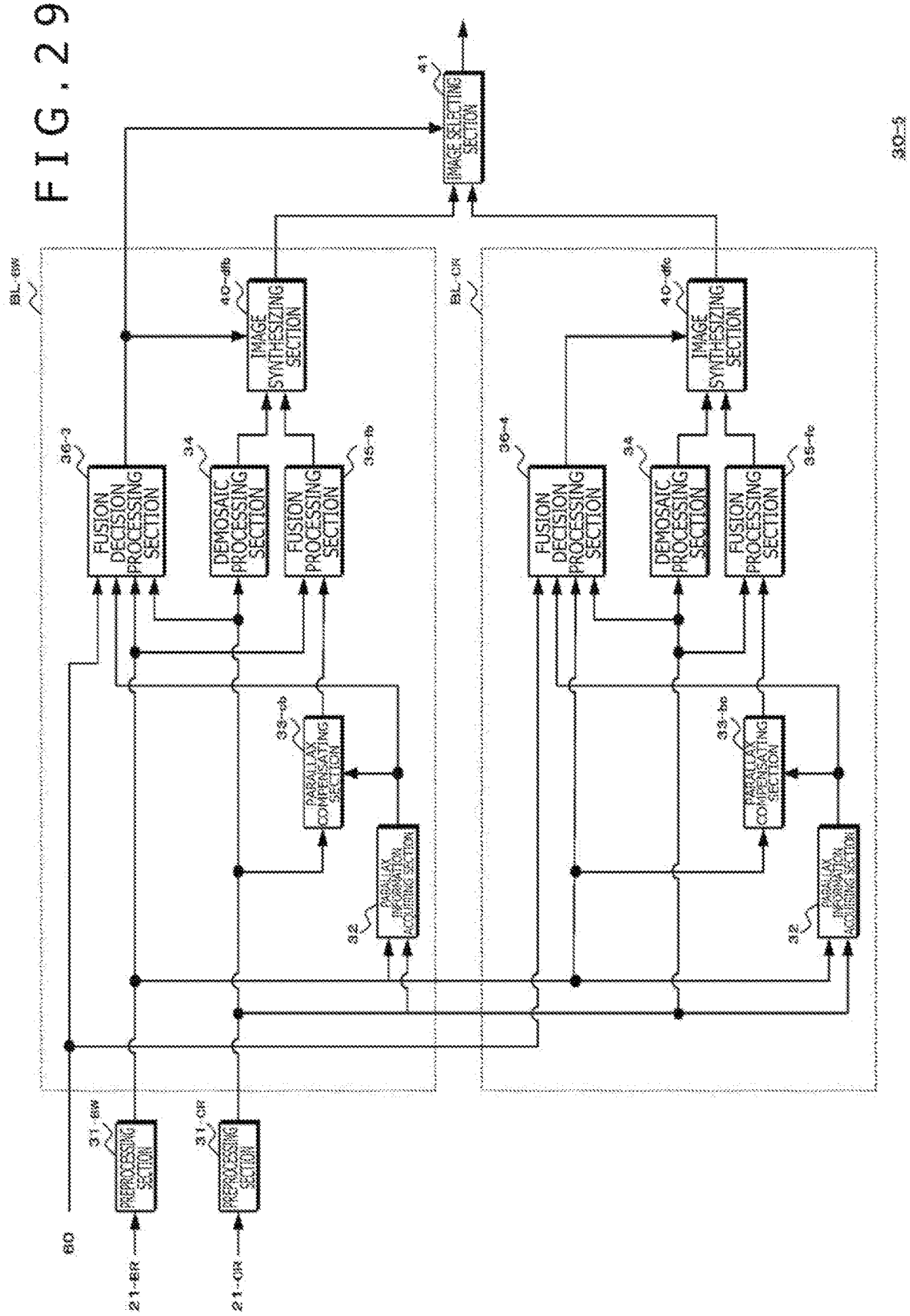
FIG. 29 is a block diagram exemplifying a configuration of a fifth embodiment.

FIG. 29 exemplifies a configuration of the fifth embodiment. An image processing section 30-5 executes the image processing by using the image data associated with the respective imaged images acquired in the imaging section 21-BW and the imaging section 21-CR and produces the high-sensitivity imaged image without reducing the image quality relative to the imaged images which are individually acquired in the imaging section 21-BW and the imaging section 21-CR.

The image processing section 30-5 has preprocessing sections 31-BW and 31-CR, image producing sections BL-BW, BL-CR, and an image selecting section 41.

The preprocessing section 31-BW executes the correction processing such as the lens distortion correction and the defective pixel correction for the image data associated with the monochrome imaged image acquired in the imaging section 21-BW. The preprocessing section 31-BW outputs the monochrome image data after the correction to each of the image producing sections BL-BW and BL-CR.

The preprocessing section 31-CR executes the correction processing such as the lens distortion correction and the defective pixel correction for the image data associated with the color imaged image acquired in the imaging section 21-CR. The preprocessing section 31-CR outputs the pre-demosaic color signal data after the correction to each of the image producing sections BL-BW and BL-CR.

The image producing section BL-BW, similarly to the third embodiment described above has the parallax detecting section 32, the parallax compensating section 33-cb, the demosaic processing section 34, the fusion processing section 35-fb, the fusion decision processing section 36-3, and the image synthesizing section 40-dfb. The image producing section BL-BW executes the processing similar to the case of the third embodiment, and produces a synthesis image obtained by synthesizing the fusion image data and the demosaic image data with the monochrome imaged image as the reference in response to the fusion decision. The image producing section BL-BW outputs the image data associated with the synthesis image thus produced to the image selecting section 41.

The image producing section BL-CR, similarly to the case of the fourth embodiment described above, has the parallax detecting section 32, the parallax compensating section 33-bc, the demosaic processing section 34, the fusion processing section 35-fc, the fusion decision processing section 36-4, and the image synthesizing section 40-dfc. The image producing section BL-CR executes the processing similar to the case of the fourth embodiment, and produces a synthesis image obtained by synthesizing the fusion image data and the demosaic image data with the color imaged image as the reference in response to the fusion decision. The image producing section BL-CR outputs the image data associated with the synthesis image thus produced to the image selecting section 41.

In addition, the fusion decision processing section of the image producing section BL-BW or the image producing section BL-CR produces an image selection signal used to select the image data associated with the synthesis image produced in either the image producing section BL-BW or the image producing section BL-CR. It should be noted that FIG. 29 exemplifies the case where the image selection signal is produced in the fusion decision processing section 36-3 of the image producing section BL-BW.

The fusion decision processing section 36-3 performs the fusion decision based on the camera feature amount and the image feature amount, and produces the image selection signal in such a way that the high-sensitivity imaged image can be produced in the image processing section without causing the deterioration of the image quality. The case where the image selection signal is produced in response to the ISO sensitivity is exemplified.

Figure 30:
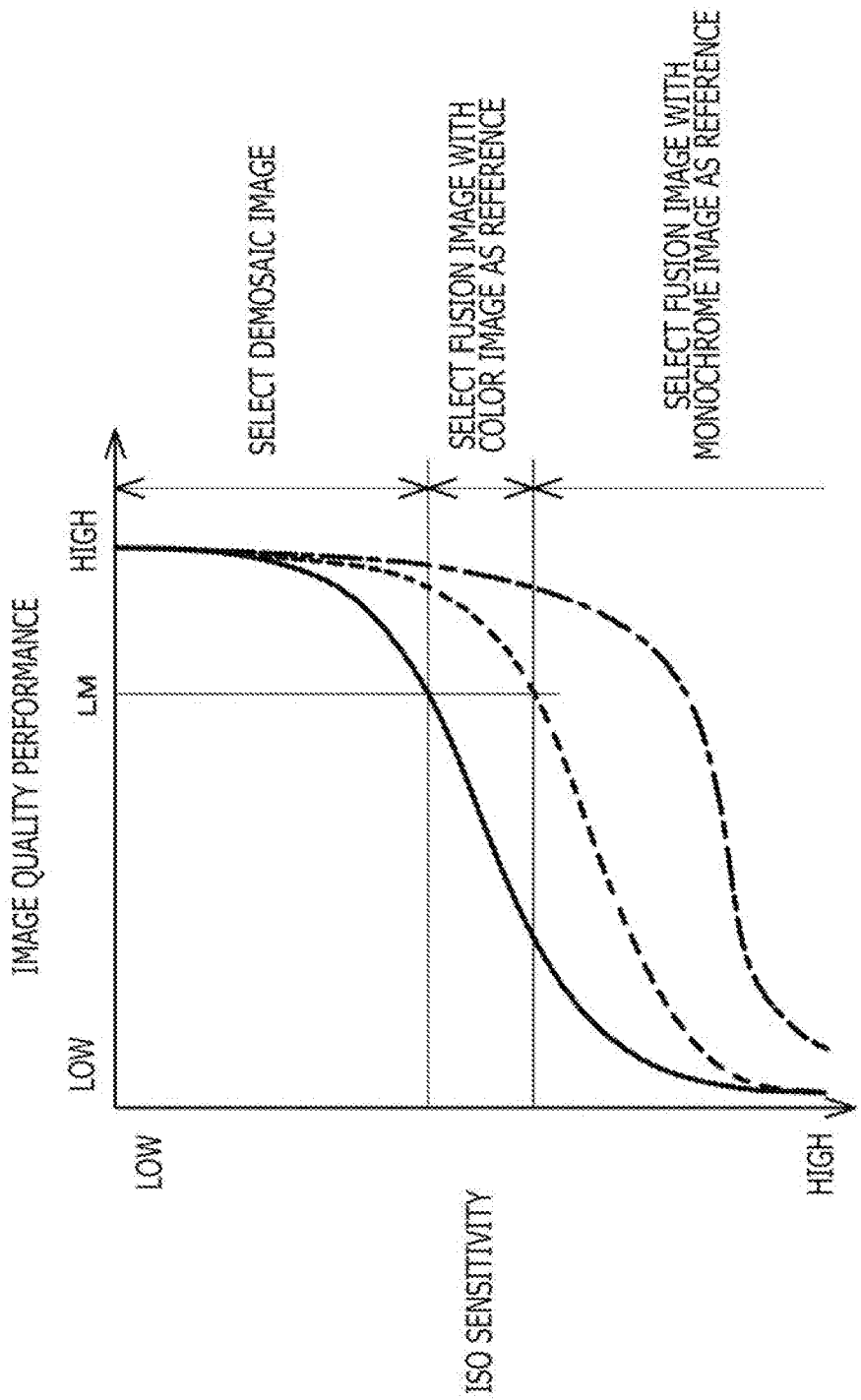
FIG. 30 is a graph exemplifying a relation among the image quality and the ISO sensitivity of a demosaic image and a fusion image.

FIG. 30 exemplifies a relation between the image quality of the demosaic image and the image quality of the fusion image, and the ISO sensitivity. It should be noted that a solid line indicates the demosaic image, a dotted line indicates the fusion image with the color imaged image as the reference, and a chain line indicates the fusion image with the monochrome imaged image as the reference.

In the case of an imaging environment in which the ISO sensitivity is set low, the demosaic image becomes the high-image quality image in which the noise is less. Thereafter, for the purpose of avoiding the risk of the deterioration of the image quality due to the use of the fusion image, the fusion decision processing section 36-3 produces the image selection signal so as to select the demosaic image, for example, in an ISO sensitivity range in which the imaged image having the image quality performance (sensitivity) equal to or higher than the desired image quality performance (sensitivity) LM can be produced.

In the case of an imaging environment in which the ISO sensitivity is set high, the demosaic image becomes the image in which the noise is increased to reduce the image quality. In addition, although the fusion image with the color imaged image as the reference agrees in point of view with the demosaic image, the risk of the deterioration of the image quality resulting from the parallax is small, the sensitivity increasing effect is low relative to the fusion image with the monochrome imaged image as the reference. In addition, although in the fusion image with the monochrome image as the reference, the sensitivity increasing effect is high relative to the fusion image with the color imaged image as the reference. However, since the parallax with the demosaic image is caused, the risk of the deterioration of the image quality is high relative to the fusion image with the color imaged image as the reference. Therefore, in the case where the ISO sensitivity, for example, is equal to or higher than the sensitivity at which the image quality of the demosaic image is reduced to a lower level than that of the desired image quality performance (sensitivity) LM, the fusion decision processing section 36-3 produces the image selection signal so as to select the fusion image with the color imaged image as the reference in order to obtain the sensitivity increasing effect. Moreover, in the case where the ISO sensitivity, for example, is lower than the sensitivity at which the image quality of the fusion image with the color imaged image as the reference is reduced to a lower level than that of the desired image quality LM, for the purpose of more increasing the sensitivity increasing effect, the fusion decision processing section 36-3 produces the image selection signal so as to select the fusion image with the monochrome imaged image as the reference. If the image selection signal is produced in such a way, then, the risk of the deterioration of the image quality is low, and the image data outputted from the image processing section 30-5 becomes the image data associated with the high-sensitivity imaged image.

It should be noted that the fusion decision processing section 36-3 may produce the image selection signal in such a way that the image data associated with the high-sensitivity imaged image in which the risk of the deterioration of the image quality is low is outputted from the image processing section 30-5 based on other camera feature amount or image feature amount in addition to the ISO sensitivity. For example, in the case where the parallax distribution feature amount $FV_{fsd}$ or the like is equal to or lower than the decision threshold value, the fusion decision processing section 36-3 discriminates that the risk of the deterioration in image quality due to the use of the fusion image with the monochrome imaged image as the reference is low, and selects the fusion image with the monochrome imaged image as the reference. In addition, in the case where the parallax distribution feature amount $FV_{fsd}$ or the like is larger than the decision threshold value, the fusion decision processing section 36-3 may discriminate that the risk of the deterioration in image quality due to the use of the fusion image with the monochrome imaged image as the reference is large, and may select the fusion image with the color imaged image as the reference.

According to such a fifth embodiment, similarly to the first embodiment and the like, by using the monochrome imaged image acquired in the imaging section 21-BW, and the color imaged image acquired in the imaging section 21-CR, the high-sensitivity color imaged image can be outputted from the image processing section 30-1 without reducing the image quality. Moreover, according to the fifth embodiment, as compared with the case of the first to fourth embodiments described above, the high-sensitivity imaged image in which the risk of the deterioration of the image quality is low can be obtained.

Incidentally, in the case where the imaged image is the still image, in the parallax compensating section in the image producing section, the parallax compensation for the monochrome imaged image and the parallax compensation for the color imaged image is performed by the switching. In the fusion processing section, the production of the fusion image with the color imaged image as the reference, the production of the fusion image with the monochrome imaged image as the reference are performed by switching. In addition, in the fusion decision processing section, the fusion decision is performed based on the camera feature amount and the image feature amount, and the operations of the parallax compensating section, the fusion processing section, and the image synthesizing section are controlled in such a way that the high-sensitivity imaged image can be produced without causing the deterioration of the image quality. When such a configuration is adopted, even if the image producing section BL-BW and the image producing section BL-CR are not individually provided like the fifth embodiment, by switching the operation of the image producing section, similarly to the case of the fifth embodiment, the high-sensitivity still image in which the risk of the deterioration of the image quality is low can be obtained.

7. Other Embodiments

Incidentally, in the color imaged image, the dispersions of the luminance components and the color components are largely different from each other in some cases. In such cases, for example, even when the luminance components are flat in level and a difference with the monochrome imaged image is small, and thus it is decided that the deterioration of the image quality is not caused based on the image feature amount, there is also the possibility that the large dispersion of the color components causes the deterioration of the image quality. Then, the fusion decision processing section may decide whether or not the deterioration of the image quality is caused in consideration of the dispersion as well of the color components.

In addition, in the imaging of the moving image, there is the subject which comes from the end portion into the inside. However, in the first to third embodiments, the decision as to whether or not the fusion processing can be executed is performed by using the entire image of the calculation target area depicted in FIG. 8. For this reason, even if the image of interest becomes the image such that the end portion area is imaged as the image in which the deterioration of the image quality is caused, unless the calculation target area is imaged as the image in which the deterioration of the image quality is caused, the image of interest becomes the image in which the deterioration of the image quality is caused in the end portion area. Then, the fusion decision processing section may decide whether or not the deterioration of the image quality is caused in consideration of the image change of the end portion area.

Figure 31:
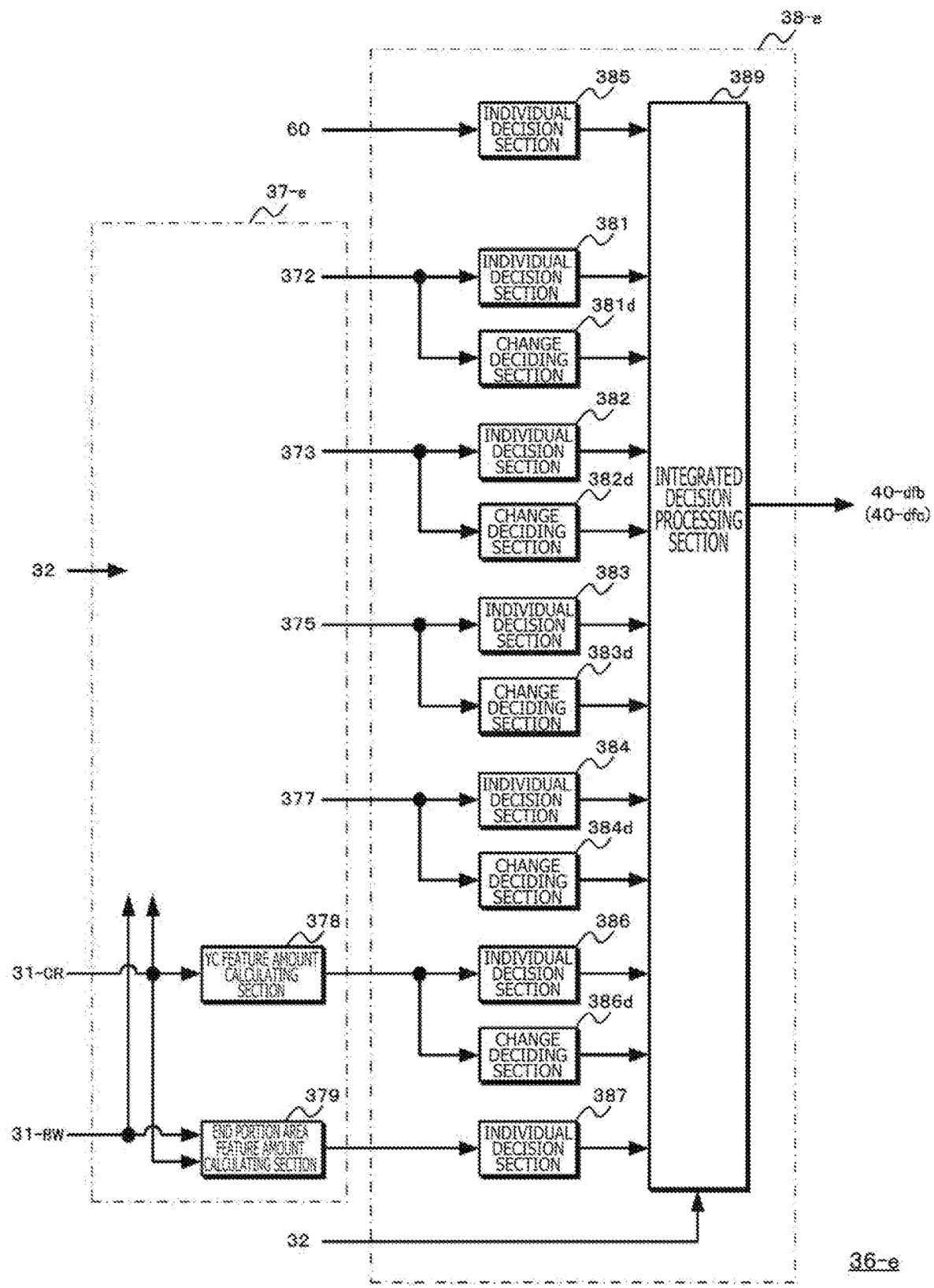
FIG. 31 is a block diagram exemplifying a configuration of a part of a fusion decision processing section.

FIG. 31 exemplifies a configuration of a part of the fusion decision processing section for deciding whether or not the deterioration of the image quality is caused by the fusion processing by further using the dispersion of the color components and the image change of the end portion area.

An image feature amount calculating section 37-*e* of a fusion decision processing section 36-*e* further has a YC feature amount calculating section 378 and an end portion area feature amount calculating section 379.

An YC feature amount calculating section 378 calculates a luminance component data and the color component data based on the pre-demosaic color image data supplied thereto from the preprocessing section 31-CR. Moreover, the YC feature amount calculating section 378 calculates the statistic indicating the feature of the signal value distribution, for example, the standard deviation as the feature amount with respect to the luminance component data and the color component data. Moreover, the YC feature amount calculating section 378 calculates a difference in feature amount between the luminance component data and the color component data as a YC feature amount $FV_{yc}$.

The end portion area feature amount calculating section 379 calculates an average value of pixels the end portion area with respect to the monochrome imaged image acquired in the imaging section 21-BW, and the color imaged image acquired in the imaging section 21-CR. In addition, the end portion area feature amount calculating section 379 sets an absolute value of the difference of the average value of the pixels the end portion area in the monochrome imaged image, and the average value of the pixels of the end portion area in the color imaged image as an end portion area feature amount $FV_{ed}$.

The image data selection deciding section 38-*e* performs the decision as to whether or not the deterioration of the image quality is caused in fusion image based on the image feature amount calculated in the image feature amount calculating section 37-*e*, and the camera feature amount acquired from the control section 60 or the like. In addition, the image data selection deciding section 38-*e* produces the image synthesis signal based on the discrimination result and the change amount in the time direction of the image feature amount. The image data selection deciding section 38-*e* has a configuration in which the individual decision section 386, and the change deciding sections 386*d* and 387*d* are added to the image data selection deciding section 38-3 described above.

The individual decision section 386 decides whether or not the deterioration of the image quality is caused in the fusion processing based on the YC feature amount $FV_{yc}$ calculated in the YC feature amount calculating section 378. The individual decision section 386 compares the YC feature amount $FV_{yc}$ with a decision threshold value $Th_{yc}$ previously set for the YC feature amount. In the case where the YC feature amount $FV_{yc}$ is larger than the decision threshold value $Th_{yc}$, the individual decision section 386 decides that the deterioration of the image quality is caused in the fusion processing. The individual decision section 386 outputs the individual decision result to the integrated decision processing section 389.

The change amount deciding section 386d calculates a temporal change amount ($FV_{yc(i)} - FV_{yc(i-1)}$) of the YC feature amount calculated in the YC feature amount calculating section 378. The change amount deciding section 386d compares an absolute value of the calculated change amount with a change amount threshold value $Th_{dyc}$ previously set, and outputs the comparison result to the integrated decision processing section 389.

The individual decision section 387 calculates a temporal change amount of the end portion area feature amount calculated in the end portion area feature amount calculating section 379. The individual decision section 387 compares an absolute value of the calculated change amount with a change amount threshold value previously set. In the case where the absolute value of the change amount is larger than the decision threshold value, the individual decision section 387 decides that the deterioration of the image quality is caused in the fusion processing. The individual decision section 387 outputs the individual decision result to the integrated decision processing section 389.

The integrated decision processing section 389 performs the fusion decision by using the individual decision results supplied thereto from the individual decision sections 381-1 to 387, and the change amount decision result, and produces the image synthesis signal in response to the fusion decision result to output the image synthesis signal to the image synthesizing section 40-dfb (40-dfc). In addition, the integrated decision processing section 389 determines the speed of the switching from the fusion image data to the demosaic image data based on the result of the comparison between the change amounts supplied thereto from the change amount deciding sections 381d to 384d and 386d, and the change amount threshold value. Moreover, the integrated decision processing section 389 sets the synthesis ratio indicated by the image synthesis signal in response to the switching speed thus determined.

Figure 32:
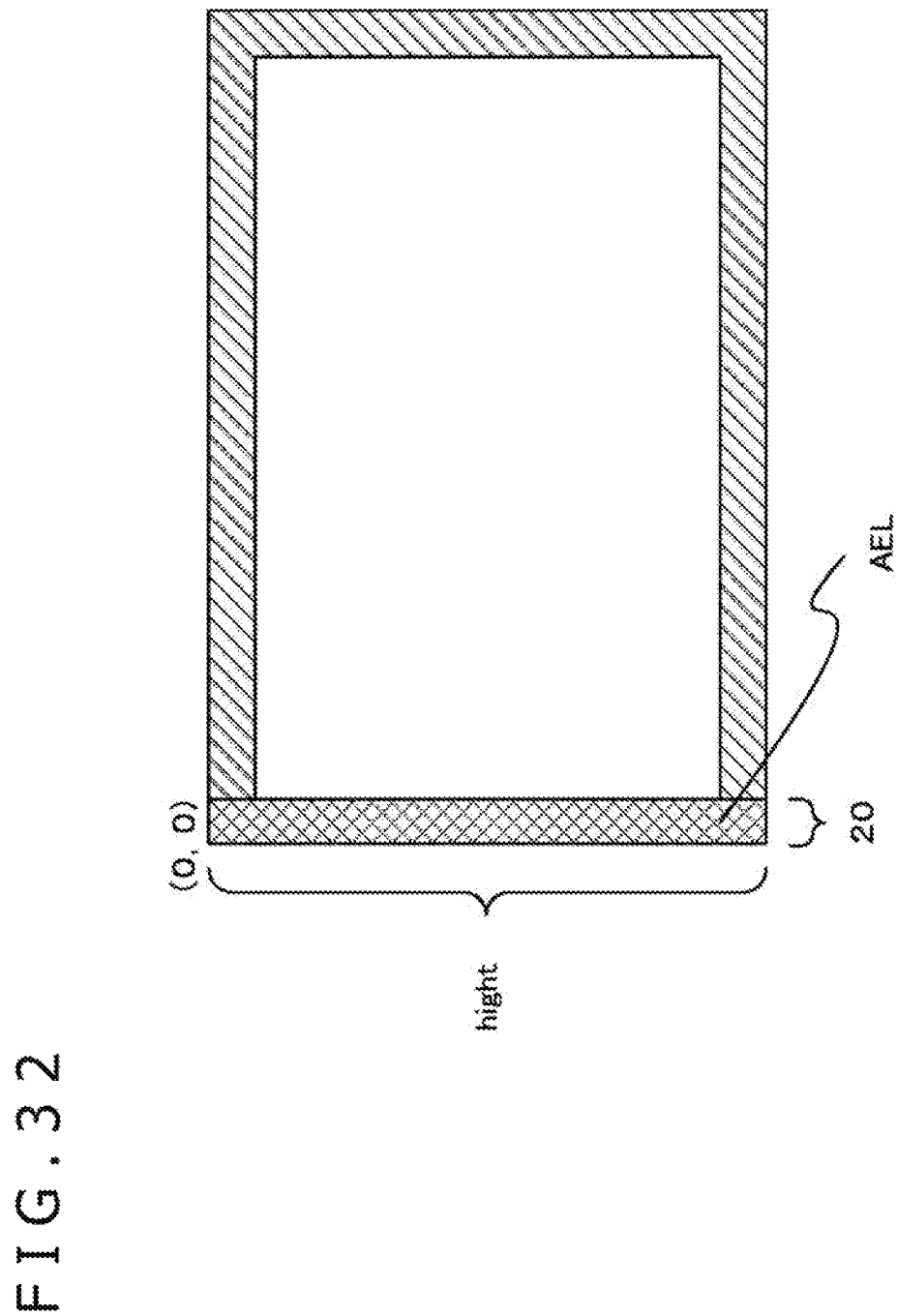
FIG. 32 is a view exemplifying an end portion area.

FIG. 32 is a view exemplifying an end portion area. When in the monochrome imaged image and the color imaged image, for example, a pixel position of the top left pixel is set as (0, 0), the end portion area feature amount $FV_e d$ of the end portion area AEL in the left-hand side end can be calculated based on Expression (6) where the number of pixels in the horizontal direction of the end portion area is 20, the number of pixels in the vertical direction is bight, the pixel value of the color imaged image is DB, the pixel value of the monochrome imaged image is DW, and the frame number is i. In addition, the end portion area feature amount calculating section 379 calculates an end portion area feature amount similarly to the case of the end portion area AEL with respect to end portion areas of upper and lower ends and the right-hand end which are indicated by slant lines of FIG. 32. In addition, the end portion area feature amount calculating section 379 may calculate the end portion area feature amount with the end portion areas being collected as one area.

[Math. 1]

$$FVed = \left\| \frac{1}{20 \times height} \left( \sum_{x=0}^{20} \sum_{y=0}^{height} (DB_{x,y}^i) - \sum_{x=0}^{20} \sum_{y=0}^{height} (DW_{x,y}^i) \right) - \left| \frac{1}{20 \times height} \right. \right.$$
$$\left. \left( \sum_{x=0}^{20} \sum_{y=0}^{height} (DB_{x,y}^{i-1}) - \sum_{x=0}^{20} \sum_{y=0}^{height} (DW_{x,y}^{i-1}) \right) \right\| \quad (6)$$

If it is decided whether or not the deterioration of the image quality is caused in the fusion image in consideration of the dispersion of the luminance components and the dispersion of the color components in such a manner, even in the case where the dispersion of the luminance components and the dispersion of the color components are largely different from each other, the decision can be accurately performed in such a way that the deterioration of the image quality is not caused. In addition, if it is decided whether or not the deterioration of the image quality is caused by using the end portion area feature amount, then, the decision can be performed in such a way that the deterioration of the image quality is not caused with respect to the subject image which comes into the inside from the end portion. Therefore, the color imaged image, having the high-image quality, which can cope with the various image situations compared to the embodiments described above can be outputted from the image processing section.

It should be noted that the fusion decision processing section may decide whether or not the deterioration of the image quality is caused in the fusion image by using any of the feature amounts in addition to the case of all the feature amounts of the embodiments described above. In addition, if the utilization can be performed for the decision as to whether or not the deterioration of the image quality is caused, then, the feature amount which is not indicated in each of the embodiments described above may be used. Moreover, although in each of the embodiments described above, the imaging section 21-BW performs the monochrome imaged image, if the monochrome imaged image is acquired by using an imaging section having sensitivity in an infrared region as the imaging section 21-BW, then, even in the night or the like, the image quality can be increased. In addition, in each of the embodiments described above, there is exemplified the case where the first imaged image obtained by imaging the subject is the monochrome imaged image, and the second imaged image obtained by imaging the subject from the different point-of-view position is the color imaged image, and the synthesis ratio is changed in such a way that with respect to the fusion image, obtained by the fusion of the monochrome imaged image and the color imaged image with the monochrome imaged image as the reference, and the color imaged image, the one image is switched over to the other image with a lapse of time. However, the present technology is by no means limited to the case where the first imaged image is the monochrome imaged image and the second imaged image is the color imaged image. For example, the second imaged image may be the monochrome imaged image or the like which is different in image quality characteristics from the first imaged image.

8. Application Examples

The technology according to the present disclosure can be applied to the various products. For example, the technology according to the present disclosure may be realized in the form of not only the information processing terminal, but also an apparatus mounted to any kind of moving body such as an automobile, an electric car, a hybrid electric car, a motorcycle, a bicycle, a personal mobility, an airplane, a drone, a ship, a robot, a construction, machinery, or an agricultural machine (tractor).

Figure 33:
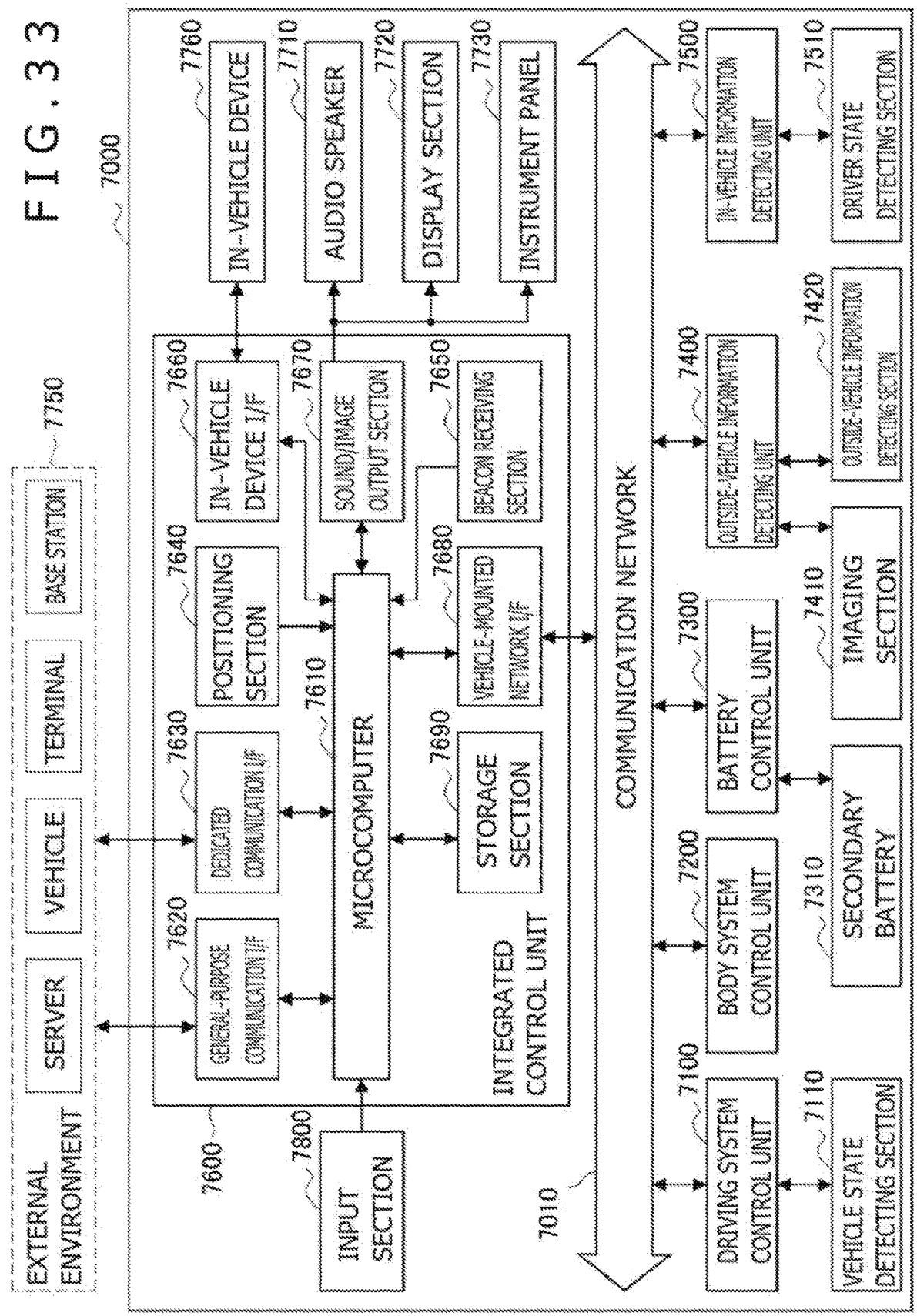
FIG. 33 is a block diagram depicting an example of schematic configuration of a vehicle control system.

FIG. 33 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 33, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 33 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 34:
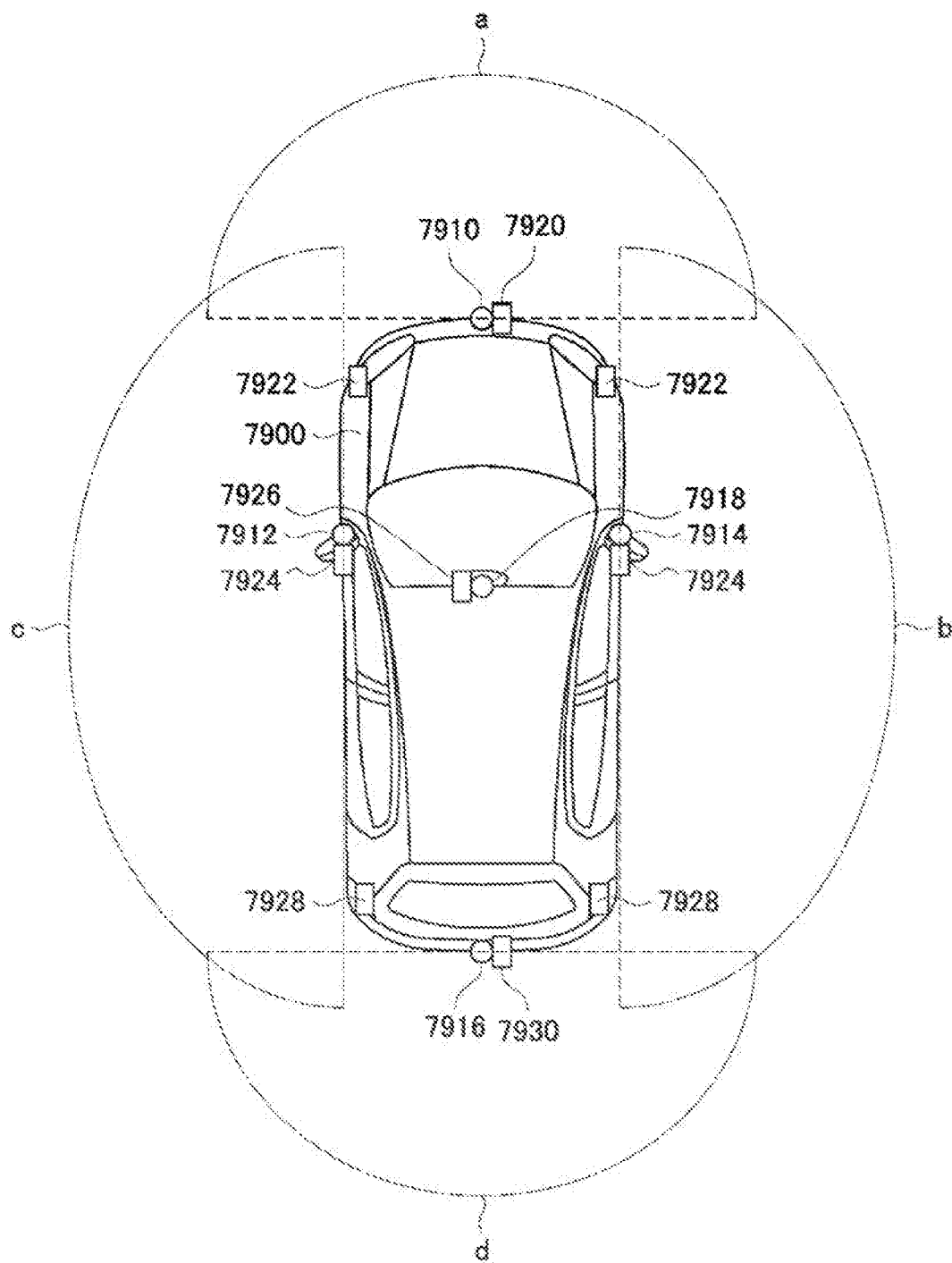
FIG. 34 is a diagram of assistance in explaining an example of installation positions of an outside-vehicle information detecting section and an imaging section.

FIG. 34 depicts an example of installation positions of the imaging section 7410 and the outside-vehicle information detecting section 7420. Imaging sections 7910, 7912, 7914, 7916, and 7918 are, for example, disposed at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 34 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 33, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 33, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 33 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the vehicle control system 7000 described above, each of the imaging sections 7410, 7910, 7912, 7914, 7916 and 7918 is configured to use a plurality of imaging sections, for example, the imaging sections 21-BW and 21-CR depicted in FIG. 2. In addition, the integrated control unit 7600 of the application example depicted in FIG. 33 is provided with the image processing section 30. If such a configuration is adopted, the high-performance imaged image can be acquired even when each of the imaging sections 7410 7910, 7912, 7914, 7916 and 7918 is miniaturized/thinned. Therefore, the acquired imaged image can be utilized for the driving support, the driving control and the like. It should be noted that the image processing section 30 may be realized in a module (for example, an integrated circuit module configured by one die) for the integrated control unit 7600 depicted in FIG. 33.

The series of pieces of the processing described in the description can be executed by hardware or software, or a composite configuration of both of them. In the case where the processing by the software is executed, a program in which a processing sequence is recorded is installed in a memory within a computer incorporated in dedicated hardware and is executed. Alternatively, a program can be installed in a general-purpose computer which can execute various kinds of processing, and can be executed.

For example, a program can be previously recorded in a hard disc, a Solid State Drive (SSD), or a Read Only Memory (ROM) as a recording medium. Alternatively, the program can be temporarily or permanently stored (recorded) in a removable recording medium such as a flexible disc, a Compact Disc Read Only Memory (CD-ROM), a Magneto Optical (MO) disc, a Digital Versatile Disc (DVD), a Blu-Ray Disc (registered trademark) (BD), a magnetic disc, or a semiconductor memory card. Such a removable recording medium can be provided as so-called package software.

In addition, the program may also be transferred to the computer in a wireless or wired manner through a network such as a Local Area Network (LAN) or the Internet from a download site in addition to the installation from the removable recording medium to the computer. The computer can receive the program transferred thereto in such a manner and can install the program in the recording medium such as the built-in hard disc.

It should be noted that the effect described in this description is merely the exemplification, and is by no means limited thereto, and an additional effect which is not described herein may be offered. In addition, the present technology should not be interpreted to be limited to the embodiments of the technology described above. The embodiments of the technology described above disclose the present technology in the form of the exemplifications, and it is obvious that a person skilled in the art can make modifications or substitutions in the embodiments without departing from the subject matter of the present technology. That is, for deciding the subject matter of the present technology, claims should be taken into consideration.

In addition, the image processing apparatus of the present technology can also adopt the following constitutions.

(1)

An image processing apparatus including:

a fusion decision processing section that performs, based on a feature amount calculated by using a moving image of a first imaged image obtained by imaging a subject and a second imaged image obtained by imaging the subject from a different point-of-view position, fusion decision as to whether or not deterioration of image quality is caused in a fusion image obtained by fusion of the first imaged image and the second imaged image with the first imaged image as a reference, for each image of the moving image, in which the fusion decision processing section includes a fusion decision processing section that changes, based on a result of the fusion decision and the feature amount, a synthesis ratio in such a way that with respect to the fusion image and the second imaged image, one image is switched over to the other image with a lapse of time.

(2)

The image processing apparatus according to (1), in which in a case where the fusion decision processing section decides that the deterioration of the image quality is not caused, the fusion decision processing section performs the switching over to the fusion image, and in a case where the fusion decision processing section decides that the deterioration of the image quality is caused, the fusion decision processing section performs the switching over to the second imaged image, and the fusion decision processing section successively changes the synthesis ratio with a lapse of time to switch the one image over to the other image.

(3)

The image processing apparatus according to (2), in which the fusion decision processing section changes the synthesis ratio in such a way that a speed of the switching from the fusion image over to the second imaged image becomes equal to or higher than a speed of the switching from the second imaged image over to the fusion image.

(4)

The image processing apparatus according to (3), in which the fusion decision processing section sets the switching speed in response to a change amount of the feature amount.

(5)

The image processing apparatus according to any one of (1) to (4), further including:

an image synthesizing section that performs processing for synthesizing the fusion image and the second imaged image in accordance with the synthesis ratio set by the fusion decision processing section, and produces synthesis image data.

(6)

The image processing apparatus according to (5), in which the image synthesizing section synthesizes the fusion image and the second imaged image at a rate according to the synthesis ratio, and produces an intermediate image in middle of the image switching.

(7)

The image processing apparatus according to (5), in which the image synthesizing section produces an image in a point-of-view position according to the synthesis ratio from the second imaged image, and sets the resulting image as an intermediate image in middle of the image switching.

(8)

The image processing apparatus according to any one of (2) to (7), in which the fusion decision processing section calculates the feature amount based on a parallax between the first imaged image and the second imaged image.

(9)

The image processing apparatus according to (8), in which the fusion decision processing section sets a statistic indicating a dispersion of the parallaxes for each pixel as the feature amount, and in a case where the dispersion of the parallaxes is larger than a decision threshold value previously set, decides that deterioration of image quality is caused, and in a case where a time change of the statistic indicating the dispersion is larger than a change threshold value previously set, makes the speed of switching from the fusion image to the second imaged image higher than a predetermined switching speed.

(10)

The image processing apparatus according to (8) or (9), in which the fusion decision processing section sets a rate of pixels exceeding a parallax amount in a predetermined range in the parallaxes for each pixel as the feature amount, and in a case where the rate of the pixels exceeding the parallax amount in the predetermined range is larger than a rate of a decision threshold value previously set, decides that deterioration of image quality is caused, and in a case where a time change of the rate is larger than a change threshold value previously set, makes the speed of switching from the fusion image to the second imaged image higher than a predetermined switching speed.

(11)

The image processing apparatus according to any one of (8) to (10), in which the fusion decision processing section calculates, for each pixel, an absolute value of a parallax difference between a pixel located apart in a parallax direction from the pixel of interest by a predetermined distance and a pixel located apart in a reverse direction from the pixel of interest by the predetermined distance, sets a rate of pixels exceeding in the parallax difference absolute value a predetermined amount as the feature amount, and in a case where the rate of the pixels exceeding the predetermined amount is larger than a rate of the decision threshold value, decides that deterioration of image quality is caused, and in a case where a time change of the rate is larger than a change threshold value previously set, makes the speed of switching from the fusion image to the second imaged image higher than a predetermined switching speed.

(12)

The image processing apparatus according to any one of (2) to (11), in which the fusion decision processing section calculates the feature amount based on saturation of the pixels of the first imaged image and the second imaged image.

(13)

The image processing apparatus according to any one of (2) to (12), in which the fusion decision processing section calculates a feature amount based on a difference between the number of pixels exceeding a saturation decision setting value in luminance component image data produced from image data associated with the second imaged image and the number of pixels exceeding a saturation decision setting value in image data associated with the first imaged image, decides that deterioration of image quality is caused in a case where the feature amount is larger than a decision threshold value, and in a case where a time change in difference between the numbers of pixels is larger than a change threshold value previously set, makes the speed of switching from the image data of the fusion image to the image data of the second imaged image higher than a predetermined switching speed.

(14)

The image processing apparatus according to any one of (2) to (13), in which the fusion decision processing section produces luminance component image data and color component image data from image data associated with the second imaged image, and in a case where a difference between a dispersion of the luminance component image data and a dispersion of the color component image data is larger than a decision threshold value, decides that deterioration of image quality is caused, and in a case where a time change in difference between the dispersions is larger than a change threshold value previously set, makes the speed of switching from the fusion image to the second imaged image higher than a predetermined switching speed.

(15)

The image processing apparatus according to any one of (1) to (14), in which the fusion decision processing section sets a time change in a difference in signal level between an end portion area of the first imaged image and an end portion area of the second imaged image as the feature amount, and in a case where the signal level difference is larger than a decision threshold value previously set, decides that deterioration of image quality is caused.

(16)

The image processing apparatus according to any one of (1) to (15), in which the first imaged image is a monochrome imaged image, and the second imaged image is a color imaged image.

INDUSTRIAL APPLICABILITY

According to the image processing apparatus and the image processing method of the present technology, based on the feature amount calculated by using the moving image of the first imaged image obtained by imaging the subject and the second imaged image obtained by imaging the subject from the different point-of-view position, the fusion decision as to whether or not the deterioration of the image quality is caused in the fusion image obtained by fusion of the first imaged image and the second imaged image with the imaged image as the reference is performed for each image of the moving image, and based on the result of the fusion decision and the feature amount, the synthesis ratio is changed in such a way that with respect to the fusion image and the second imaged image, one image is switched over to the other image with the lapse of time. For this reason, by using the imaged images acquired in a plurality of imaging sections, the high-image quality imaged image in which the image switching is inconspicuous can be produced. Therefore, the present technology is suitable for the apparatus, using an imaging section, for which the miniaturization and the thinning of the imaging section are required.

REFERENCE SIGNS LIST

10 . . . Information processing terminal, 21-BW, 21-CR . . . Imaging section, 30, 30-1 to 30-5 . . . Image processing section, 31-BW, 31-CR . . . Preprocessing section, 32 . . . Parallax detecting section, 33-*cb*, 33-*bc* . . . Parallax compensating section, 34 . . . Demosaic processing section, 35-*fb*, 35-*fc* . . . Fusion processing section, 36-1 to 36-4, 36-*e* . . . Fusion decision processing section, 37, 37-*e* . . . Image feature amount calculating section, 38-1 to 38-3, 38-*e* . . . Image data selection deciding section, 39, 41 . . . Image selecting section, 40-*dfb*, 40-*dfc* . . . Image synthesizing section, 51 . . . Sensor section, 52 . . . Communication section, 53 . . . Display section, 54 . . . Touch panel, 55 . . . Manipulation section, 56 . . . Storage section, 371 . . . Parallax histogram producing section, 372 . . . Parallax distribution feature amount calculating section, 373 . . . Search range over feature amount calculating section, 374 . . . Parallax gap histogram producing section, 375 . . . Parallax gap feature amount calculating section, 376 . . . Saturation decision histogram producing section, 377 . . . Saturation feature amount calculating section, 378 . . . YC feature amount calculating section, 379 . . . End portion area feature amount calculating section, 380 . . . Decision threshold value setting section, 381 to 387 . . . Individual decision section, 381*d* to 386*d* . . . Change amount deciding section, 388, 389 . . . Integrated decision processing section

The invention claimed is:

1. An image processing apparatus comprising:
a fusion decision processing section that performs, based on a feature amount calculated by using a moving image of a first imaged image obtained by imaging a subject and a second imaged image obtained by imaging the subject from a different point-of-view position, fusion decision as to whether or not deterioration of image quality is caused in a fusion image obtained by fusion of the first imaged image and the second imaged image with the first imaged image as a reference, for each image of the moving image,
wherein the fusion decision processing section includes a fusion decision processing section that changes, based on a result of the fusion decision and the feature amount, a synthesis ratio in such a way that with respect to the fusion image and the second imaged image, one image is switched over to the other image with a lapse of time.

2. The image processing apparatus according to claim 1, wherein in a case where the fusion decision processing section decides that the deterioration of the image quality is not caused, the fusion decision processing section performs the switching over to the fusion image, and in a case where the fusion decision processing section decides that the deterioration of the image quality is caused, the fusion decision processing section performs the switching over to the second imaged image, and the fusion decision processing section successively changes the synthesis ratio with the lapse of time to switch the one image over to the other image.

3. The image processing apparatus according to claim 2, wherein the fusion decision processing section changes the synthesis ratio in such a way that a speed of the switching from the fusion image over to the second imaged image becomes equal to or higher than a speed of the switching from the second imaged image over to the fusion image.

4. The image processing apparatus according to claim 3, wherein the fusion decision processing section sets the switching speed in response to a change amount of the feature amount.

5. The image processing apparatus according to claim 1, further comprising:
an image synthesizing section that performs processing for synthesizing the fusion image and the second imaged image in accordance with the synthesis ratio set by the fusion decision processing section, and produces synthesis image data.

6. The image processing apparatus according to claim 5, wherein the image synthesizing section synthesizes the fusion image and the second imaged image at a rate according to the synthesis ratio, and produces an intermediate image in middle of the image switching.

7. The image processing apparatus according to claim 5, wherein the image synthesizing section produces an image in a point-of-view position according to the synthesis ratio from the second imaged image, and sets a resulting image as an intermediate image in middle of the image switching.

8. The image processing apparatus according to claim 2, wherein the fusion decision processing section calculates the feature amount based on a parallax between the first imaged image and the second imaged image.

9. The image processing apparatus according to claim 8, wherein the fusion decision processing section sets a statistic indicating a dispersion of the parallaxes for each pixel as the feature amount, and in a case where the dispersion of the parallaxes is larger than a decision threshold value previously set, decides that deterioration of image quality is caused, and in a case where a time change of the statistic indicating the dispersion is larger than a change threshold value previously set, makes a speed of switching from the fusion image to the second imaged image higher than a predetermined switching speed.

10. The image processing apparatus according to claim 8, wherein the fusion decision processing section sets a rate of pixels exceeding a parallax amount in a predetermined range in parallaxes for each pixel as the feature amount, and in a case where the rate of the pixels exceeding the parallax amount in the predetermined range is larger than a rate of a decision threshold value previously set, decides that deterioration of image quality is caused, and in a case where a time change of the rate is larger than a change threshold value previously set, makes a speed of switching from the fusion image to the second imaged image higher than a predetermined switching speed.

11. The image processing apparatus according to claim 8, wherein the fusion decision processing section calculates, for each pixel, an absolute value of a parallax difference between a pixel located apart in a parallax direction from a pixel of interest by a predetermined distance and a pixel located apart in a reverse direction from the pixel of interest by the predetermined distance, sets a rate of pixels exceeding in a parallax difference absolute value a predetermined amount as the feature amount, and in a case where the rate of the pixels exceeding the predetermined amount is larger than a rate of the decision threshold value, decides that deterioration of image quality is caused, and in a case where a time change of the rate is larger than a change threshold value previously set, makes a speed of switching from the fusion image to the second imaged image higher than a predetermined switching speed.

12. The image processing apparatus according to claim 2, wherein the fusion decision processing section calculates the feature amount based on saturation of pixels of the first imaged image and the second imaged image.

13. The image processing apparatus according to claim 8, wherein the fusion decision processing section calculates a feature amount based on a difference between number of pixels exceeding a saturation decision setting value in luminance component image data produced from image data associated with the second imaged image and the number of pixels exceeding a saturation decision setting value in image data associated with the first imaged image, decides that deterioration of image quality is caused in a case where the feature amount is larger than a decision threshold value, and in a case where a time change in difference between the numbers of pixels is larger than a change threshold value previously set, makes a speed of switching from the image data of the fusion image to the image data of the second imaged image higher than a predetermined switching speed.

14. The image processing apparatus according to claim 2, wherein the fusion decision processing section produces luminance component image data and color component image data from image data associated with the second imaged image, and in a case where a difference between a dispersion of the luminance component image data and a dispersion of the color component image data is larger than a decision threshold value, decides that deterioration of image quality is caused, and in a case where a time change in difference between dispersions is larger than a change threshold value previously set, makes a speed of switching from the fusion image to the second imaged image higher than a predetermined switching speed.

15. The image processing apparatus according to claim 1, wherein the fusion decision processing section sets a time change in a difference in signal level between an end portion area of the first imaged image and an end portion area of the second imaged image as the feature amount, and in a case where the signal level difference is larger than a decision threshold value previously set, decides that deterioration of image quality is caused.

16. The image processing apparatus according to claim 1, wherein the first imaged image is a monochrome imaged image, and the second imaged image is a color imaged image.

17. An image processing method, comprising:
based on a feature amount calculated by using a moving image of a first imaged image obtained by imaging a subject and a second imaged image obtained by imaging the subject from a different point-of-view position, performing fusion decision as to whether or not deterioration of image quality is caused in a fusion image obtained by fusion of the first imaged image and the second imaged image with the first imaged image as a reference, for each image of the moving image; and
based on a result of the fusion decision and the feature amount, changing a synthesis ratio in such a way that with respect to the fusion image and the second imaged image, one image is switched over to the other image with a lapse of time.

* * * * *